(12) United States Patent
Toyooka et al.

(10) Patent No.: US 7,307,679 B2
(45) Date of Patent: Dec. 11, 2007

(54) LIQUID-CRYSTAL DISPLAY AND POLARIZING PLATE

(75) Inventors: Kentaro Toyooka, Minami-ashigara (JP); Yusuke Ohashi, Minami-ashigara (JP); Junichi Hirakata, Minami-ashigara (JP)

(73) Assignee: Fujifilm Corporation, Minato-Ku, Tokyo (JP)

( * ) Notice: Subject to any disclaimer, the term of this patent is extended or adjusted under 35 U.S.C. 154(b) by 450 days.

(21) Appl. No.: 11/034,729

(22) Filed: Jan. 14, 2005

(65) Prior Publication Data
US 2005/0157225 A1    Jul. 21, 2005

(30) Foreign Application Priority Data

| Jan. 16, 2004 | (JP) | ............................. 2004-009203 |
| Sep. 27, 2004 | (JP) | ............................. 2004-279865 |
| Sep. 27, 2004 | (JP) | ............................. 2004-279868 |

(51) Int. Cl.
 *G02F 1/1335*   (2006.01)
 *G02F 1/1337*   (2006.01)
(52) U.S. Cl. .................... 349/99; 349/96; 349/123; 349/129
(58) Field of Classification Search ............... 349/99, 349/96, 123, 129
See application file for complete search history.

(56) References Cited

U.S. PATENT DOCUMENTS

| 6,359,671 | B1 * | 3/2002 | Abileah ..................... 349/119 |
| 6,628,360 | B2 * | 9/2003 | Yamada et al. ............. 349/132 |
| 6,734,933 | B2 * | 5/2004 | Mafune ..................... 349/113 |
| 6,819,381 | B2 * | 11/2004 | Mi et al. .................... 349/117 |

* cited by examiner

*Primary Examiner*—Mike Qi
(74) *Attorney, Agent, or Firm*—Buchanan Ingersoll & Rooney PC

(57) ABSTRACT

A novel liquid crystal display is disclosed. The display comprises a pair of substrates disposed facing each other and at least one of which has an electrode, a liquid-crystal layer being sandwiched in between the pair of substrates and comprising liquid-crystal molecules aligned along with a first alignment axis and a second alignment axis respectively formed on facing surfaces of the first and second substrates, a pair of polarizing plates disposed sandwiching the liquid-crystal layer, and at least an optically anisotropic layer disposed between the liquid-crystal layer and either of the polarizing plates, and comprising at least one liquid crystal compound which is aligned along with a third alignment axis and is fixed in the alignment state. And their disposition satisfies at least one of Condition (1): the alignment axes of the substrates are not parallel to transmission axes of the polarizing plates; and Condition (2): the alignment axis of the substrate is not parallel to the alignment axis of the optically anisotropic layer.

7 Claims, 3 Drawing Sheets

LIQUID-CRYSTAL DISPLAY AND POLARIZING PLATE

CROSS-REFERENCE TO RELATED APPLICATIONS

This application claims benefit of priority under 35 USC 119 to Japanese Patent Application No. 2004-009203 filed Jan. 16, 2004, Japanese Patent Application No. 2004-279865 filed Sep. 27, 2004, and Japanese Patent Application No. 2004-279868 filed Sep. 27, 2004.

TECHNICAL FIELD

The present invention relates to liquid crystal displays and polarizing plates.

RELATED ART

In the past, CRTs (cathode ray tube) have been mainly used for displaying equipments of office automation machines such as word processors, notebook-size personal computers or personal computers, of mobile terminals or of TVs. In recent years, liquid-crystal displays have been widely used in the place of the CRTs due to their less thickness, lighter weight and less electricity to work. A liquid-crystal display usually comprises a liquid-crystal cell and a polarizing plate. The polarizing plate usually has a protective film and a polarizer film, and is typically obtained by staining a polarizer film made of a polyvinyl alcohol film with iodine, stretching the film, and stacking protective films on both surfaces of the film. In some configuration of transmission-type liquid crystal display devices, the polarizer plate may be attached on both sides of the liquid crystal cell, and some cases also adopt one or more optical compensation sheet placed thereon. In reflection-type liquid crystal display devices, a reflective plate, a liquid crystal cell, one or more optical compensation sheet(s) and the polarizer plate are disposed in this order. The liquid crystal cell comprises liquid-crystalline molecules, two substrates for encapsulating the liquid-crystalline molecules in between, and electrode layer for applying voltage to the liquid-crystalline molecules. The liquid crystal cell performs ON/OFF display based on difference in the orientation state of the liquid-crystalline molecules, and is applicable both to transmission type and reflection type. Proposed examples of the display modes include TN (twisted nematic), IPS (in-plane switching), OCB (optically compensatory bend), VA (vertically aligned), ECB (electrically controlled birefringence) and STN (Super Twisted Nematic).

Optical compensatory sheets are employed in a variety of liquid-crystal displays to eliminate image coloration and broaden the viewing angle. Stretched birefringent films have conventionally been employed as optical compensatory sheets. Further, in recent years, instead of optical compensatory sheets comprised of stretched birefringent films, the use of optical compensatory sheets having an optically anisotropic layer formed of at least one low-molecular weight or high molecular weight liquid-crystal compound on a transparent support has been proposed. Generally, liquid-crystal molecules have various orientation modes. The use of liquid-crystal molecules permits the achievement of optical properties that are unachievable in conventional stretched birefringent films.

The optical properties of the optical compensatory sheets may be decided according to the optical properties of the liquid-crystal cells to be optically compensated, or in other words according to the modes of the liquid-crystal cells to be optically compensated. It is made possible to produce various optical compensatory sheets having optical properties capable of optically compensating various types of liquid-crystal cells by using liquid-crystal compounds. Various optical compensatory sheets, which are produced by using liquid-crystal compounds, capable of optically compensating various types of liquid-crystal cells have been provided. For example, one optically anisotropic layer used for a TN-mode liquid-crystal cell optically compensates for an alignment state in which liquid-crystal molecules in a TN-mode cell are tilted with respect to a substrate plane with eliminating the twisted structure in the applied-field state, thereby to contribute to lowering light leakage in an oblique direction in a black state and to improving a viewing angle property of grayscale.

For optically compensation of a TN-mode liquid-crystal display, it is proposed in JPA No. hei 4-162018 (the term "JPA" as used herein means an "unexamined published Japanese patent application (Kohkai Tokkyo Kouhou)") that two pairs of stretched films, respectively having a same retardation each other, stacked in the manner of a perpendicular alignment such that the in-plane retardation of the pair becomes almost zero, are respectively disposed between a liquid crystal cell and an upside polarizing plate and between the liquid crystal cell and a downside polarizing plate.

And optical compensatory sheets for a TN-mode liquid-crystal display which are produced in the film form by aligning liquid-crystal molecules and fixing them in the alignment state are also proposed, and discotic liquid-crystal compounds are employed for producing some of them (JPA No. hei 6-214116) and rod-like liquid-crystal compounds are employed for producing some of them (JPA No. hei 10-186356).

SUMMARY OF THE INVENTION

It is difficult to optically compensate a liquid-crystal cell in all directions even by an optical compensatory sheet employing uniformly hybrid-aligned discotic liquid-crystal molecules. Liquid-crystal cells may be mainly observed in various directions in accordance with the intended use. For one example, a display used in a plane's cockpit may be mainly observed in a vertical (up and down) direction in the nature of the use. And for another example, a TV used in a household may be often observed by plural persons sitting beside each other and, thus, may be mainly observed in a horizontal (right and left) direction. One object of the first embodiment of the present invention is to provide a liquid-crystal display, especially TN-mode liquid-crystal display, having a simple configuration, adaptable for various applications.

Grayscale inversion tends to occur in conventional TN-mode liquid-crystal displays, even comprising a conventional optically anisotropic layer capable of improving grayscale viewing angle, in a black state when being observed in a down direction or in an oblique direction, and, thus, it is required to remove such grayscale inversion. One object of the second and the third embodiments of the present invention is to provide elliptically polarizing plate capable of improving a grayscale inversion angle without contributing to lowering grayscale viewing angle when being employed in a liquid-crystal display, especially in a TN-mode liquid-crystal display. Another object of the second embodiment or the third embodiment of the present invention is to provide a liquid-crystal display, especially a TN-mode liquid-crystal display, improved in grayscale viewing angle and grayscale inversion angle.

From one aspect, the present invention provides a liquid crystal display comprising:

a pair of a first substrate and a second substrate disposed facing each other, and at least one of which has an electrode, a liquid-crystal layer being sandwiched in between the pair of the first substrate and the second substrate and comprising liquid-crystal molecules aligned along with a first alignment axis and a second alignment axis respectively formed on facing surfaces of the first and second substrates, a pair of a first polarizing plate and a second polarizing plate disposed sandwiching the liquid-crystal layer, the first polarizing plate being disposed nearer to the first substrate than the second polarizing plate and the second polarizing plate being disposed nearer to the second substrate than the first polarizing plate, and at least a first optically anisotropic layer disposed between the liquid-crystal layer and the first polarizing plate, and comprising at least one liquid crystal compound which is aligned along with a third alignment axis and is fixed in the alignment state;

wherein disposition of the pair of the first substrate and the second substrate, the pair of the first polarizing plate and the second polarizing plate and the optically anisotropic layer satisfies at least one of Condition (1) and Condition (2), and viewing angle in a vertical direction and/or viewing angle in a horizontal direction are/is better than those found in disposition that satisfies neither of Condition (1) nor Condition (2);

Condition (1)

the first alignment axis is not parallel to a transmission axis of the first polarizing plate, and the second alignment axis is not parallel to a transmission axis of the second polarizing plate; and Condition (2)

the first alignment axis is not parallel to the third alignment axis.

As embodiments of the present invention, the liquid crystal display wherein an angle between the first alignment axis and the second alignment axis is from 80 to 100° and the liquid-crystal display wherein an absorption axis of the first polarizing plate is parallel to the third alignment axis.

As embodiments improved in viewing angle in a vertical direction, the liquid-crystal display wherein the first polarizing plate is disposed at an observed side and the second polarizing plate is disposed at a backlight side, an absorption axis of the first polarizing plate is rotated by 0.1 to 10° counterclockwise with respect to the first alignment axis and an absorption axis of the second polarizing plate is rotated by 0.1 to 10° clockwise with respect to the second alignment axis; and the liquid-crystal display further comprising a second optically anisotropic layer disposed between the liquid-crystal layer and the second polarizing plate, and comprising at least one liquid crystal compound which is aligned along with a fourth alignment axis and is fixed in the alignment state, wherein the first polarizing plate is disposed at an observed side and the second polarizing plate is disposed at a backlight side, the third alignment axis is rotated by 0.1 to 10° counterclockwise with respect to the first alignment axis and the fourth alignment axis is rotated by 0.1 to 10° clockwise with respect to the second alignment axis; are provided.

As embodiments improved in viewing angle in a horizontal direction, the liquid crystal display wherein the first polarizing plate is disposed at an observed side and the second polarizing plate is disposed at a backlight side, an absorption axis of the first polarizing plate is rotated by 0.1 to 10° clockwise with respect to the first alignment axis and an absorption axis of the second polarizing plate is rotated by 0.1 to 10° counterclockwise with respect to the second alignment axis; and the liquid-crystal display further comprising a second optically anisotropic layer disposed between the liquid-crystal layer and the second polarizing plate, and comprising at least one liquid crystal compound which is aligned along with a fourth alignment axis and is fixed in the alignment state wherein the first polarizing plate is disposed at an observed side and the second polarizing plate is disposed at a back light side, the third alignment axis is rotated by 0.1 to 10° clockwise with respect to the first alignment axis and the fourth alignment axis is rotated by 0.1 to 10° counterclockwise with respect to the second alignment axis; are provide.

From another aspect, the present invention provides a polarizing plate used in a liquid-crystal display comprising a pair of a first substrate and a second substrate disposed facing each other, and at least one of which has an electrode, and a liquid-crystal layer being sandwiched in between the pair of the first substrate and the second substrate and comprising liquid-crystal molecules aligned along with a first-alignment axis and a second alignment axis respectively formed on facing surfaces of the first substrate and the second substrate, having a same surface-shape as the surface-shape of the pair of substrates;

comprising:

a linear polarizing film, and an optically anisotropic layer comprising at least one liquid crystal compound which is aligned along with a third alignment axis and is fixed in the alignment state;

wherein, being laminated on the first substrate or the second substrate, disposition of the pair of the first and the second substrates and the optically anisotropic layer satisfies at least one of Condition (3) and Condition (4);

Condition (3):

an absorption axis of the linear polarizing film is rotated by 0.1 to 10° clockwise or counterclockwise respect to the first or second alignment axis, and Condition (4):

the third alignment axis is rotated by 0.1 to 10° clockwise or counterclockwise with respect to the first or second alignment axis.

From another aspect, the present invention provides an elliptically polarizing plate comprising:

a linear polarizing film and at least one optically anisotropic layer wherein an optical quenching axis is not parallel to an absorption axis of the linear polarizing film.

From another aspect, the present invention provides a liquid crystal display comprising:

a pair of a first substrate and a second substrate disposed facing each other, and at least one of which has an electrode, a liquid-crystal layer being sandwiched in between the pair of the first substrate and the second substrate and comprising liquid-crystal molecules aligned along with a first alignment axis and a second alignment axis respectively formed on facing surfaces of the first and second substrates, a pair of a first polarizing plate and a second polarizing plate disposed sandwiching the liquid-crystal layer, the first polarizing plate being disposed nearer to the first substrate than the second polarizing plate and the second polarizing plate being disposed nearer to the second substrate than the first polarizing plate, and at least a first optically anisotropic layer disposed between the liquid-crystal layer and the first polarizing plate, and comprising at least one liquid crystal compound which is aligned along with a third alignment axis and is fixed in the alignment state;

wherein an optical quenching axis of the first optically anisotropic layer is not parallel to the first alignment axis and is not parallel to an absorption axis of the first polarizing plate.

As embodiments of the present invention, the liquid-crystal display wherein the third alignment axis is rotated by 0.1 to 20° with respect to the first alignment axis; the liquid-crystal display wherein the optical quenching axis of the optically anisotropic layer is rotated by 0.1 to 5° with respect to the first alignment axis; the liquid-crystal display wherein an absorption axis of the first polarizing plate is rotated by an angle not greater than 5° with respect to the first substrate and/or an absorption axis of the second polarizing plate is rotated by an angle not greater than 5° with respect to the second substrate; the liquid-crystal display wherein the liquid-crystal layer is a TN mode liquid-crystal layer whose twist angle is greater than 0° and less than 100°; and the liquid-crystal display employing a normally white mode, and being driven with a black voltage not greater than a voltage capable of performing a transmittance equal to $T_{15}+0.001\times(T_0-T_{15})$ where $T_0$ and $T_{15}$ mean frontal transmittances obtained respectively while being applied actual values of 0V and 15V; are provided.

From another aspect, the present invention provides an elliptically polarizing plate comprising:

a linear polarizing film and at least one optically anisotropic layer wherein an optical quenching axis is not parallel to an absorption axis of the linear polarizing film and an in-plane retardation of the optically anisotropic layer falls within a range from 30 to 80 nm.

From another aspect, the present invention provides a normally white mode liquid-crystal display comprising:

a pair of substrates disposed facing each other, and at least one of which has an electrode, a liquid-crystal layer being sandwiched in between the pair of substrates and comprising liquid-crystal molecules aligned along with alignment axes respectively formed on facing surfaces of the pair of substrates, and a pair of polarizing plates disposed sandwiching the liquid-crystal layer, comprising a linear polarizing film and at least one optically anisotropic layer having an in-plane retardation falling within a range from 30 to 80 nm;

wherein an optical quenching axis of the at least one optically anisotropic layer is not parallel to an absorption axis of the linear polarizing film, an alignment state of the liquid-crystal molecules in the liquid-crystal layer changes depending on an applied-field thereby to vary an in-pale retardation of the liquid-crystal layer, and a difference between an in-plane retardation generated by intersecting the optical quenching axis of the optically anisotropic layer with the absorption axis of the linear polarizing film and a residue in-plane retardation in the liquid-crystal layer is minimum when a transmittance is minimum.

As embodiments of the present invention, the liquid-crystal display wherein a product, $d\cdot\Delta n$, of a thickness of the liquid-crystal layer, $d(\mu m)$, and a refractive index anisotropy, $\Delta n$, is from 0.36 μm to 0.43 μm; and the liquid-crystal display satisfying following relational expression:

$$0.005<\{T(31)-T(0)\}/\{T(255)-T(0)\}<0.02$$

wherein T(0) is a transmittance for zero-gradient and T(31) is a transmittance for 31th-gradient, providing that a black state is zero-gradient and a white state is 255th-gradient and brightness between the black and white states are divided into 254 levels; are provided.

Figure 1:
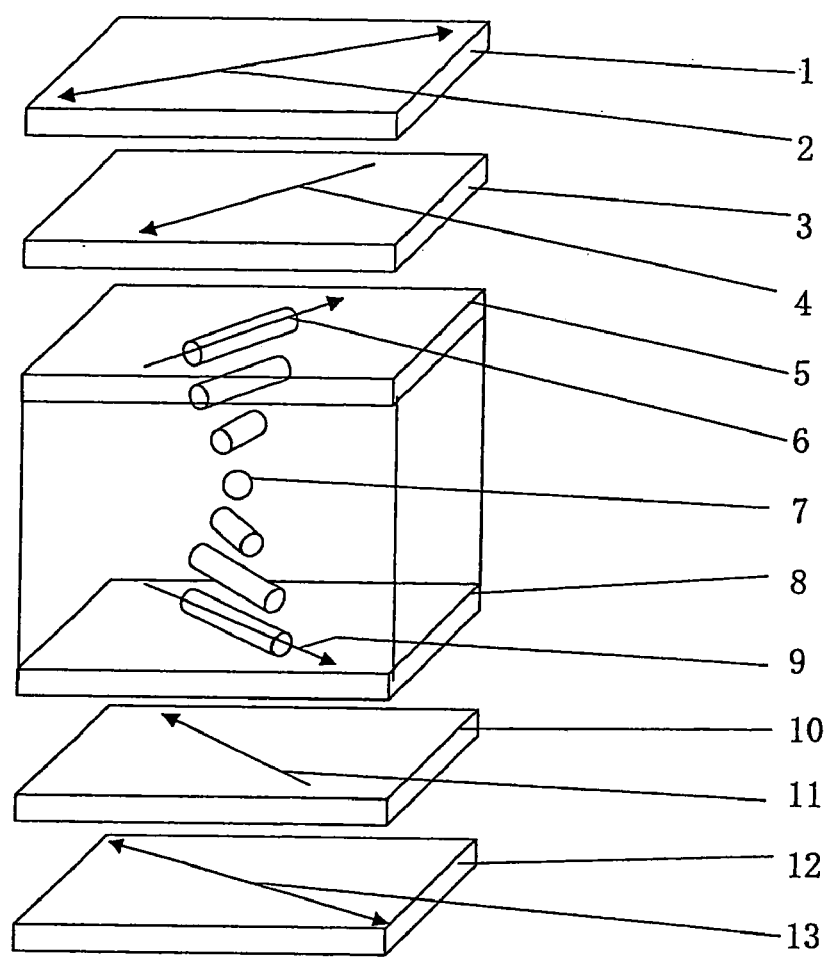
FIG. 1 is a schematic view of one example of a liquid-crystal display falling within the scope of the first embodiment of the present invention.

In figures, the numerical numbers mean as follows:

1 an upside polarizing plate, 2 an absorption axis of an upside polarizing plate, 3 an upside optically anisotropic layer, 4 an alignment-controlling direction used for preparing an upside optically anisotropic layer, 5 an upside substrate of a liquid crystal cell, 6 a rubbing direction of an upside substrate used for aligning liquid-crystal molecules, 7 liquid-crystal molecules (liquid-crystal layer), 8 a downside substrate of a liquid crystal cell, 9 a rubbing direction of a downside substrate used for aligning liquid-crystal molecules, 10 a downside optically anisotropic layer, 11 an alignment-controlling direction used for preparing a downside optically anisotropic layer, 12 a downside polarizing plate, 13 an absorption axis of a downside polarizing plate, 21 an outer protective film of an upside polarizing film, 22 a slow axis of an outer protective film of an upside polarizing film, 23 an upside polarizing film, 24 an absorption axis of an upside polarizing film, 25 a liquid-crystal-cell-side protective film (a substrate for an upside optically anisotropic layer) of an upside polarizing film, 26 a slow axis of a liquid-crystal-cell-side protective film of an upside polarizing film (a substrate), 27 an upside optically anisotropic layer, 28 an optical quenching axis of an upside optically anisotropic layer, 29 a rubbing direction (an alignment-controlling direction) of an upside optically anisotropic layer, 30 an upside substrate of a liquid-crystal cell, 31 a rubbing direction of an upside substrate used for aligning liquid-crystal molecules, 32 liquid-crystal molecules (a liquid-crystal layer), 33 a rubbing direction of a downside substrate used for aligning liquid-crystal molecules, 34 a downside substrate of a liquid-crystal cell, 35 a downside optically anisotropic layer, 36 an optical quenching axis of a downside optically anisotropic layer, 37 a rubbing direction (an alignment-controlling direction) of a downside optically anisotropic layer, 38 a liquid-crystal-cell-side protective film (a substrate for a downside optically anisotropic layer) of a downside polarizing film,
39 a slow axis of a liquid-crystal-cell-side protective film (a substrate for a downside optically anisotropic layer) of a downside polarizing film,
40 a downside polarizing film,
41 an absorption axis of a downside polarizing film,
42 an outer-side protective film of a downside polarizing film,
43 a slow axis of an outer-side protective film of a downside polarizing film,
51 an outer protective film of an upside polarizing film,
52 a slow axis of an outer protective film of an upside polarizing film,
53 an upside polarizing film,
54 an absorption axis of an upside polarizing film,
55 a liquid-crystal-cell-side protective film (a substrate for an upside optically anisotropic layer) of an upside polarizing film,
56 a slow axis of a liquid-crystal-cell-side protective film of an upside polarizing film (a substrate),
57 an upside optically anisotropic layer,
58 an optical quenching axis of an upside optically anisotropic layer,
59 a rubbing direction (an alignment-controlling direction) of an upside optically anisotropic layer,
60 an upside substrate of a liquid-crystal cell,
61 a rubbing direction of an upside substrate used for aligning liquid-crystal molecules,
62 liquid-crystal molecules (a liquid-crystal layer),
63 a rubbing direction of a downside substrate used for aligning liquid-crystal molecules,
64 a downside substrate of a liquid-crystal cell,
65 a downside optically anisotropic layer,
66 an optical quenching axis of a downside optically anisotropic layer,
67 a rubbing direction (an alignment-controlling direction) of a downside optically anisotropic layer,
68 a liquid-crystal-cell-side protective film (a substrate for a downside optically anisotropic layer) of a downside polarizing film,
69 a slow axis of a liquid-crystal-cell-side protective film (a substrate for a downside optically anisotropic layer) of a downside polarizing film,
70 a downside polarizing film,
71 an absorption axis of a downside polarizing film,
72 an outer-side protective film of a downside polarizing film, and
73 a slow axis of an outer-side protective film of a downside polarizing film.

DETAILED DESCRIPTION OF THE INVENTION

Hereafter, the present invention will be explained in detail. In the specification, ranges indicated with "to" mean ranges including the numerical values before and after "to" as the minimum and maximum values.

In the specification, the term of "+" added to any angle means a counterclockwise direction, and the term of "−" added to any angle means a clockwise direction. And an absolute 0° direction means a three o'clock direction, provided that an upper direction is a twelve o'clock direction and a down direction is a six o'clock direction. The term of "slow axis" means a direction giving a maximum refractive index. As long as written specifically, refractive indexes are measured at 550 nm. The term of "visible light range" is used for any wavelength from 380 nm to 780 nm.

In the specification, the terms of "polarizing plate" means not only polarizing plates having a proper size to be employed in a liquid-crystal but also long polarizing plates before being cut. And in the specification, the terms of "polarizing film" is distinct from the term "polarizing plate", and the term of "polarizing plate" is used for any laminated body comprising a "polarizing film" and at least one protective film thereon.

First Embodiment

The first embodiment of the present invention relates to a liquid-crystal display comprising:

a pair of a first substrate and a second substrate disposed facing each other, and at least one of which has an electrode, a liquid-crystal layer being sandwiched in between the pair of the first substrate and the second substrate and comprising liquid-crystal molecules aligned along with a first alignment axis and a second alignment axis respectively formed on facing surfaces of the first and second substrates, a pair of a first polarizing plate and a second polarizing plate disposed sandwiching the liquid-crystal layer, the first polarizing plate being disposed nearer to the first substrate than the second polarizing plate and the second polarizing plate being disposed nearer to the second substrate than the first polarizing plate, and at least a first optically anisotropic layer disposed between the liquid-crystal layer and the first polarizing plate, and comprising at least one liquid crystal compound which is aligned along with a third alignment axis and is fixed in the alignment state.

According to the first embodiment, the pair of the first substrate and the second substrate, the pair of the first polarizing plate and the second polarizing plate and the optically anisotropic layer are disposed such that at least one of Condition (1) and Condition (2) is satisfies, and, thus, viewing angle in a vertical direction and/or viewing angle in a horizontal direction are/is improved.

Condition (1)

the first alignment axis is not parallel to a transmission axis of the first polarizing plate, and the second alignment axis is not parallel to a transmission axis of the second polarizing plate; and Condition (2)

the first alignment axis is not parallel to the third alignment axis.

In the conventional TN-mode liquid-crystal displays, polarizing plates and optically anisotropic layers are disposed such that the absorption axes of the polarizing plates are parallel to the alignment axes of the optically anisotropic layers. The inventors have studied earnestly and found that when disposition of the pair of substrates of a liquid-crystal cell, the pair of polarizing plates and the optically anisotropic layers satisfies at least one of Condition (1) and Condition (2), decrease of grayscale depending on viewing angle in a vertical direction and/or viewing angle in a horizontal direction can be reduced remarkably, and viewing angle properties can be improved remarkably.

It is noted that, in the specification, the term of "A is not parallel to B" means that the one (A or B) is clockwise or counterclockwise rotated from another (B or A) by an angle not smaller than 0.1°. According to embodiments employing a TN-mode, the misalignment between the two axes as set forth in Condition (1) or Condition (2) is desirably clockwise or counterclockwise rotation by an angle falling within a range from 0.1 to 10°, more desirably clockwise or counterclockwise rotation by an angle falling within a range from 0.3 to 7°, and much more desirably clockwise or counterclockwise rotation by an angle from 0.5 to 5°.

According to the first embodiment, by satisfying either Condition (1) or (2), improvement in viewing angle properties in a vertical (up and down) direction and/or in a horizontal (right and left) direction can be obtained. The embodiments satisfying both of Condition (1) or (2) are preferred. For the embodiments employing plural optically anisotropic layers, if an alignment axis of at least one of the plural optically anisotropic layers satisfies Condition (2), improvement in viewing angle properties in a horizontal (up and down) direction and/or in a vertical (right and left) direction can be obtained. For such embodiments, it is preferred that all alignment axes of the plural optically anisotropic layers satisfy Condition (2).

In order to optically compensate a liquid-crystal display in a vertical (up and down) direction more precisely and to more improve depending on viewing angle in a vertical (up and down) direction (hereinafter "improvement in grayscale viewing angle" means improvement in grayscale depending on viewing angle), a first polarizing plate is disposed at an observed side, a second polarizing plate is disposed at a backlight side, and a liquid-crystal cell comprising a liquid-crystal layer and a pair of an observed-side substrate and a backlight-side second substrate sandwiching the liquid-crystal layer are disposed in between the first and the second polarizing plates such that an absorption axis of the first polarizing plate is rotated by 0.1 to 10° (desirably by 0.3 to 7° and more desirably by 0.5 to 5°) counterclockwise with respect to an alignment axis of the observed side substrate, and an absorption axis of the second polarizing plate is rotated by 0.1 to 10° clockwise with respect to an alignment axis of the backlight-side substrate.

As well as above, in order to optically compensate a liquid-crystal display in a vertical (up and down) direction more precisely and to more improve grayscale viewing angle, a first polarizing plate is disposed at an observed side, a second polarizing plate is disposed at a backlight side, and an observed-side optically anisotropic layer and a backlight-side optically anisotropic layer are disposed respectively between the liquid-crystal cell and the first and the second polarizing plates, such that the alignment axis of the observed-side optically an isotropic layer is rotated by 0.1 to 10° (desirably by 0.3 to 7° and more desirably by 0.5 to 5°) counterclockwise with respect to the alignment axis of the observed-side substrate and the alignment axis of the backlight-side optically anisotropic layer is rotated by 0.1 to 10° (desirably by 0.3 to 7° and more desirably by 0.5 to 5°) clockwise with respect to the alignment axis of the backlight-side substrate.

In order to optically compensate a liquid-crystal display in a horizontal (right and left) direction more precisely and to more improve grayscale viewing angle, a first polarizing plate is disposed at an observed side, a second polarizing plate is disposed at a backlight side, and a liquid-crystal cell comprising a liquid-crystal layer and a pair of an observed-side substrate and a backlight-side second substrate sandwiching the liquid-crystal layer are disposed in between the first and the second polarizing plates such that an absorption axis of the first polarizing plate is rotated by 0.1 to 10° (desirably by 0.3 to 7° and more desirably by 0.5 to 5°) clockwise with respect to an alignment axis of the observed side substrate, and an absorption axis of the second polarizing plate is rotated by 0.1 to 10° counterclockwise with respect to an alignment axis of the backlight-side substrate.

As well as above, in order to optically compensate a liquid-crystal display in a horizontal (right and left) direction more precisely and to more improve grayscale viewing angle, a first polarizing plate is disposed at an observed side, a second polarizing plate is disposed at a backlight side, and an observed-side optically anisotropic layer and a backlight-side optically anisotropic layer are disposed respectively between the liquid-crystal cell and the first and the second polarizing plates, such that the alignment axis of the observed-side optically anisotropic layer is rotated by 0.1 to 10° (desirably by 0.3 to 7° and more desirably by 0.5 to 5°) clockwise with respect to the alignment axis of the observed-side substrate and the alignment axis of the backlight-side optically anisotropic layer is rotated by 0.1 to 10° (desirably by 0.3 to 7° and more desirably by 0.5 to 5°) counterclockwise with respect to the alignment axis of the backlight-side substrate.

In the first embodiment of the present invention, the absorption axis of the polarizing plate which is disposed nearer to the optically anisotropic layer is desirably made, but not to be limited to, parallel to the alignment axis of the optically anisotropic layer.

Next, an example of the first embodiment of the present invention will be described with referent to FIG. 1.

The liquid-crystal display shown in FIG. 1 comprises a liquid-crystal cell comprising an upside substrate 5 and a downside substrate 8 and a liquid-crystal layer formed of liquid-crystal molecules 7 sandwiched in between the substrates 5 and 8. Alignment layers may be formed on the faced surfaces, contacting liquid-crystal molecules 7, of the substrates 5 and 8. Alignment axes (such as rubbing axes) 6 and 9 are formed on the faced surfaces by any treatment such as a rubbing treatment, and orientations of liquid-crystal molecules 7 are controlled by the alignment axes 6 and 9 in the field-free state or in the low-field state. And electrodes (not shown in FIG. 1), which can apply the field to liquid-crystal molecules 7, are formed on the faced surfaces of the substrates 5 and 8.

It is preferred that the liquid-crystal cell employed in the liquid-crystal display shown in FIG. 1 is a TN-mode cell. According to a liquid-crystal display employing a TN-mode, liquid-crystal molecules in the cell are substantially parallel to a substrate plane while not being applied the driven voltage, or in other words in a non-driven state, and the orientations of the molecules are twisted by 90° between the upside and the downside substrate. As the applied voltage is increased, liquid-crystal molecules are gradually tilted vertically against the substrate plane with eliminating the twist.

For a TN-mode liquid-crystal cell, the preferred value of product ($\Delta n \cdot d$) of a thickness of a liquid-crystal layer, $d(\mu m)$, and a refractive-index anisotropy, $\Delta n$, is 0.2 to 1.2 µm and the more preferred value is 0.2 to 0.5 µm. And the preferred twist angle of the liquid-crystal layer is from 80 to 100° and the more preferred twist angle is from 85 to 95°. When the twist angle is set in the range, the liquid-crystal display, giving a high brightness in a white state and wide viewing angle, can be obtained. The angle between the rubbing axes formed on the faced surfaces of the substrates 5 and 8 is set within a range from 80 to 100°, and, thus, a liquid-crystal layer, having a twist angle falling within a range from 80 to 100°, may be produced. For example, providing that the horizontal (right and left) direction is an axis of 0°, a substrate having a surface subjected to a rubbing treatment in a direction along with around −45° rubbing axis may be disposed at an observed side, a substrate having a surface subjected to a rubbing treatment in a direction along with around +45° rubbing axis may be disposed at a backlight side.

Material in the liquid-crystal cell may be selected from any nematic liquid-crystal materials, and not to be limited to specific types. If the liquid-crystal having a greater anisotropy of dielectric constant, $\Delta\in$, is used, the smaller driving voltage is required. If the liquid-crystal having a smaller anisotropy of refractive index, $\Delta n$, is used, the greater thickness of the liquid-crystal layer (a greater gap) may be allowed, the shorter time may be spent for pouring liquid-crystal material and unevenness of the gap may be reduced. On the other hand, if the liquid-crystal having a greater anisotropy of refractive index, $\Delta n$, is used, the thinner thickness of the liquid-crystal layer may be allowed, and the faster response may be preformed.

The liquid-crystal display shown in FIG. 1 comprises a pair of polarizing plates 1 and 12. Tow optically anisotropic layers 3 and 10 are disposed symmetrically on either side of the liquid-crystal cell, or in other words respectively disposed between the liquid-crystal cell and the pair of the polarizing plates, to compensate the liquid-crystal cell optically. The optically anisotropic layers 3 and 10 are respectively formed of a composition comprising at least one liquid-crystal compound. In the optically anisotropic layer 3 or 10, molecules of the liquid-crystal compound are aligned along with a rubbing axis 4 or 11 and fixed in the alignment state. And the linear polarizing plates 1 and 12 are disposed such that their absorption axes 2 and 13 are at right angles to each other. The liquid-crystal display shown in FIG. 1 employs a disposition of alignment axes 8, 9, 4 and 11 and absorption axes 12 and 13 satisfying either Condition (1) or Condition (2) thereby to be improved in viewing angel properties in a vertical direction and/or in a horizontal direction.

The preferred disposition of alignment axes 8, 9, 4 and 11 and absorption axes 12 and 13 will be described below. It is noted that, in FIG. 1, the upside is an observed-side and the downside is a backlight-side.

In order to optically compensate the liquid-crystal display shown in FIG. 1 in a vertical (up and down) direction more precisely and to more improve grayscale viewing angle, the polarizing plate 1 is disposed such that the absorption axis 2 is rotated counterclockwise by 0.1 to 10° (desirably by 0.3 to 7° and more desirably by 0.5 to 5°) with respect to the rubbing axis 6, and the polarizing plate 12 is disposed such that the absorption axis 13 is rotated by 0.1 to 10° clockwise with respect to the rubbing axis 9; and/or the optically anisotropic layer 10 is disposed such that the rubbing axis 4 is rotated by 0.1 to 10° (desirably by 0.3 to 7° and more desirably by 0.5 to 5°) counterclockwise with respect to the rubbing axis 6, and the rubbing axis 11 is rotated by 0.1 to 10° (desirably by 0.3 to 7° and more desirably by 0.5 to 50) clockwise with respect to the rubbing axis 9.

In order to optically compensate the liquid-crystal display shown in FIG. 1 in a horizontal (right and left) direction more precisely and to more improve grayscale viewing angle, the polarizing plate 1 is disposed such that the absorption axis 2 is rotated clockwise by 0.1 to 10° (desirably by 0.3 to 7° and more desirably by 0.5 to 5°) with respect to the rubbing axis 6, and the polarizing plate 12 is disposed such that the absorption axis 13 is rotated by 0.1 to 10° counterclockwise with respect to the rubbing axis 9; and/or the optically anisotropic layer 10 is disposed such that the rubbing axis 4 is rotated by 0.1 to 10° (desirably by 0.3 to 7° and more desirably by 0.5 to 5°) clockwise with respect to the rubbing axis 6, and the rubbing axis 11 is rotated by 0.1 to 10° (desirably by 0.3 to 7° and more desirably by 0.5 to 5°) counterclockwise with respect to the rubbing axis 9.

For the liquid-crystal display shown in FIG. 1, it is preferred that the absorption axis 2 is substantially parallel to the rubbing axis 4 and the absorption axis 13 is substantially parallel to the rubbing axis 11.

It is noted that, usually, a polarizing plate consists of a polarizing film and a pair of protective films sandwiching the polarizing film, and the detail configurations are omitted from FIG. 1. The protective films (not shown in FIG. 1) of the polarizing plates 1 and 12 which are disposed nearer to the liquid-crystal cell may be also used for supporting the optically anisotropic layers 3 and 10. And before being employed in the liquid-crystal display, the polarizing plates 1 and 12 may be bonded to the optically anisotropic layers 3 and 10 respectively. According to the first embodiment of the present invention, an integrated-type polarizing plate, which may be a linear polarizing plate, a circularly polarizing plate or an elliptically polarizing plate, comprising, in this order, a transparent protective film, a linear polarizing film, a transparent protective film (functioning as a transparent substrate for supporting an optically anisotropic layer) and optically anisotropic layer, can be used. Using such an integrated-type polarizing plate, it is possible to optically compensate a liquid-crystal display precisely without introducing complexity into the configuration of the liquid-crystal display. In a liquid-crystal-display, the integrated polarizing plate may be disposed such that a transparent protective film, a linear polarizing film, a transparent support and an optically anisotropic layer are disposed in this order from the outside of the display (far from the position of the liquid-crystal cell).

Second Embodiment

The second embodiment of the present invention relates to a liquid-crystal display comprising a pair of a first substrate and a second substrate disposed facing each other, and at least one of which has an electrode, a liquid-crystal layer being sandwiched in between the pair of the first substrate and the second substrate and comprising liquid-crystal molecules aligned along with a first alignment axis and a second alignment axis respectively formed on facing surfaces of the first and second substrates, a pair of a first polarizing plate and a second polarizing plate disposed sandwiching the liquid-crystal layer, the first polarizing plate being disposed nearer to the first substrate than the second polarizing plate and the second polarizing plate being disposed nearer to the second substrate than the first polarizing plate, and at least a first optically anisotropic layer disposed between the liquid-crystal layer and the first polarizing plate, and comprising at least one liquid crystal compound which is aligned along with a third alignment axis and is fixed in the alignment state.

According to the second embodiment, the first optically anisotropic layer and the first polarizing plate are disposed such that an optical quenching axis of the optically anisotropic layer is not parallel to the first alignment axis and is not parallel to an absorption axis of the first polarizing plate. And a liquid-crystal display, especially a TN-mode liquid-crystal display, employing such disposition is improved in a grayscale inversion angle in a down direction without lowering a frontal grayscale.

The meaning of "grayscale inversion" will be explained below.

According to a normal performance of a liquid-crystal display, as grayscale is increasing, brightness is increasing. However, it is found that, in a certain grayscale region, as grayscale is increasing, brightness is decreasing. This phenomenon is referred to as "grayscale inversion". It is also found that as grayscale is increasing, brightness doesn't change any more and keeps a constant value. This phenomenon is referred to as "loss in grayscale differentiation". Usually, these phenomena tend to occur in a region near to black tone. It is always required to design LCDs to prevent such phenomena from occurring in a frontal direction, and, usually, such phenomena tend to occur while being observed from downside and don't tend to occur while being observed from upside.

Next, in order to express a grayscale inversion phenomenon with a specific value, the term of "grayscale inversion angle" will be defined and the definition will be described in detail.

A liquid crystal display is observed in a frontal direction and the difference in brightness between of a white state and of a black state is obtained. The difference is divided equally into among seven and the divided brightness parts are identified as 8 grades, L0, L1, L2, . . . and L7, respectively. L0 is brightness in a black state and L7 is brightness in a white state. When a liquid-crystal display is observed from downside with a polar angle, and as the polar angle is increasing, the difference in brightness between L1 and L2 is decreasing, and, then no difference in brightness between L1 and L2 can be found at a certain polar angle. As the polar angle is further increasing, brightness of L1 becomes higher than brightness of L2. This critical polar angle is defined as a grayscale inversion angle.

The second embodiment of the present invention also relates to an elliptically polarizing plate comprising:

a linear polarizing film and at least one optically anisotropic layer wherein an optical quenching axis is not parallel to an absorption axis of the linear polarizing film.

The elliptically polarizing plate employing such disposition can contribute to improving a grayscale inversion angle of a liquid-crystal display, especially a TN-mode liquid-crystal display, without contributing to lowering frontal grayscale.

Next, the meaning of "optical quenching" will be explained.

For the explanation, a model, comprising two polarizing elements having an absorption axis perpendicular to each other (orthogonal nicole) and an optically anisotropic layer sandwiched in between the two polarizing elements, in which the surfaces of the polarizing elements are disposed parallel to the surface of the optically anisotropic layer, will be considered. If incident light having an intensity of 1 goes through the model, the intensity of outgoing light is expressed as $\sin^2 2\phi \sin^2 \delta/2$ where $\delta$ is retardation of the optically anisotropic layer and $\phi$ is an angle between the polarizing axis of the polarizing element disposed at the incoming side and the extraordinary light axis of the optically anisotropic layer. And, thus, when $\phi$ is an integral multiple of $\pi/2$, the intensity of the outgoing light always becomes zero regardless of retardation, $\delta$. In other words, under an orthogonal nicole configuration, when the optically anisotropic layer is rotated in-plane, the light transmittance becomes almost zero once every 90° rotation. And such a state is referred to as "optical quenching state", and the angle at the state is referred to as "optical quenching position". The optical quenching axis is decided by measuring the angle when the light transmittance becomes the minimum. The wavelength of the light is desirably, however not to be limited to, set to 550 nm. The integral intensity in a whole visible light region may be used.

Next, an example of a TN-mode liquid-crystal display employing the second embodiment of the present invention will be described with referent to FIG. 2.

Figure 2:
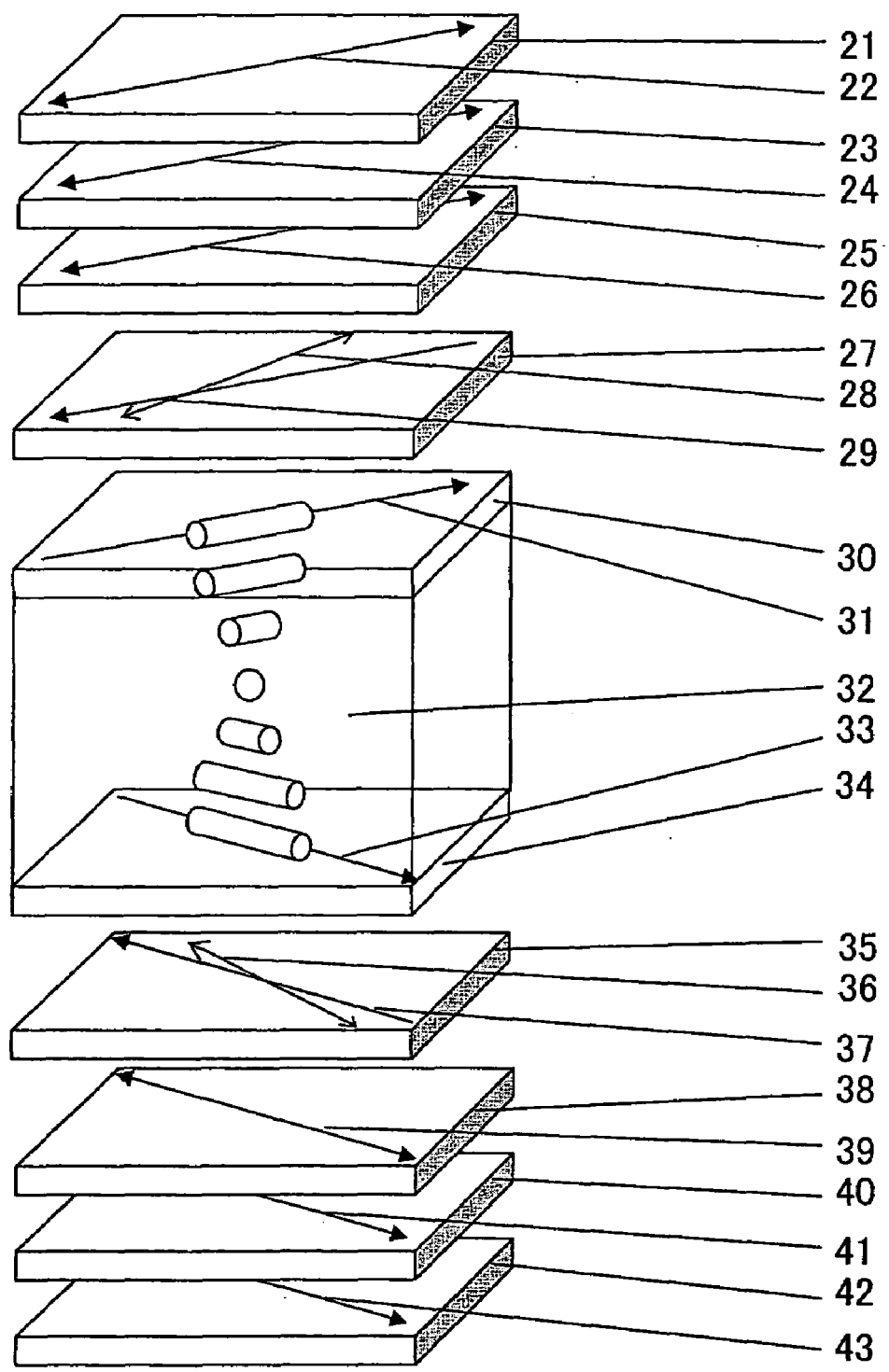
FIG. 2 is a schematic view of one example of a liquid-crystal display falling within the scope of the second embodiment of the present invention.

The liquid-crystal display shown in FIG. 2 comprises a liquid-crystal cell comprising an upside substrate 30 and a downside substrate 34 and a liquid-crystal layer formed of liquid-crystal molecules 32 sandwiched in between the substrates 30 and 34. Alignment layers may be formed on the faced surfaces, contacting liquid-crystal molecules 32, of the substrates 30 and 34. Alignment axes (such as rubbing axes) 31 and 33 are formed on the faced surfaces by any treatment such as a rubbing treatment, and orientations of liquid-crystal molecules 32 are controlled by the alignment axes 31 and 33 in the field-free state or in the low-field state. And electrodes (not shown in FIG. 2), which can apply the field to liquid-crystal molecules 32, are formed on the faced surfaces of the substrates 30 and 34.

It is preferred that the liquid-crystal cell employed in the liquid-crystal display shown in FIG. 2 is a TN-mode cell. According to a liquid-crystal display employing a TN-mode, liquid-crystal molecules in the cell are substantially parallel to a substrate plane while not being applied the driven voltage, or in other words in a non-driven state, and the orientations of the molecules are twisted between the upside and the downside substrate. For note-type PCs and panels used in monitors, the twist angle may be set to 90°, and for panels used in mobile phones, the twist angle may be set to an angle falling within a range from 40° to 80°. As the applied voltage is increased, liquid-crystal molecules are gradually tilted vertically against the substrate plane with eliminating the twist.

For a TN-mode liquid-crystal cell, the preferred value of product ($\Delta n \cdot d$) of a thickness of a liquid-crystal layer, d(μm), and a refractive-index anisotropy, $\Delta n$, is 0.2 to 1.2 μm and the more preferred value is 0.2 to 0.5 μm. And the preferred twist angle of the liquid-crystal layer is from 80 to 100° and the more preferred twist angle is from 85 to 95°. When the twist angle is set in the range, the liquid-crystal display, giving a high brightness in a white state and wide viewing angle, can be obtained. The angle between the rubbing axes formed on the faced surfaces of the substrates 5 and 8 is set within a range from 80 to 100°, and, thus, a liquid-crystal layer, having a twist angle falling within a range from 80 to 100°, may be produced.

When the angles between the rubbing axes formed on the surfaces of the substrates 30 and 34 is set to greater than 0° and less than 100°, the liquid-crystal cell having a twist angle of liquid-crystal molecules 32 falling within a range greater than 0° and less than 100°. For example, providing that the horizontal (right and left) direction is an axis of 0°, a substrate having a surface subjected to a rubbing treatment in a direction along with around −45° rubbing axis may be disposed at an observed side, a substrate having a surface subjected to a rubbing treatment in a direction along with around +45° rubbing axis may be disposed at a backlight side.

According to a liquid-crystal display employing a normally white-mode, the black voltage, $V_B$, is higher than the white voltage, $V_W$, and a downward curve is obtained as a characteristic curve of a voltage to a frontal transmittance, hereinafter referred to as "V-T curve". However, the V-T curve may have a local minimal brightness at a $V_I$ which is near to the black voltage, $V_B$, under an observation-condition such that grayscale inversion occurs (for example, observation from the downside of the display). Driving the liquid-crystal display with a voltage lower than the usual black voltage, $V_B$, can contribute to avoiding such a phenomenon and to preventing grayscale inversion. According to the second embodiment of the present invention, it is preferred that the liquid-crystal display is driven with the black voltage not greater than a voltage capable of performing a transmittance equal to $T_{15}+0.001\times(T_0-T_{15})$ where $T_0$ and $T_{15}$ mean frontal transmittances obtained respectively while being applied actual values of 0V and 15V.

It is noted that, according to normally black liquid-crystal displays employing an IPS-mode or a VA-mode, a upward curve is obtained as a V-T curve, and, thus, for preventing grayscale inversion, it is preferred that the liquid-crystal displays are driven with the black voltage not smaller than a voltage capable of performing a transmittance equal to $T_{15}+0.001\times(T_0-T_{15})$ since the magnitude-relationship between $T_{15}$ and $T_0$ is reversed.

Material in the liquid-crystal cell may be selected from any nematic liquid-crystal materials, and not to be limited to specific types. If the liquid-crystal having a greater anisotropy of dielectric constant, $\Delta\in$, is used, the smaller driving voltage is required. If the liquid-crystal having a smaller anisotropy of refractive index, $\Delta n$, is used, the greater thickness of the liquid-crystal layer (a greater gap) may be allowed, the shorter time may be spent for pouring liquid-crystal material and unevenness of the gap may be reduced. On the other hand, if the liquid-crystal having a greater anisotropy of refractive index, $\Delta n$, is used, the thinner thickness of the liquid-crystal layer may be allowed, and the faster response may be preformed.

The liquid-crystal display shown in FIG. 2 comprises a pair of polarizing films 23 and 40. Tow optically anisotropic layers 27 and 35 are disposed symmetrically on either side of the liquid-crystal cell, or in other words respectively disposed between the liquid-crystal cell and the pair of the polarizing plates, to compensate the liquid-crystal cell optically. The optically anisotropic layers 27 and 35 are respectively formed of a composition comprising at least one liquid-crystal compound. In the optically anisotropic layer 27 or 35, molecules of the liquid-crystal compound are aligned along with a rubbing axis 29 or 37 and fixed in the alignment state. And the linear polarizing films 23 and 40 are disposed such that their absorption axes 24 and 41 are at right angles to each other. Although the example comprising two optically anisotropic layers is shown in FIG. 2, according to the second embodiment, only one optically anisotropic may be disposed either an observed-side or a backlight-side of the liquid-crystal cell. It is preferred that at least one optically anisotropic layer is disposed both of the observed-side and the backlight-side. The optically anisotropic layer having an optical activity may be used in the second embodiment.

The optical quenching axes 28 and 36 of the optically anisotropic layers 27 and 35 are not parallel to the alignment axes 31 and 33 of the substrates 30 and 34 disposed nearer than another respectively. It is preferred that the optical quenching axes 28 and 36 of the optically anisotropic layers 27 and 35 intersect with the alignment axes 31 and 33 of the substrates 30 and 34 disposed nearer than another respectively at an angle not smaller than 0.1° (more preferred at an angle not smaller than 0.3°, and much more preferred at an angle not smaller than 0.5°). The upper limit of the intersecting angle is desirably 5°, more desirably 4°, much more desirably 3° and further much more desirably 2.5°. It is also preferred that the intersecting angle falls within a range from the any lower limit to the any upper limit described above.

And the optical quenching axes 28 and 36 of the optically anisotropic layers 27 and 35 are not parallel to the absorption axes 24 and 41 of the polarizing films 23 and 40 disposed nearer than another respectively. It is preferred that the optical quenching axes 28 and 36 of the optically anisotropic layers 27 and 35 intersect with the absorption axes 24 and 41 of the polarizing films 23 and 40 disposed nearer than another respectively at an angle not smaller than 0.1° (more preferred at an angle not smaller than 0.3°, and much more preferred at an angle not smaller than 0.5°). The upper limit of the intersecting angle is desirably 20°, more desirably 15°, much more desirably 10° and further much more desirably 2°. It is also preferred that the intersecting angle falls within a range from the any lower limit to the any upper limit described above.

The absorption axes 24 and 41 of the polarizing films 23 and 40 are not parallel to the alignment axes 31 and 33 of the substrates 30 and 34 disposed nearer than another respectively. It is preferred that The absorption axes 24 and 41 of the polarizing films 23 and 40 intersect with the alignment axes 31 and 33 of the substrates 30 and 34 disposed nearer than another respectively at an angle not greater than 5° (more preferred at an angle not greater than 2°, and much more preferred at an angle not greater than 0.5°).

Although the liquid-crystal display, shown in FIG. 2, comprises an upside polarizing plate consisting of the polarizing film 23 and a pair of protective films 21 and 25 sandwiching the polarizing film 23 and a downside polarizing plate consisting of the polarizing film 40 and a pair of protective films 38 and 42 sandwiching the polarizing film 40, the protective films 25 and 38 being respectively disposed nearer to the liquid-crystal cell than to another may be also used for supporting the optically anisotropic layers 27 and 35. And before being employed in the liquid-crystal display, the polarizing plates 23 and 40 or the protective films 25 and 38 may be bonded to the optically anisotropic layers 27 and 35 respectively. According to the second embodiment of the present invention, an integrated-type elliptically polarizing plate, comprising, in this order, a transparent protective film, a linear polarizing film, a transparent protective film (functioning as a transparent substrate for supporting an optically anisotropic layer) and optically anisotropic layer, can be used. Using such an integrated-type elliptically polarizing plate, it is possible to optically compensate a liquid-crystal display precisely without introducing complexity into the configuration of the liquid-crystal display. In a liquid-crystal-display, the integrated polarizing plate may be disposed such that a transparent protective film, a linear polarizing film, a transparent support and an optically anisotropic layer are disposed in this order from the outside of the display (far from the position of the liquid-crystal cell).

Third Embodiment

The third embodiment of the present invention relates to a normally white mode liquid-crystal display comprising:

a pair of substrates disposed facing each other, and at least one of which has an electrode, a liquid-crystal layer being sandwiched in between the pair of substrates and comprising liquid-crystal molecules aligned along with alignment axes respectively formed on facing surfaces of the pair of substrates, and a pair of polarizing plates disposed sandwiching the liquid-crystal layer, comprising a linear polarizing film and at least one optically anisotropic layer having an in-plane retardation falling within a range from 30 to 80 nm;

wherein an optical quenching axis of the at least one optically anisotropic layer is not parallel to an absorption axis of the linear polarizing film, an alignment state of the liquid-crystal molecules in the liquid-crystal layer changes depending on an applied-field thereby to vary an in-pale retardation of the liquid-crystal layer, and a difference between an in-plane retardation generated by intersecting the optical quenching axis of the optically anisotropic layer with the absorption axis of the linear polarizing film and a residue in-plane retardation in the liquid-crystal layer is minimum when a transmittance is minimum.

One feature of the third embodiment of the present invention resides in that the difference between the retardation (the product of the thickness d, and the refractive index anisotropy, Δn, of the liquid-crystal layer) of the liquid-crystal cell and the retardation of the optical compensatory layer is adjusted. And, thus, the liquid-crystal display, especially the TN-mode liquid-crystal display, of the third embodiment can display soft middle tone images without grayscale inversion in an oblique direction. The meanings of "grayscale inversion", "loss in grayscale differentiation" and "grayscale inversion angle" are identical to those described for the second embodiment of the present invention.

Liquid-crystal displays wherein neither grayscale inversion nor loss in grayscale differentiation is observable can display soft middle tone images and are suitable for a TV or the like.

For the third embodiment of the present invention, a transmittance for zero-gradient is represented by T(0), T(31) is a transmittance for 31th-gradient and a transmittance for 255th-gradient is represented by T(255), providing that a black state is a zero-gradient and a white state is a 255th-gradient and brightness between the black and white states are divided into 254 levels, or in other words 256 gradients displaying is performed. According to the third embodiment, the values calculated based on these values are uses as a indicator of the degree of loss in grayscale differentiation. Specific matters will be explained later.

The third embodiment of the present invention also relates to an elliptically polarizing plate comprising:

a linear polarizing film and at least one optically anisotropic layer wherein an optical quenching axis is not parallel to an absorption axis of the linear polarizing film and an in-plane retardation of the optically anisotropic layer falls within a range from 30 to 80 nm. The third embodiment comprises an optically anisotropic layer having an in-plane retardation falling within a specific range and having an optical quenching axis disposed not parallel to the absorption axis of a polarizing film. And, thus, the liquid-crystal display, especially the TN-mode liquid-crystal display, of the third embodiment, is improved in a grayscale inversion angle in a down direction without lowering a frontal grayscale.

The meaning of "optical quenching" is identical to that described for the second embodiment of the present invention.

Next, an example of a TN-mode liquid-crystal display employing the third embodiment of the present invention will be described with referent to FIG. 3.

Figure 3:
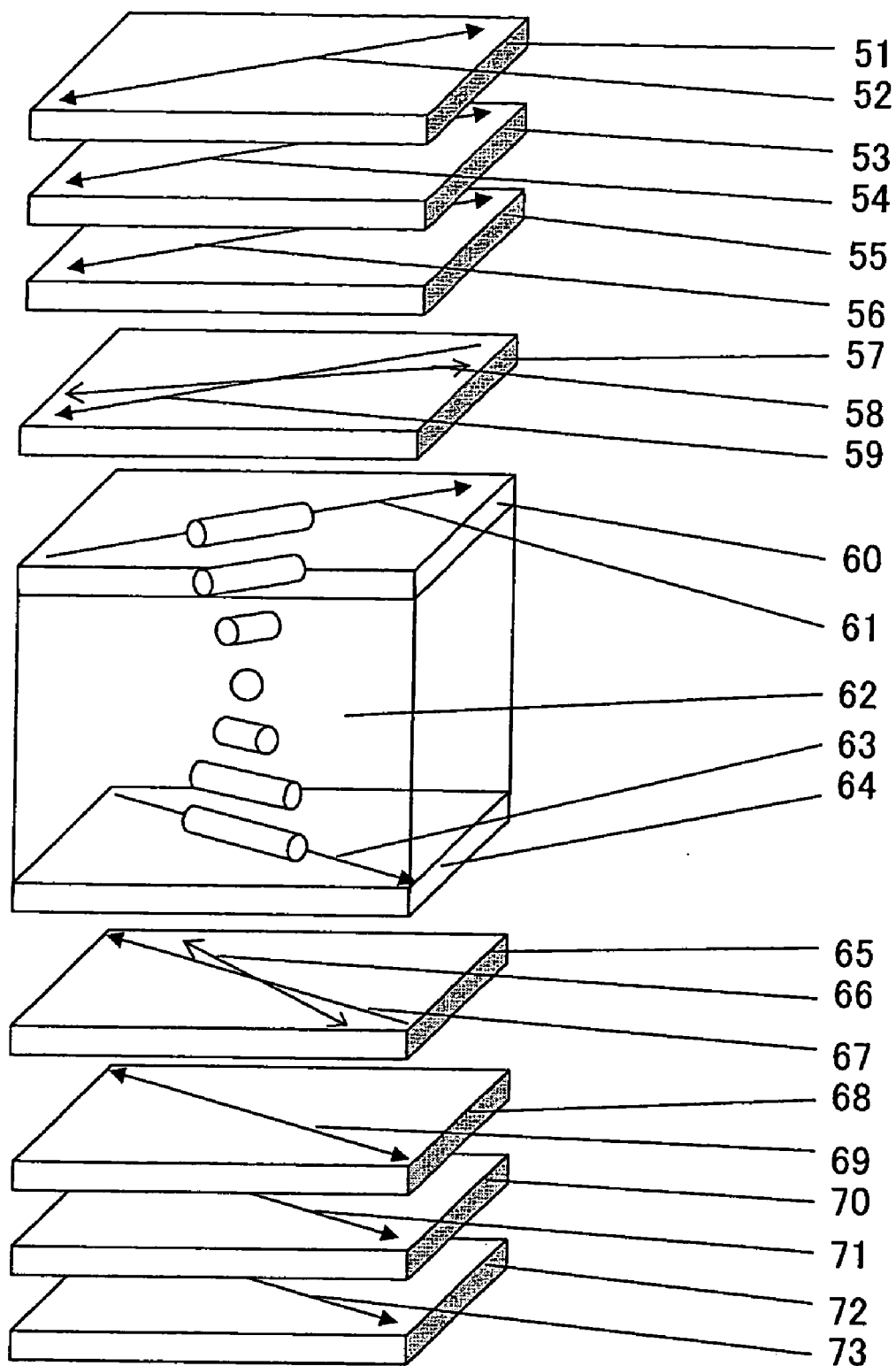
FIG. 3 is a schematic view of one example of a liquid-crystal display falling within the scope of the third embodiment of the present invention.

The liquid-crystal display shown in FIG. 3 comprises a liquid-crystal cell comprising an upside substrate 60 and a downside substrate 64 and a liquid-crystal layer formed of liquid-crystal molecules 62 sandwiched in between the substrates 60 and 64. Alignment layers may be formed on the faced surfaces, contacting liquid-crystal molecules 62, of the substrates 60 and 64. Alignment axes (such as rubbing axes) 61 and 63 are formed on the faced surfaces by any treatment such as a rubbing treatment, and orientations of liquid-crystal molecules 62 are controlled by the alignment axes 61 and 63 in the field-free state or in the low-field state. And electrodes (not shown in FIG. 3), which can apply the field to liquid-crystal molecules 62, are formed on the faced surfaces of the substrates 60 and 64.

The liquid-crystal display shown in FIG. 3 comprises a pair of polarizing films 53 and 65 disposed on either side of the liquid-crystal cell. Tow optically anisotropic layers 57 and 65 are disposed symmetrically on either side of the liquid-crystal cell, or in other words respectively disposed between the liquid-crystal cell and the pair of the polarizing plates, to compensate the liquid-crystal cell optically. The optically anisotropic layers 57 and 65 are respectively formed of a composition comprising at least one liquid-crystal compound. In the optically anisotropic layer 57 or 65, molecules of the liquid-crystal compound are aligned along with a rubbing axis 59 or 67 and fixed in the alignment state. And the linear polarizing films 53 and 70 are disposed such that their absorption axes 54 and 71 are at right angles to each other. Although the example comprising two optically anisotropic layers is shown in FIG. 3, according to the third embodiment, only one optically anisotropic may be disposed either an observed-side or a backlight-side of the liquid-crystal cell. It is preferred that at least one optically anisotropic layer is disposed both of the observed-side and the backlight-side. The optically anisotropic layer having an optical activity may be used in the second embodiment.

The optically anisotropic layers 57 and 65 have an in-plane retardation falling within a specific range. The in-plane retardations of the optically anisotropic layers 57 and 65 may be respectively decided depending on Δnd of the liquid-crystal layer 62. The preferred ranges of the in-plane retardations of the optically anisotropic layers 57 and 65 and Δnd of the liquid-crystal layer 62 will be described later. The retardations in a thickness-direction of the optically anisotropic layers 57 and 65 are desirably, but not to be limited to, from 70 to 400 nm, for the embodiment employing a TN-mode.

It is preferred that the optical quenching axes 58 and 66 of the optically anisotropic layers 57 and 65 intersect with the alignment axes 61 and 63 of the substrates 60 and 64 disposed nearer than another respectively at an angle from 0.1 to 5°, more preferred at an angle from 0.3 to 4°, and much more preferred at an angle from 0.5 to 2.5°.

And it is preferred that the optical quenching axes 58 and 66 of the optically anisotropic layers 57 and 65 intersect with the absorption axes 54 and 71 of the polarizing films 53 and 70 disposed nearer than another respectively at an angle from 0.1 to 20°, more preferred at an angle from 0.3 to 15°, and much more preferred at an angle from 0.5 to 10°.

It is preferred that the absorption axes 54 and 71 of the polarizing films 53 and 70 intersect with the alignment axes 61 and 63 of the substrates 60 and 64 disposed nearer than another respectively at an angle not greater than 5° (more preferred at an angle not greater than 2°, and much more preferred at an angle not greater than 0.5°).

Although the liquid-crystal display, shown in FIG. 3, comprises an upside polarizing plate consisting of the polarizing film 53 and a pair of protective films 51 and 55 sandwiching the polarizing film 53 and a downside polarizing plate consisting of the polarizing film 70 and a pair of protective films 72 and 68 sandwiching the polarizing film 40, the protective films 55 and 68 being respectively disposed nearer to the liquid-crystal cell than to another may be also used for supporting the optically anisotropic layers 57 and 65. And before being employed in the liquid-crystal display, the polarizing plates 53 and 70 or the protective films 55 and 68 may be bonded to the optically anisotropic layers 57 and 65 respectively. According to the third embodiment of the present invention, an integrated-type elliptically polarizing plate, comprising, in this order, a transparent protective film, a linear polarizing film, a transparent protective film (functioning as a transparent substrate for supporting an optically anisotropic layer) and optically anisotropic layer, can be used. Using such an integrated-type elliptically polarizing plate, it is possible to optically compensate a liquid-crystal display precisely without introducing complexity into the configuration of the liquid-crystal display. In a liquid-crystal-display, the integrated polarizing plate may be disposed such that a transparent protective film, a linear polarizing film, a transparent support and an optically anisotropic layer are disposed in this order from the outside of the display (far from the position of the liquid-crystal cell).

It is preferred that the liquid-crystal cell employed in the liquid-crystal display shown in FIG. 3 is a TN-mode cell. According to a liquid-crystal display employing a TN-mode, liquid-crystal molecules in the cell are substantially parallel to a substrate plane while not being applied the driven voltage, or in other words in a non-driven state, and the orientations of the molecules are twisted between the upside and the downside substrate. For note-type PCs and panels used in monitors, the twist angle may be set to 90°, and for panels used in mobile phones, the twist angle may be set to an angle falling within a range from 40° to 80°. As the applied voltage is increased, liquid-crystal molecules are gradually tilted vertically against the substrate plane with eliminating the twist.

Material in the liquid-crystal cell may be selected from any nematic liquid-crystal materials, and not to be limited to specific types. If the liquid-crystal having a greater anisotropy of dielectric constant, $\Delta\in$, is used, the smaller driving voltage is required. And the preferred twist angle of the liquid-crystal layer is grater than 0° and less than 100° and more preferred twist angle is from 85 to 95°. When the twist angle is set in the range, the liquid-crystal display, giving a high brightness in a white state and wide viewing angle, can be obtained. When the angles between the rubbing axes formed on the surfaces of the substrates 60 and 64 is set to greater than 0° and less than 100°, the liquid-crystal cell having a twist angle of liquid-crystal molecules 62 falling within a range greater than 0° and less than 100°. For example, providing that the horizontal (right and left) direction is an axis of 0°, a substrate having a surface subjected to a rubbing treatment in a direction along with around −45° rubbing axis may be disposed at an observed side, a substrate having a surface subjected to a rubbing treatment in a direction along with around +45° rubbing axis may be disposed at a backlight side.

According to a liquid-crystal display employing a normally white-mode, the black voltage, $V_B$, is higher than the white voltage, $V_W$, and a downward curve is obtained as a characteristic curve of a voltage to a frontal transmittance, hereinafter referred to as "V-T curve". However, the V-T curve may have a local minimal brightness at a $V_I$ which is near to the black voltage, $V_B$, under an observation-condition such that grayscale inversion occurs (for example, observation from the downside of the display). According to the third embodiment of the present invention, in order to avoid such a phenomenon, by using the optically anisotropic layer, having an in-plane retardation falling within a specific range and an optical quenching axis intersecting with an absorption axis of a polarizing film, the liquid-crystal layer is optically compensated; and by adjusting the difference between the in-plane retardation generated by intersecting the optical quenching axis of the optically anisotropic layer with the absorption axis of the linear polarizing film and a residue in-plane retardation in the liquid-crystal layer to the minimum value when a transmittance becomes the minimum value, or in other words in a black state, grayscale inversion is reduced. The orientations of liquid-crystal molecules in the liquid-crystal layer 62 vary depending on the applied-field, and, as a result, the in-plane retardation of the liquid-crystal layer 62 also varies. The difference between the in-plane retardation of the optically anisotropic layer and the value of Δnd also increases and decreases according to increase or decrease of the value of Δnd. If the difference in retardation between the optically anisotropic layer and the liquid-crystal layer becomes the minimum value with a brighter grayscale than black state, grayscale inversion tends to occur not only in an oblique direction such as a downward direction at 10° viewing angle but also in a normal direction. According to the third embodiment, by adjusting the difference between the in-plane retardation generated by intersecting the optical quenching axis of the optically anisotropic layer with the absorption axis of the linear polarizing film and a residue in-plane retardation in the liquid-crystal layer to the minimum value when a transmittance becomes the minimum value, or in other words in a black state, it is possible to prevent grayscale inversion from occurring and to display soft grayscale images.

It is noted that, for the embodiment comprising plural optically anisotropic layers, a sum of the in-plane retardations of the plural optically anisotropic layers is used as an in-plane retardation.

A TN-mode liquid-crystal cell usually has a Δnd, where d is a thickness of a liquid-crystal cell and Δn is anisotropy of refractive index, falling within a range from 0.2 to 1.2 μm. According to the third embodiment, the Δnd of the liquid-crystal cell is desirably from 0.3 to 0.45 μm, more desirably from 0.36 to 0.44 μm, much more desirably from 0.36 to 0.43 μm and further much more desirably from 0.38 to 0.41 μm. As the liquid-crystal cell having a Δnd falling within the above range, grayscale inversion hardly occurs, and yellow coloration hardly occurs in a white state. The preferred range of the Δnd of the liquid-crystal layer 62 may vary depending on the in-plane retardation of the optically anisotropic layers 57 and 65. For preventing grayscale inversion from occurring without lowering the image quality, the in-plane retardation of the optically anisotropic layers 57 and 65 is desirably set from 30 to 80 nm, and more desirably set from 48 to 74 nm, and the Δnd of the liquid-crystal layer is desirably set within the range described above, and especially desirably set from 0.36 to 0.43 μm.

It is also preferred that the liquid-crystal satisfies following relational expression:

$$0.005 < \{T(31) - T(0)\}/\{T(255) - T(0)\} < 0.02.$$

In the relational expression, T(0) is a transmittance for zero-gradient, T(31) is a transmittance for 31th-gradient and T(255) is a transmittance for 255th-gradient, providing that a black state is zero-gradient and a white state is 255th-gradient and brightness between the black and white states are divided into 254 levels.

By satisfying the above relational expression, no loss in grayscale differentiation occurs, images even with dark grayscale can be made clear and high grayscale images can be obtained. From such viewpoints, the value of $\{T(31)-T(0)\}/\{T(255)-T(0)\}$ is desirably set from 0.01 to 0.02 and more desirably set from 0.015 to 0.02.

Although TN-mode liquid-crystal displays are shown in FIGS. 1 to 3, the embodiments of the present invention may employ a VA-mode, an IPS-mode, an OCB-mode or an ECB-mode.

The configuration of the liquid-crystal display of the present invention is not limited to the embodiments shown in FIGS. 1 to 3, and may further comprise other members. A color filter may be disposed between the liquid-crystal layer and the polarizing film. And an antireflection treatment or a hard coat treatment may be applied to the surface of the protective film of the polarizing film. Conductive members may be used. For the transmissive mode, a back light having a light source such as a cold cathode, a hot cathode fluorescent tube, light-emitting diode, field-emission element or electroluminescent element may be disposed at a back face. A reflective polarizing plate, a prism sheet or an optical waveguide may be also disposed between the liquid-crystal layer and the back-light. The liquid-crystal display of the present invention may be reflective-mode LCD, and in such an embodiment, single polarizing plate may be disposed at viewing side and a reflective film may be disposed a back face or an inner face of the under-side liquid-crystal cell. It is possible to dispose a front light having the light source described above at a viewing side of the liquid-crystal cell. The liquid-crystal display of the present invention may be semi-transmissive-mode LCD, and in such an embodiment, each pixel may comprise of a refractive part and a transmissive part to keep a balance between a transmissive-mode and a refractive-mode.

Embodiments of the present invention include direct types projection types and light modulation types. The embodiments of active-matrix liquid-crystal displays comprising a 3 or 2 terminal semiconductor device such as a TFT or a MIM are especially effective. The embodiments of passive matrix, or, in other words, time-division driving, liquid-crystal displays are effective as well as the above embodiments.

Next, various members which can be employed in the liquid-crystal displays of the present invention will be described in details.

According to the present invention, optically anisotropic layers formed of a composition comprising at least one liquid-crystal compound, in which molecules of the liquid-crystal compound are fixed in an alignment state, are used to optically compensate liquid-crystal cells. The optically anisotropic layer may be formed on a transparent substrate to give an optical compensatory sheet, and such an optical compensatory sheet may be employed in the liquid-crystal display of the present invention. And the optical compensatory sheet may be integrated with a linear polarizing film to give a polarizing plate, which may be a linear, a circularly or an elliptically polarizing plate, and such a polarizing plate may be employed in the liquid-crystal display of the present invention. The optical compensatory sheets or the polarizing plates having optical axes adjusted as described above may be produced according to any processes. For example, such optical compensatory sheets or the polarizing plates may be produced in the manner that the alignment directions or the stretching directions of films are adjusted with respect to the conveying direction of the films, or in the manner that films are stacked in roll to roll manner and the stacked films are punched out with a prescribed angular relations.

[Optical Compensatory Sheet]

One embodiment of the optical compensatory sheet, which can be employed in the present invention, comprises an optically-transparent substrate and an optically anisotropic layer formed of a composition comprising a liquid-crystal compound on the substrate. Used in a liquid-crystal display, the optical compensatory sheet can compensate a liquid-crystal cell optically without lowering other properties.

Materials which can be used for production of the optical compensatory sheet will be described in detail.

Substrate

The optical compensatory sheet may comprise a substrate. The angle between the slow axis of the transparent and the alignment direction such as a rubbing direction of liquid-crystal molecules in the optically anisotropic layer is, but not to be limited to, desirably from −30° to 30°, more desirably from −10° to 10° and much more desirably from −5° to 5°. The substrate is desirably selected from any glass plates and any transparent polymer films. The substrate preferably has a light transmission of not less than 80%. Examples of such polymers include cellulose esters (such as mono or tri acylates of cellulose, norbornene or derivatives thereof and polymethyl methacrylates. Commercially available polymer films such as "ARTON" or "ZEONEX" as a norbornene film may be used. The films formed of the polymers, which are commonly known as easy to develop birefringence, such as polycarbonates or polysulfones, may be also used after being modified by the process described in WO00/26705 thereby to reduce the development of birefringence.

Among these, cellulose esters are preferred, and cellulose esters of lower fatty acids are more preferred. In the specification, the term of "lower fatty acid" is used any fatty acids having not greater than 6 carbon atoms. Especially, $C_{2-4}$ cellulose acylates are preferred, and cellulose acetate is more preferred. Cellulose esters of mixed fatty acids such as cellulose acetate propionate or cellulose acetate butyrate may be used. The viscosity-average degree of polymerization (DP) of the cellulose acetate is desirably not less than 250, and more desirably not less than 290. The Mw/Mn value (Mw is a weight-average molecular weight, and Mn is a number-average molecular weight) of the cellulose ester obtained by gel permeation chromatography desirably have a narrow distribution. In particular, the Mn/Mw is desirably from 1.0 to 1.7, and preferably from 1.0 to 1.65.

Polymer films of cellulose acetates having an acetylation rate from 55.0 to 62.5%, preferably from 57.0 to 62.0%, are desirably employed in the present invention as a transparent support. An acetylation rate means an amount of acetic acid bonding to cellulose per unit weight of cellulose. The acetylation rate can be measured according to the measurement and calculation of acetylation degree of ASTM:D-817-91 (tests of cellulose acetates and the like).

Generally, hydroxys of 2-, 3- and 6-positions in cellulose are not equally substituted in one third of the substituted degree in whole, and the substituted degree of hydroxy of 6-position tends to be lower than others. According to the present invention, the 6-position hydroxy is desirably higher than 2- and 3-positions. The 6-position is desirably substituted with an acyl group at from 30 to 40%, preferably not lower than 31%, more preferably not lower than 32%, of the substituted degree in whole. The substituted degree of the 6-position is desirably not lower than 0.88.

The examples of processes for producing cellulose acylates which can be desirably used in the present invention are described on page 9 in Kokai Giho No. 2001-1745 published in Mar. 5, 2001, by of Japan Institute of Invention and Innovation.

Retardation of Transparent Substrate

In the specification, $Re(\lambda)$ and $Rth(\lambda)$ respectively mean the values which are respectively calculated according to the following method.

In the specification, $Re(\lambda)$ and $Rth(\lambda)$ respectively mean an in-plane retardation and a retardation in a thickness-direction at wavelength $\lambda$. The $Re(\lambda)$ is measured by using KOBRA-21ADH (manufactured by Oji Scientific Instruments) for an incoming light of a wavelength $\lambda$ nm in a direction normal to a film-surface. The $Rth(\lambda)$ is calculated by using KOBRA-21ADH based on three retardation values; first one of which is the $Re(\lambda)$ obtained above, second one of which is a retardation which is measured for an incoming light of a wavelength $\lambda$ nm in a direction rotated by $+40°$ with respect to the normal direction of the film-surface around an in-plane slow axis, which is decided by KOBRA 21ADH, as an a tilt axis (a rotation axis), and third one of which is a retardation which is measured for an incoming light of a wavelength $\lambda$ nm in a direction rotated by $-40°$ with respect to the normal direction of the film-surface around an in-plane slow axis as an a inclining axis (a rotation axis). It is also required to enter a hypothetical mean refractive index and a thickness of the film. KOBRA 21ADH calculates nx, ny and nz as well as $Rth(\lambda)$.

For cellulose acetate films, 1.48 is entered as a mean refractive index. The mean refractive indexes of optical films other than cellulose acetate films are exemplified below:

cyclo-olefin polymer (1.52), polycarbonate (1.59), polymethyl methacrylate (1.49), polystyrene (1.59).

The mean refractive indexes of other various materials are described in published documents such as "POLYMER HANDBOOK" (JOHN WILEY & SONS, INC) and catalogs. If the values are unknown, the values may be measured with an abbe refractometer or the like.

The preferred retardation of the polymer film may be varied depending on factors such as types of the liquid-crystal cell to be compensated by the optical compensatory sheet or how to be used the optical compensatory sheet, in general, the polymer film desirably has a Re falling within a range from 0 to 200 nm and a Rth falling within a range from 0 to 400 nm.

Used in TN-mode, the polymer film desirably has a Re falling within a range from 0 to 200 nm and a Rth falling within a range from 0 to 150 nm. Used in VA-mode, the polymer film desirably has a Re falling within a range from 0 to 100 nm and a Rth falling within a range from 120 to 200 nm. Used in OCB-mode, the polymer film desirably has a Re falling within a range from 0 to 150 nm and a Rth falling within a range from 0 to 150 nm. Used in IPS-mode, the polymer film desirably has a Re falling within a range from 0 to 150 nm and a Rth falling within a range from 0 to 300 nm. When only one optically anisotropic cellulose acylate film is used in a liquid crystal display, the film desirably has a Rth falling within a range from 0 to 400 nm.

The retardation of the polymer film is usually controlled by applying external force such as stretching, and a retardation enhancer may be sometimes added to the polymer film to control the retardation. Aromatic compounds having two ore more aromatic rings may be used to control retardations of the polymer films, especially cellulose acetate films. The amount of the aromatic compound is preferably 0.01 to 20 wt % with respect to weight of cellulose acetate. One or more kinds of the aromatic compounds may be used.

The term of "aromatic ring" is used as a meaning including not only aromatic hydrocarbon rings but also aromatic hetero rings. The aromatic compounds contributing to increase of retardation are disclosed in EP0911656A2, JPA No. 2000-111914 and JPA No. 2000-275434.

The cellulose acetate film, which can be used in the present invention as a substrate, desirably has a coefficient of moisture absorption expansion of not greater than $30 \times 10^{-5}$/% RH, more desirably not greater than $15 \times 10^{-5}$/% RH and much more desirably not greater than $10 \times 10^{-5}$/% RH. The coefficient of moisture absorption expansion of the polymer film is preferably small, however, it is generally $1.0 \times 10^{-5}$/% RH or more.

In the Specification, a coefficient of moisture absorption expansion of a polymer film is variation in length of the polymer film depending on a variation in humidity at a constant temperature. A coefficient of moisture absorption expansion of a polymer film is measured by the method comprising the following processes:

hanging a polymer film sample, of which width is 5 mm and length is 20 mm, with an end of which is fixed and the other end of which is free, under 20% RH ($R_0$) at 25 □;

measuring a length ($L_0$) of the sample after leaving the sample under the above condition for 10 minutes with hanging a 0.5 g of weight on the free end of the sample;

measuring a length ($L_1$) of the sample after leaving the sample under 80% RH($R_1$) at a constant temperature, i.e. at 25 □;

and calculating a coefficient of moisture absorption expansion from the following formula with the $R_0$, $R_1$, $L_0$ and $L_1$:

A coefficient of moisture absorption expansion [/% RH]=$\{(L_1-L_0)/L_0\}/(R_1-R_0)$.

In order to lower the variation in dimension of the polymer film due to moisture absorption, a compound having a hydrophobic group or fine particles may be added to the polymer film. Examples of the compound having a hydrophobic group include plasticizer having a hydrophobic group such as an aliphatic group or an aryl group and antidegradation agents. These compounds may be added to a dope in an amount 0.01 to 10 wt %. In order to lower variation in dimension of a polymer film due to moisture absorption, the free volume of the polymer film may be lowered. In particular, for the polymer film prepared according to the flow-casting method, the free volume in the film varies with an amount of the residual solvent, used for preparation of the dope, in the film. The smaller residual amount is, the smaller variation in dimension is. The amount of the residual solvent in the polymer film is preferably 0.01 to 1 wt %.

Additives such as UW ray protective agents, parting agents, antistatic additives, anti-degradation agents (antioxidants, decomposers of peroxides, inhibitors of radicals, in-activators of metals, trapping agents of acids or amines or the like) or infrared absorbents, may be added to the polymer film for various purposes. Solid or oily state additives may be used. When the polymer film consists of plural layers, the types or the amounts of additives contained in the layers may be same or different each other. Preferred additives are described on pages 16 to 22 in Kokai Giho No. 2001-1745 published in Mar. 5, 2001, by of Japan Institute of Invention and Innovation. The amounts of the additives are desirably, but not to be limited to, from 0.001 to 25 wt % with respect to the total weight of the polymer film composition.

Process for Producing a Polymer Film (Substrate)

The cellulose acetate films that can be employed in the present invention as a transparent support are desirably prepared according to flow-casting method with a prepared solution (dope) of polymer. According to the flow-casting method, the dope is cast on a drum or band and dried on it to form a film. The solid content of the dope before casting is desirably from 18 to 35%. The surface of the band and drum are desirably applied mirror finish treatment.

The dope is desirably cast on the drum or band whose surface temperature is not higher than 10 degrees Celsius. After casting, the dope may be winded for not shorter than 2 seconds and dried. The solvent remained in the dope may be evaporated subsequently with hot-air whose temperature is changed stepwise from 100 to 160 degrees Celsius, after peeling the polymer film from the band or drum. The method is described in JP-B No. hei 5-17844. According to the method, it is possible to shorten the time from a casting step to a peeling step. In order to carry out the method, the dope is required to set to gel at the surface temperature on the drum or band for casting.

The film may be prepared by casting a polymer solution (dope) to form two or more layers.

Two or more dopes may be respectively cast on a drum or band from each of two or more casting outlets which are placed at some spaces each other along the moving direction of the drum or band. The two ore more layers of the dopes may be stacked to form a film (for example described in JPA No. hei 11-198285). The dope may be cast on a band or drum from two casting outlets to form a film (for example, described in JPA No. hei 6-134933). The casting method described in JPA No. sho 56-162617 may be used. According to the method, both of a high viscosity dope and a low viscosity dope are cast at once, so as that the flow of the high viscosity dope wrapped with the low viscosity dope, may be used. The process for producing the polymer film, which is used in the present invention, is not to be limited to these processes described above. The steps of the flow-casting method are described on pages 22 to 30 in Kokai Giho No. 2001-1745 published in Mar. 5, 2001, by of Japan Institute of Invention and Innovation, and these are divided into dissolving, flow-casting (or co-casting), drying, peeling and stretching and the like.

The polymer film (substrate) desirably has a thickness falling within a range from 15 to 120 μm, and more desirably from 30 to 80 μm.

Surface Treatment for the Polymer Film (Substrate)

The polymer film used in the present invention is preferably subjected to surface treatment. Examples of surface treatments include corona discharge treatment, glow discharge treatment, flame treatment, acid treatment, alkali treatment and UV irradiation treatment. These treatments are described in details on pages 30 to 32 in Kokai Giho No. 2001-1745 published in Mar. 5, 2001, by of Japan Institute of Invention and Innovation. Among these, alkali treatment is preferred, and alkali treatment is especially effective as surface treatment for cellulose acylate films.

Alkali saponification treatment may be carried out by dipping the polymer film in a saponification liquid or by coating a saponification liquid to the polymer film, and the coating process is preferred. Examples of the coating process include a dip-coating method, curtain-coating method, extrusion-coating method, bar-coating method and E-type coating method. Examples of the saponification liquid include potassium hydroxide solution and sodium hydroxide solution. The hydroxide ion concentration of the liquid is desirably from 0.1 to 3.0 N. The saponification liquid may comprise solvents having a good wettability for the polymer film such as isopropyl alcohol, n-butanol, methanol or ethanol; surfactants, wetting agents such as diols or glycerines. The ingredients contained in the saponification liquid are described in details in JPA No. 2002-82226 and WO02/46809.

Without or with carrying out surface treatment, one or two layers may be formed on the polymer film. According to a monolayer method (described in JPA No. hei 7-333433 or the like), an under coating layer or a polymer layer of a gelatin having both of a hydrophobic and hydrophilic groups is formed on the polymer film by coating method. According to a multilayer method (described in JPA No. hei 11-248940 or the like), a first layer, having a good adhesion to the polymer film, is formed on the polymer film, and a second layer of a hydrophilic polymer such as gelatin, having a good adhesion to an alignment layer, is formed on the first layer.

Alignment Layer

According to the present invention, liquid-crystal molecules in the optically anisotropic layer are aligned along with an alignment axis and fixed in the alignment state. One example of the alignment axis, which controls the alignment of liquid-crystal molecules, is a rubbing axis of an alignment layer formed disposed between the optically anisotropic layer and the polymer film (substrate). However, the alignment axis is not to be limited to a rubbing axis. The alignment layer has a function capable of aligning liquid-crystal molecules. The alignment layer is an essential element for carrying out the preferred embodiment of the present invention. However, according to the present invention, an alignment layer is not an essential element after fixing liquid-crystal molecules because the molecules fixed in an alignment state can keep the alignment without an alignment layer. Thus, after an optically anisotropic layer is formed on an alignment layer, only the optically anisotropic layer may be transferred from on the alignment layer to on another member such as a polarizing film, and in such case, the alignment layer is absent.

The alignment layer that can be employed in the present invention may be provided by rubbing a layer formed of an organic compound (preferably a polymer), oblique vapor deposition, the formation of a layer with microgrooves, or the deposition of organic compounds (for example, omega-tricosanoic acid, dioctadecylmethylammonium chloride, and methyl stearate) by the Langmuir-Blodgett (LB) film method. Further, alignment layers imparted with orientation functions by exposure to an electric or magnetic field or irradiation with light are also known.

The alignment layers formed by rubbing polymer layers are particularly desirable. The polymers for preparing the alignment layers may basically have a molecular structure capable of aligning discotic liquid-crystal molecules. According to the present invention, the polymer is desirably selected from polymers having such a molecular structure and further having a structural feature in which a main chain bounds to side chains containing a crosslinkable group (such as a double bonding); or polymers having a structural feature in which a main chain bounds to side chains containing a crosslinkable function group capable of aligning liquid-crystal molecules. The polymers may be selected from polymers capable crosslinking themselves or polymers to be crosslinked by any crosslinkable agent, and such polymers may be used in any combination.

Examples of the polymer used for preparing an alignment layer include methacrylate copolymers described in the column [0022] in JPA No. hei 8-338913, styrene copolymers, polyolefins, polyvinyl alcohols, modified polyvinyl alcohols, poly(N-methylol acrylamide), polyesters, polyimides, vinyl acetate copolymers, carboxymethylcelluloses and polycarbonates. Silane coupling agents are also used as a polymer. Water-solbule polymers such as poly(N-methylol acrylamide), carboxymethylcelluloses, gelatins, polyvinyl alcohols or modified polyvinyl alcohols are preferred; gelatins, polyvinyl alcohols and modified polyvinyl alcohols are more preferred; and polyvinyl alcohols and modified polyvinyl alcohols are much more preferred. Using plural polyvinyl alcohols or modified polyvinyl alcohols, they have a different polymerization degree each other, is especially preferred.

The saponification degree of the polyvinyl alcohol is desirably from 70 to 100%, and more desirably from 80 to 100%. The polymerization degree of the polyvinyl alcohol is desirably from 100 to 5000.

In usual, the side chain having a function capable of aligning discotic liquid-crystal molecules may have a hydrophobic group as a function group. The types of the function group may be decided depending on various factors such as types of the liquid-crystal compounds or desired alignment state. For example, the modified group can be introduced into the polyvinyl alcohol by copolymerization modification, chain-transfer modification or bloc-polymerization modification. Examples of the modified group include hydrophilic groups such as a carboxylic acid group, a sulfonic acid group, a phosphoric acid group, an amino group, an ammonium group, an amide group or a thiol group; $C_{10-100}$ hydrocarbon groups; hydrocarbon groups substituted with fluorine atoms; thioether groups, polymerizable groups such as an unsaturated polymerizable group, an epoxy group or an aziridile group; and alkoxysilyl groups such as tri-, di- or mono-alkoxysilyl group. Specific examples of such modified polyvinyl alcohols include those described in the columns [0022] to [0145] in JPA No. 2000-155216 and those described in the columns [0018] to [0022] in JPA No. 2002-62426.

It is possible to copolymerize a polymer in an alignment layer and a multi-functional monomer in an optically anisotropic layer, when the polymer in the alignment layer has a main chain bonding to side chains containing a crosslinkable functional group, or the polymer in the alignment layer has side chain being capable of aligning liquid-crystal molecules and containing a crosslinkable functional group. In such case, not only between the multi-functional monomers but also between the polymers in the alignment layer and the multi-functional monomers and the polymers in the alignment layer, the covalent bondings are formed and the bonding strengths are improved. Thus, in such case, the strength of the optical compensatory film can be remarkably improved.

The polymer in the alignment layer desirably has crosslinkable functional group containing a polymerizable group. Specific examples include those described in the columns of [0080] to [0100] in JPA No. 2000-155216.

The polymer in the alignment layer may be crosslinked by a crosslinkable agent. Examples of the crosslinkable agent include aldehydes, N-methylol compounds, dioxane derivatives, compounds to act when being activated their carboxyl groups, active vinyl compounds, active halogen compounds, isoxazoles and dialdehyde starches. Single or plural type of crosslinkable agents may be used. Specific examples of the crosslinkable agent include the compounds described in the columns [0023] to [0024] in JPA No. 2002-62426. Aldehydes having a high reaction-activity are preferred, and glutaraldehydes are more preferred.

The amount of the crosslinkable agent is desirable from 0.1 to 20 wt %, and more desirably 0.5 to 15 wt %, with respect to the weight of the polymer. The residual amount of the unreacted crosslinkable-agent in the alignment layer is desirably not greater than 1.0 wt %, and more desirably not greater than 0.5 wt %. When the residual amount falls within the range, the alignment layer has a sufficient durability, and even if the alignment is used in a liquid-crystal display for a long time, or is left under a high temperature and humidity atmosphere for a long time, no reticulation is appeared in the alignment layer.

The alignment layer may be prepared by applying a coating liquid, containing the above polymer, and, if necessary, the corsslinkable agent, to a surface of a transparent substrate, drying under heating (crosslinking), and performing a rubbing treatment. The crosslinking reaction may be carried out any time after applying the coating liquid. When a hydrophilic polymer such as polyvinyl alcohol is used for preparation of an alignment layer, the coating liquid is desirably prepared using a mixed solvent of an organic solvent such as methanol, exhibiting a deforming function, and water. The weight ratio of water to methanol is desirably from 0/100 to 99/1, and more desirably from 0/100 to 91/9. Using such a mixed solvent can prevent bubbles from generating, and can remarkably reduce defects in the surface of the alignment layer and the optically anisotropic layer.

The coating liquid may be applied by any known method such as a spin-coating method, a dip coating method, a curtain coating method, extrusion coating method, rod coating method, or roll coating method. The rod coating method is especially preferred. The thickness of the alignment layer after being dried is desirably from 0.1 to 10 micrometers. Drying may be carried out at 20 to 110° C. In order to form sufficient crosslinking, drying is desirably carried out at 60 to 100° C., and more desirably at 80 to 100° C. The drying may be continued for 1 minute to 36 hours, and desirably for 1 minute to 30 minutes. The pH is desirably set in a proper range for a crosslinkable agent to be used, and when glutaraldehyde is used, the pH is desirably set in a range from 4.5 to 5.5, and more desirably 5.

The alignment layer may be formed on a transparent substrate. The alignment layer can be obtained by applying a rubbing treatment to the surface of the polymer layer after crosslinking the polymer layer.

The rubbing treatment may be carried out according to any known treatment used in a liquid-crystal alignment step of LCD. For example, the rubbing treatment may be carried out by rubbing the surface of a polymer layer with a paper, a gauze, a felt, a rubber, a nylon fiber, polyester fiber or the like in a direction. Usually, the rubbing treatment may be carried out by rubbing a polymer layer with a fabric in which fibers having a uniform length and line thickness are implanted averagely at several times.

Next, the liquid-crystal molecules are aligned on the alignment layer. After that, if necessary, the reaction between the polymers in the alignment layer and the multi-functional monomers in the optical compensatory film may be carried out, or the crosslinking reaction of the polymers in the alignment layer with a crosslinkabkle agent may be carried out. The thickness of the alignment layer is desirably from 0.1 to 10 micrometers.

Optically Anisotropic Layer

Next, the optically anisotropic layer formed on a composition comprising a liquid-crystal compound will be described in details. The optically anisotropic layer may be designed for compensating a liquid-crystal cell in black. The alignment state of the liquid-crystal cell in black is varied depending on a mode which is employed in the liquid-crystal display. The various alignment states of liquid-crystal cells are described on pages 411 to 414 in in IDW'00, FMC7-2.

According to the present invention, the optically anisotropic layer comprises molecules of a liquid-crystal compound aligned along with an alignment axis and fixed in the alignment state.

In the present invention, examples of liquid crystal compounds employed in optically anisotropic layers include both of rod-like and discotic liquid crystal compounds and both of high and low molecular weight liquid crystal compounds. Additionally, the examples also include compounds no longer exhibiting liquid crystallinity after being cross-linked for formation of layers, in spite of originally exhibiting liquid crystallinity. When rod-like liquid-crystal compound is used for producing the optically anisotropic layer, it is preferred that rod-like molecules in the layer are aligned such that the mean direction of the long axes of the rod-like molecules projected on the substrate plane is parallel to the alignment axis (for example a rubbing direction). When discotic liquid-crystal compound is used for producing the optically anisotropic layer, it is preferred that discotic molecules in the layer are aligned such that the mean direction of the short axes of the discotic molecules projected on the substrate plane is parallel to the alignment axis (for example a rubbing direction). And, it is also preferred that the angle (tilt angle) between the disk planes of the molecules and the layer plane varies in depth-direction, or in other words, hybrid alignment described later is preferred.

Rod-Like Liquid-Crystal Molecule

Preferred examples of the rod-like liquid crystal compound, which can be used in the present invention, include azomethines, azoxys, cyanobiphenyls, cyanophenyl esters, benzoic acid esters, cyclohexanecarboxylic acid phenyl esters, cyanophenylcyclohexanes, cyano-substituted phenylpyrimidines, alkoxy-substituted phenylpyrimidines, phenyl dioxanes, tolans and alkenylcyclohexyl benzonitriles. Examples of the rod-like liquid crystal compounds further include metal complexes of liquid crystal compounds. Liquid crystal polymers having one or more repeating units including a rod-like liquid crystal structure can also be used in the present invention. Namely, the rod-like crystal compounds bonded to a polymer may be use in the present invention. Rod-like liquid crystal compounds are described in fourth, seventh and eleventh chapters of "Published Quarterly Chemical Review vol. 22 Chemistry of Liquid Crystals (Ekisho no Kagaku)" published in 1994 and edited by Japan Chemical Society; and in third chapter of "Handbook of liquid Crystal Devices (Ekisyo Debaisu Handobukku)" edited by the 142 th committee of Japan Society for the Promotion of Science.

The rod-like crystal compounds desirably have a birefringence index of 0.001 to 0.7. The rod-like crystal compounds desirably have one or more polymerizable groups for fixing themselves in an alignment state. The polymerizable group is desirably selected from radical-polymerizable unsaturated groups or cation-polymerizable groups. Examples of the rod-like crystal compounds having a polymerizable group are described in columns from [0064] to [0086] in JPA No. 2002-62427.

Discotic Liquid-Crystal Molecule

Examples of discotic liquid-crystal compounds include benzene derivatives described in "Mol. Cryst.", vol. 71, page 111 (1981), C. Destrade et al; truxane derivatives described in "Mol. Cryst.", vol. 122, page 141 (1985), C. Destrade et al. and "Physics lett. A", vol. 78, page 82 (1990); cyclohexane derivatives described in "Angew. Chem.", vol. 96, page 70 (1984), B. Kohne et al.; and macrocycles based aza-crowns or phenyl acetylenes described in "J. Chem. Commun.", page 1794 (1985), M. Lehn et al. and "J. Am. Chem. Soc.", vol. 116, page 2,655 (1994), J. Zhang et al. Examples of the discotic liquid crystal compounds also include compounds having a discotic core and substituents, radiating from the core, such as a linear alkyl or alkoxy group or substituted benzoyloxy groups. Such compounds exhibit liquid crystallinity. It is preferred that a discotic molecule or an aggregation of discotic molecules has a rotational symmetry. The Liquid crystal compounds employed in preparing optically anisotropic layers are not required to maintain liquid crystallinity after contained in the optically anisotropic layers. For example, when a low-molecular-weight liquid crystal compound, having a reacting group initiated by light and/or heat, is employed in preparation of an optically anisotropic layer, polymerization or cross-linking reaction of the compound is initiated by light and/or heat, and carried out, to thereby form the layer. The polymerized or cross-linked compounds may no longer exhibit liquid crystallinity. Preferred examples of the discotic liquid-crystal compound are described in JPA No. hei 8-50206, and examples of the polymerization of discotic liquid-crystal compounds are described in JPA No. Hei 8-27184 (1996-27284).

It is necessary to bond a polymerizable group as a substituent to the disk-shaped core of a discotic liquid-crystal molecule to better fix the discotic liquid-crystal molecules by polymerization. However, when a polymerizable group is directly bonded to the disk-shaped core, it tends to be difficult to maintain alignment during polymerization reaction. Accordingly, the discotic liquid-crystal molecules desirably have a linking group between the disk-shaped core and the polymerizable group, and it allow discotic molecules to be aligned in the alignment state after polymerization. Examples of such discotic liquid-crystal compound are described in columns from [0151] to [0168] in JPA No. 2000-155216.

Although it is not the actual condition, if it is expressed with an image, "hybrid alignment" means alignment in which an angle (hereinafter referred to as "a tilt angle") between a long axis direction of a liquid crystal compound and a horizontal plane of a layer formed of the compound changes in the thickwise direction of the layer. Examples of the manner of changing in a tilt angle include continuous increase, continuous decrease, intermittent increase, intermittent decrease, change comprising continuous increase and continuous decrease and intermittent change comprising increase and decrease. Embodiments of the intermittent changes comprise an area in which the tilt angle doesn't change in depth-direction. According to the present invention, it is preferred that the tilt angle increases or decreases as a whole whether the tilt angle change continuously or not. It is more preferred that the tilt angle increases as a whole with the position of the molecules being far from the substrate, and it is much more preferred that the tilt angle increases continuously as a whole with the position of the molecules being far from the substrate. Usually, direction of the mean direction of the long axes of discotic molecules at an-alignment layer interface can be set within a preferred range by selecting proper material for the alignment layer or selecting a proper rubbing treatment process. The direction of the disk-planes of discotic molecules at a surface, or in other words at an air-interface, can be set within a preferred range by selecting proper discotic compounds or selecting proper additives. Examples of the additives be used with discotic liquid-crystal compounds include plasticizers, surfactants, polymerizable monomers and polymers. The variation degree of alignment directions of the long axes can be also set within a preferred range by selecting by selecting proper discotic compounds or selecting proper additives.

Other Additives in an Optically Anisotropic Layer

Other additives such as plasticizers, surfactants or polymerizable monomers, may be used with the liquid-crystal compound. Such additives may contribute to improvement in uniformity of a coating layer, strength of a coating layer, alignment ability of liquid-crystal molecules or the like. Such additives are desirably selected from materials which can be mixed with the liquid-crystal compound compatibly and don't inhibit the alignment of the liquid-crystal compound.

The polymerizable monomer may be selected from radical-polymerizable or cation-polymerizable compounds, and desirably selected from radical-polymerizable compounds having a plural function group, and among them, the compounds which can copolymerize with the polymerizable liquid-crystal compound described above are preferred. Preferred examples of the polymerizable monomer include those described in the columns of [0018] to [0020] in JPA No. 2002-296423. In usual, the amount of the polymerizable monomer is desirably from 1 to 50 wt %, and more desirably from 5 to 30 wt %, with respect to the total weight of a single or plural liquid crystal compounds.

The surfactant may be selected from any known surfactants, and is desirably selected from fluoride-surfactants. More specifically, the compounds, described in the columns of [0028] to [0056] in JPA No. 2001-330725 are preferred.

Fluoride-polymers are also preferred, and copolymers having a fluoro-aliphatic group or a hydrophilic group are more preferred. Examples of the fluoride-polymer which can be used desirably in the present invention include, however not to be limited to, those shown below. Numerical values in formulae shown below mean wt % of each monomer, and Mw in formulae shown below mean PS-equivalent weight-average molecular weight measured by GPC. In the formulae, "a", "b", "c", "d" and the like mean weight ratios.

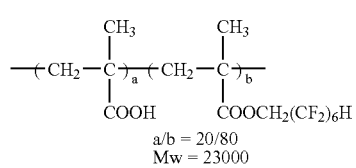

P-1

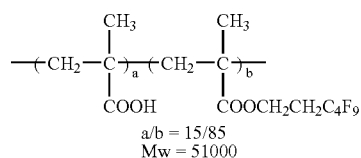

P-2

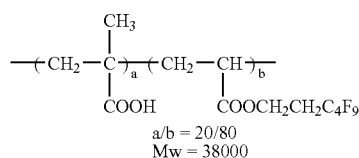

P-3

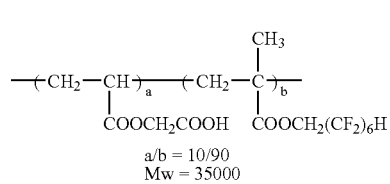

P-4

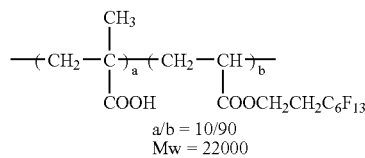

P-5

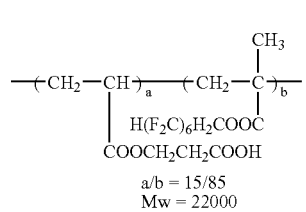

P-6

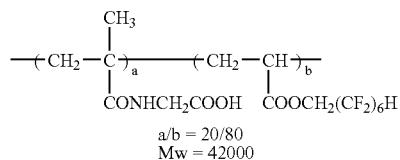

P-7

P-8

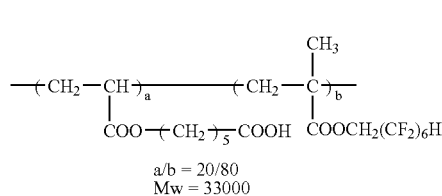

P-9

P-10

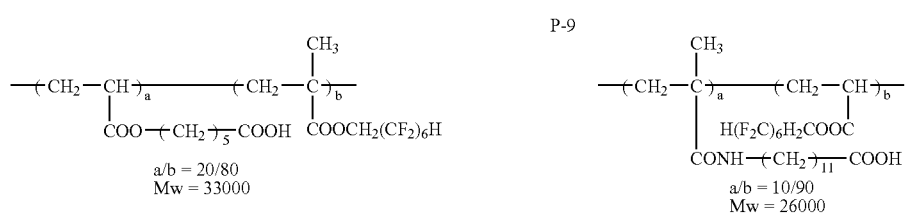

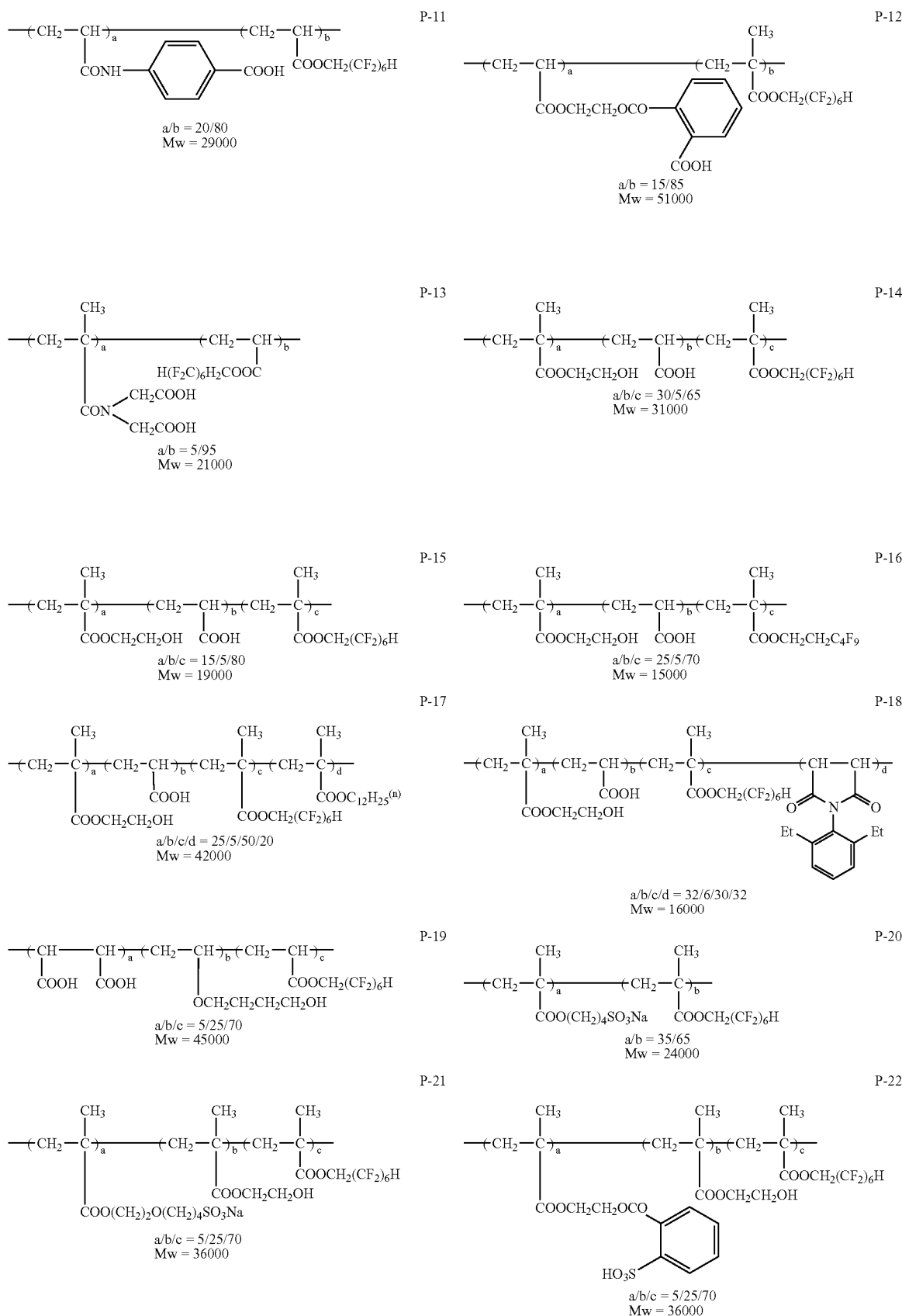

-continued
P-23
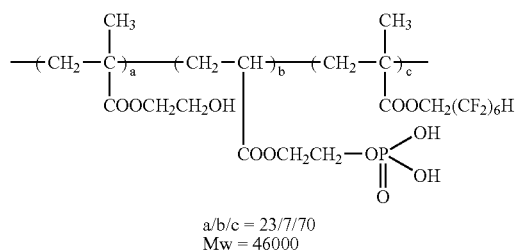
P-24
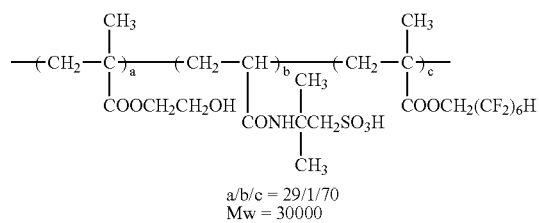
P-25
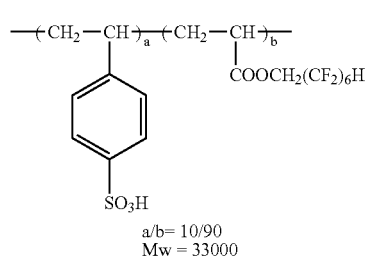
P-26
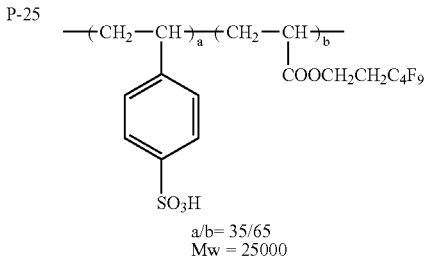
P-27
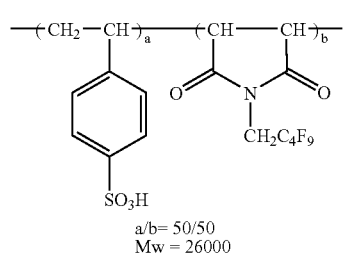
P-28
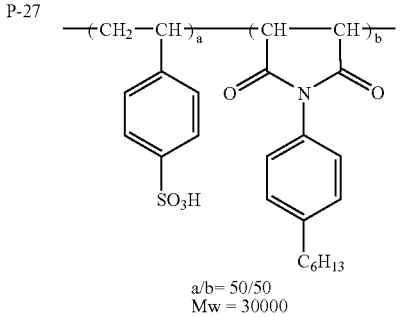
P-29
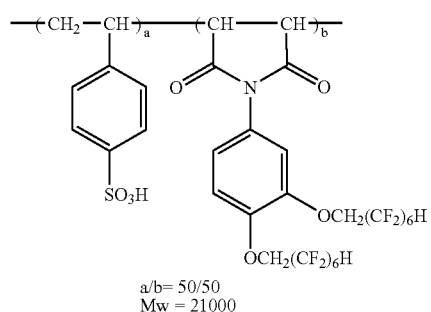
P-30
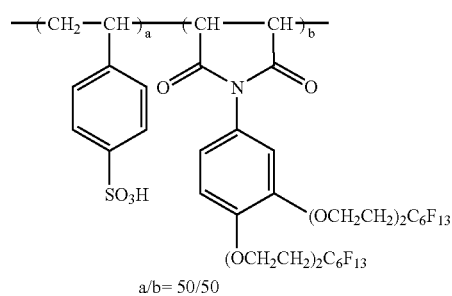
P-31
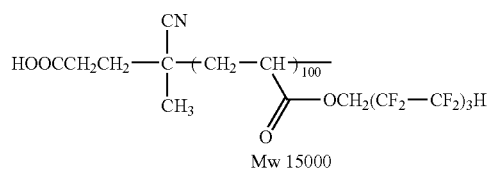
P-32
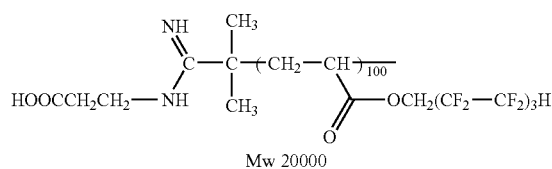
P-33
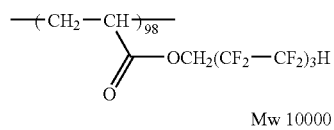
P-34
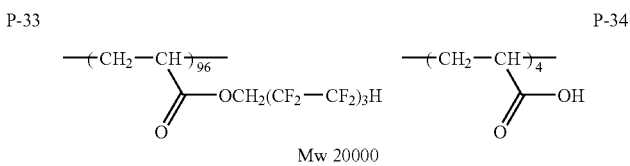

-continued
P-35
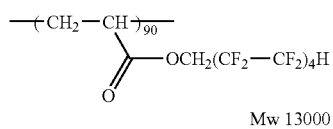 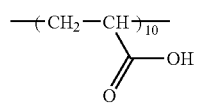
Mw 13000
P-36
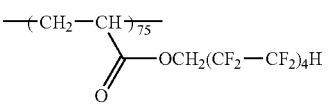 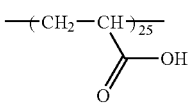
Mw 20000
P-37
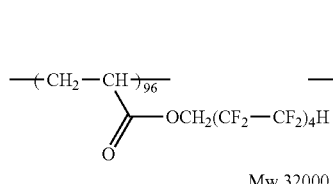 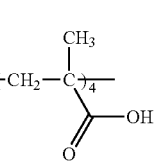
Mw 32000
P-38
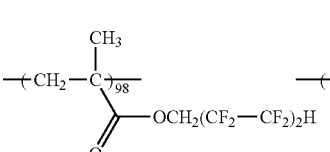 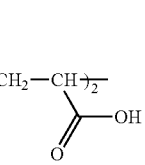
Mw 25000
P-39
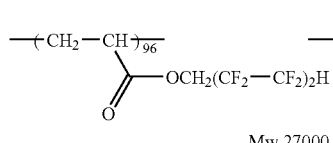 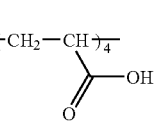
Mw 27000
P-40
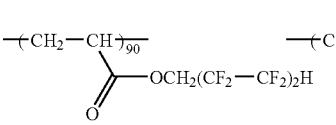 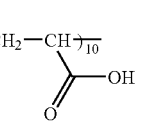
Mw 10000
P-41
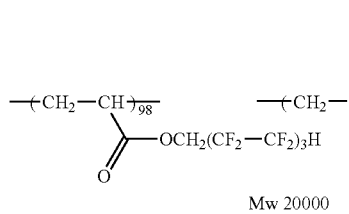 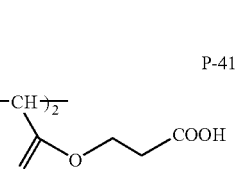
Mw 20000
P-42
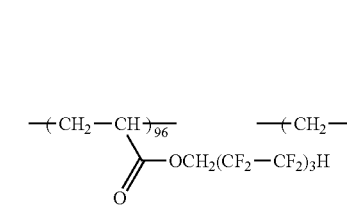
Mw 15000
P-43
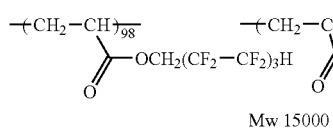 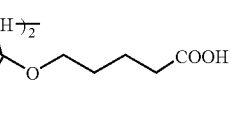
Mw 15000
P-44
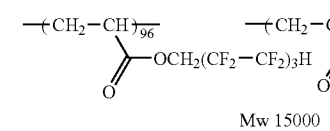
Mw 15000
P-45
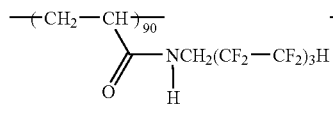 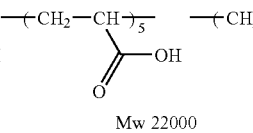 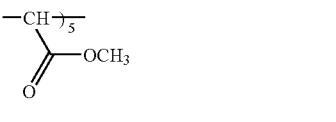
Mw 22000
P-46
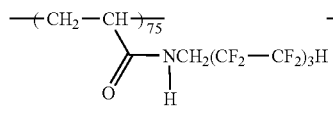 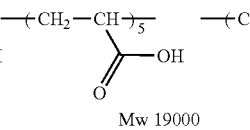 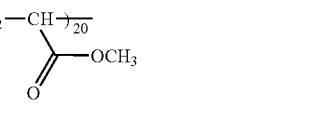
Mw 19000
P-47
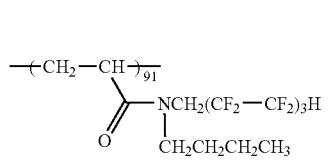 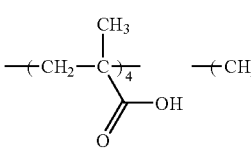 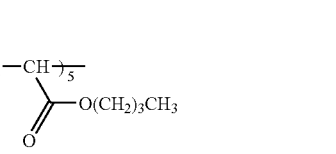
Mw 30000
P-48
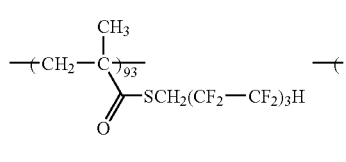 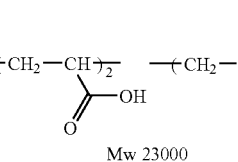 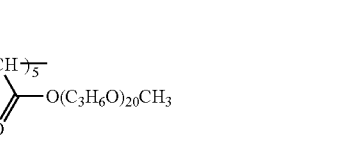
Mw 23000

-continued
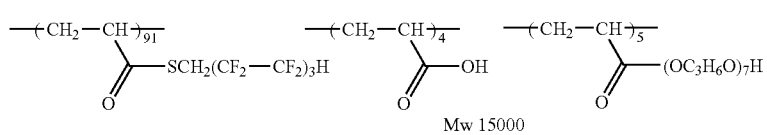
P-49
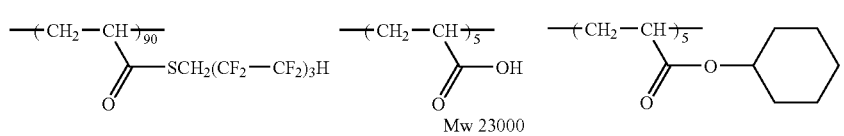
P-50
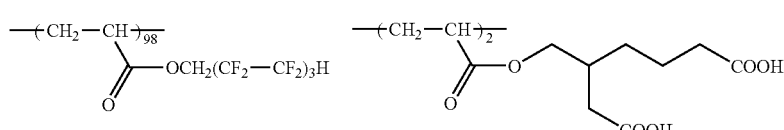
P-51
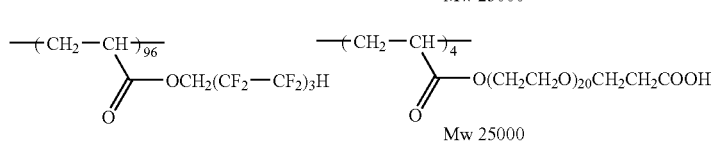
P-52
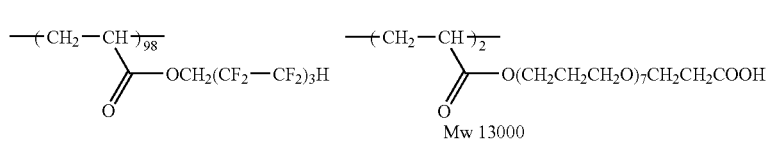
P-53
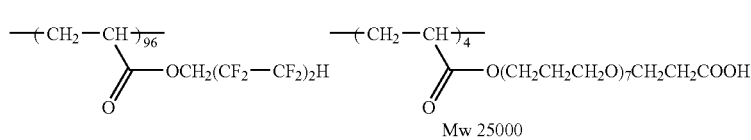
P-54
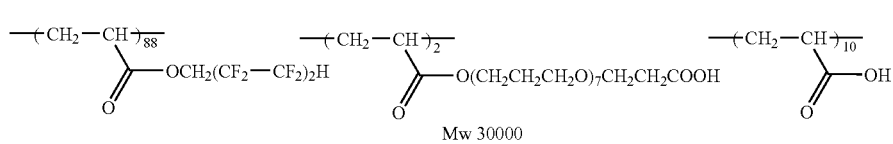
P-55
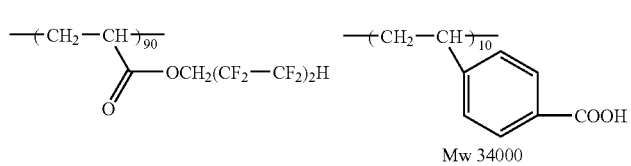
P-56
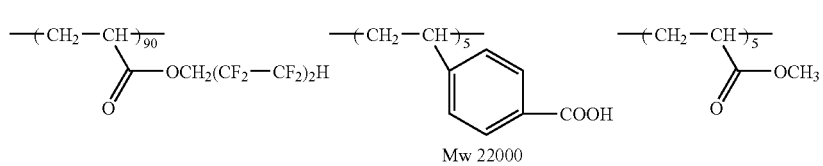
P-57
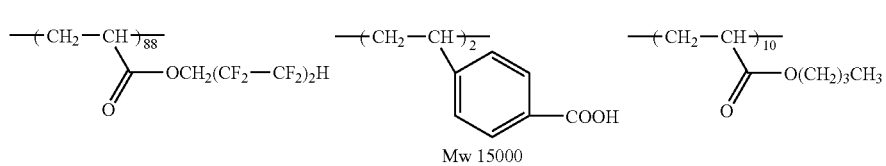
P-58
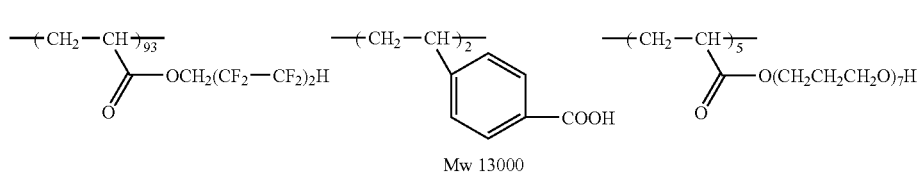
P-59

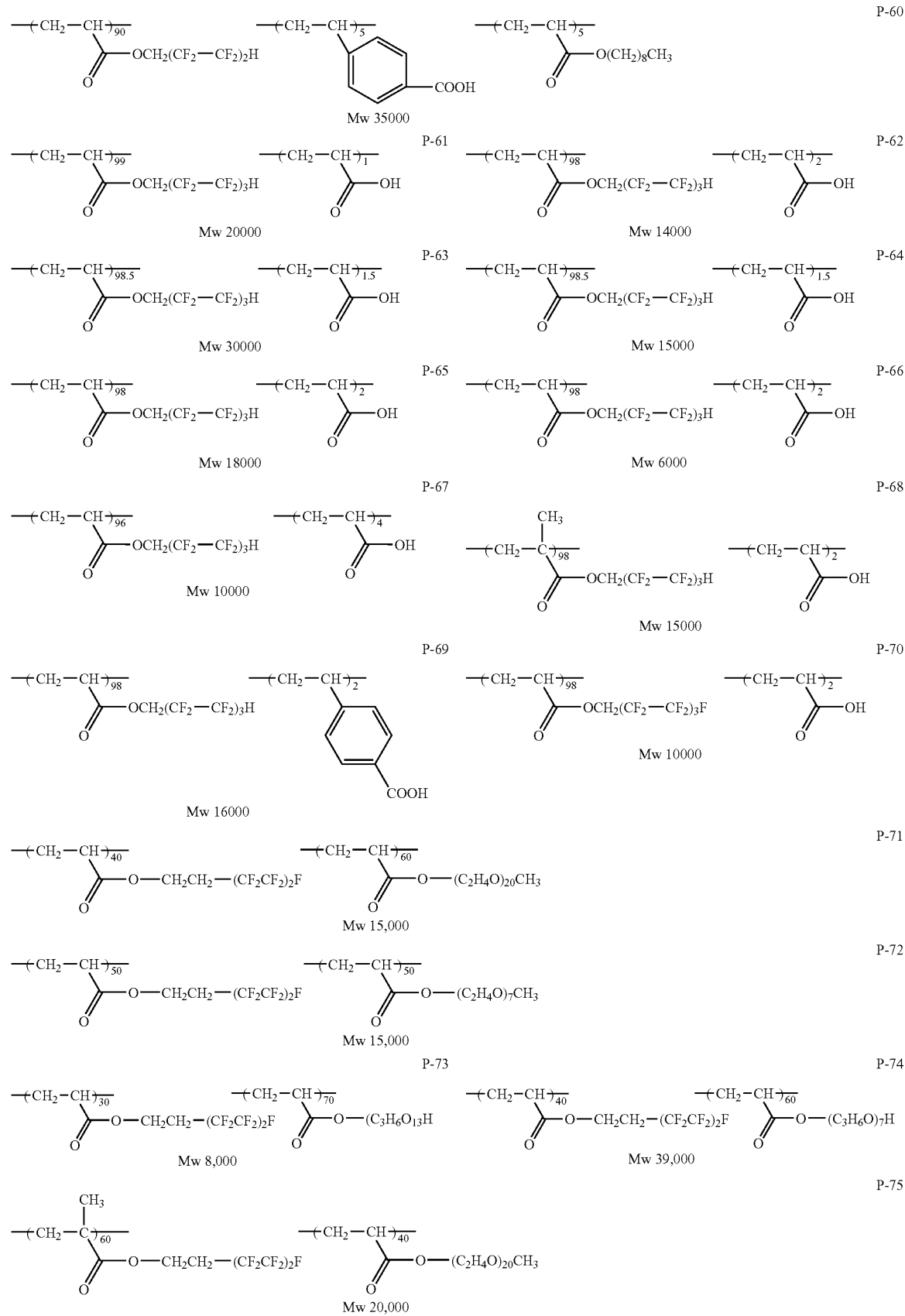

-continued
P-76
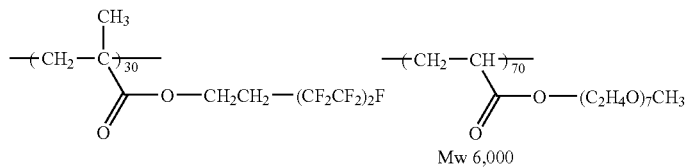
Mw 6,000
P-77
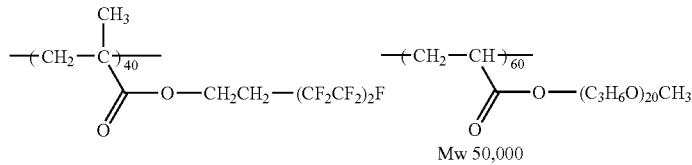
Mw 50,000
P-78
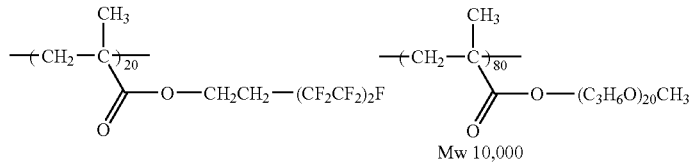
Mw 10,000
P-79
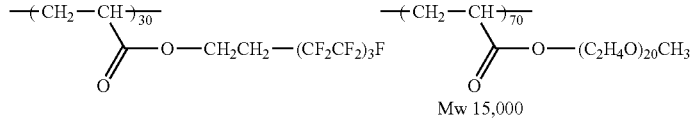
Mw 15,000
P-80
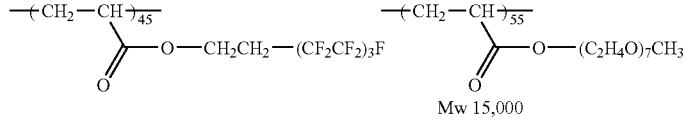
Mw 15,000
P-81
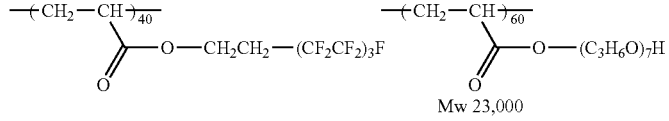
Mw 23,000
P-82
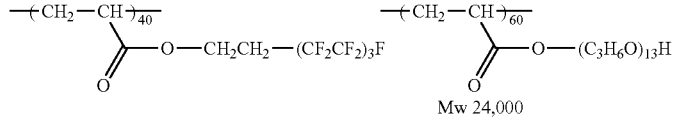
Mw 24,000
P-83
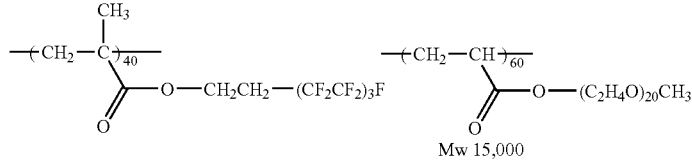
Mw 15,000
P-84
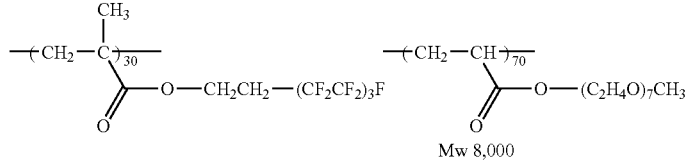
Mw 8,000
P-85
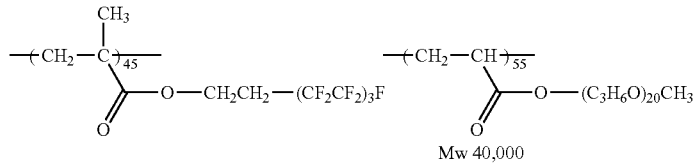
Mw 40,000

-continued
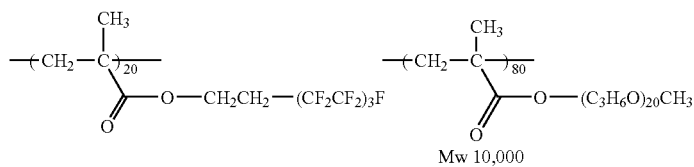
P-86
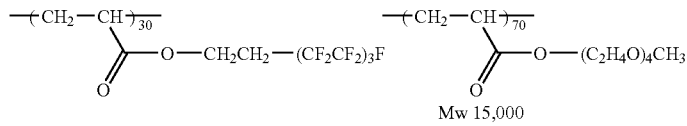
P-87
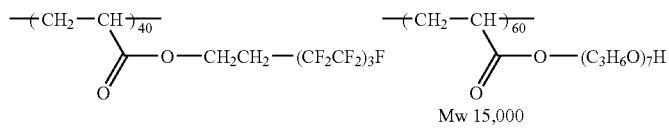
P-88
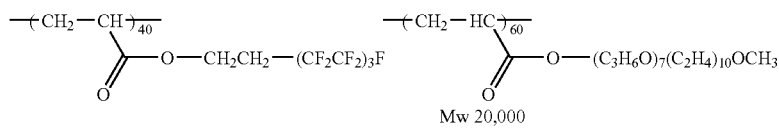
P-89
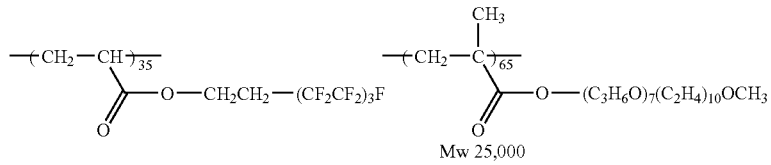
P-90
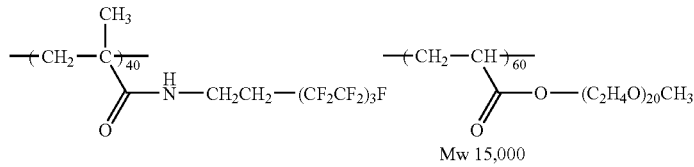
P-91
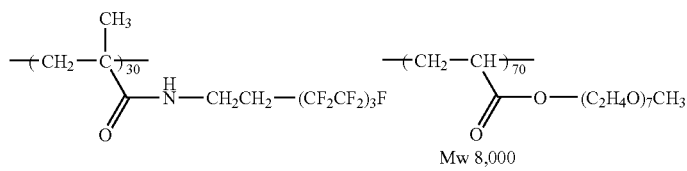
P-92
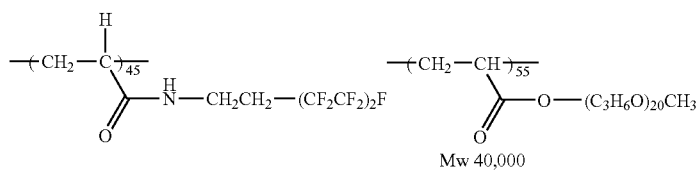
P-93
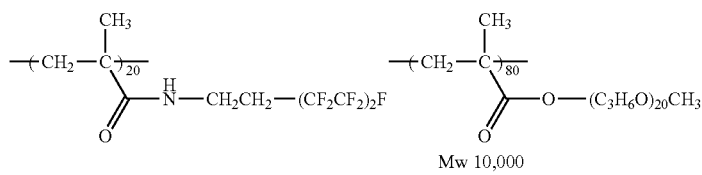
P-94
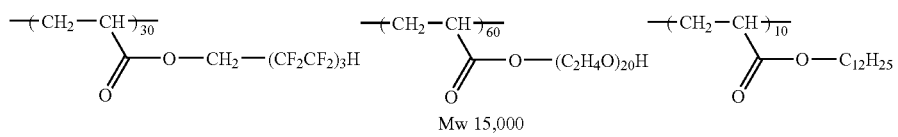
P-95

-continued
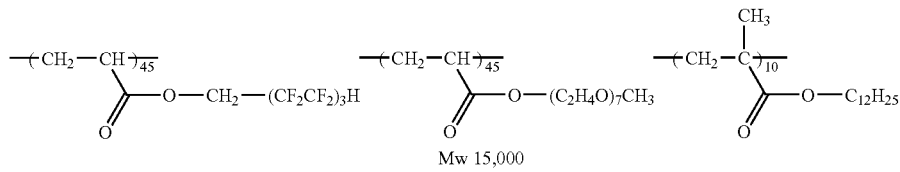
P-96
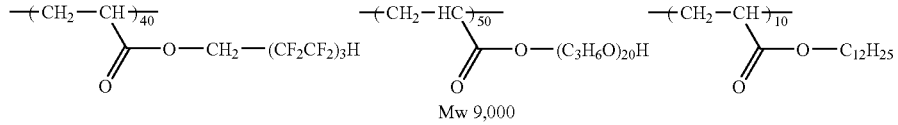
P-97
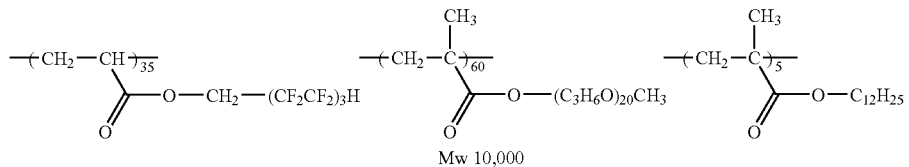
P-98
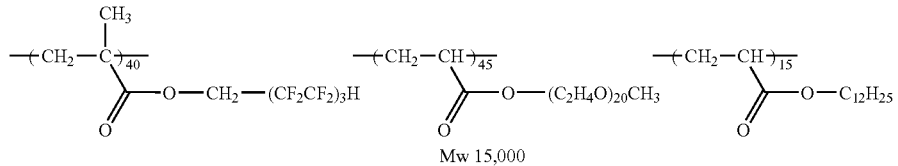
P-99
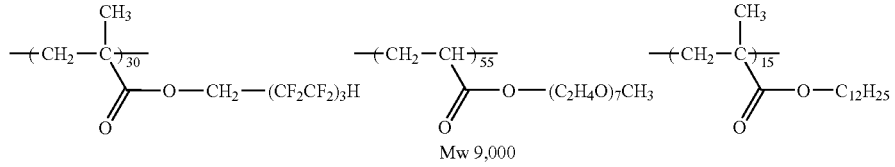
P-100
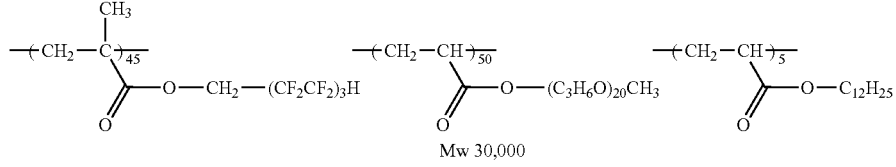
P-101
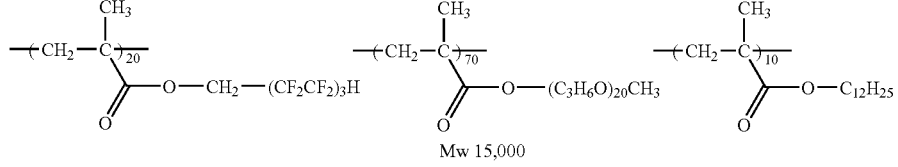
P-102
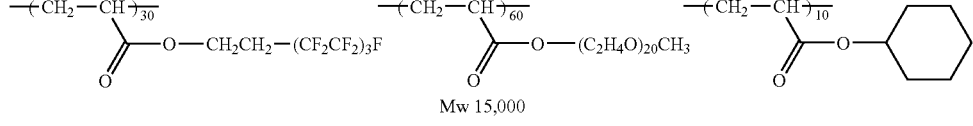
P-103
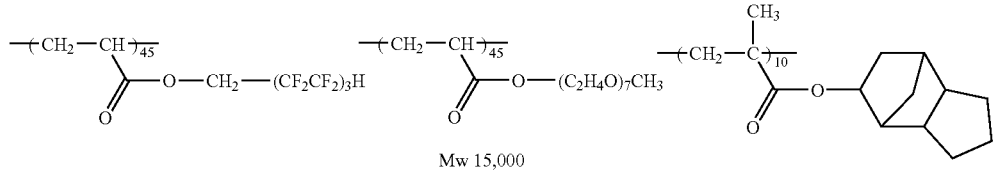
P-104

-continued
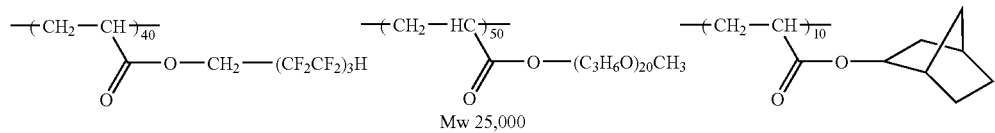
P-105
Mw 25,000
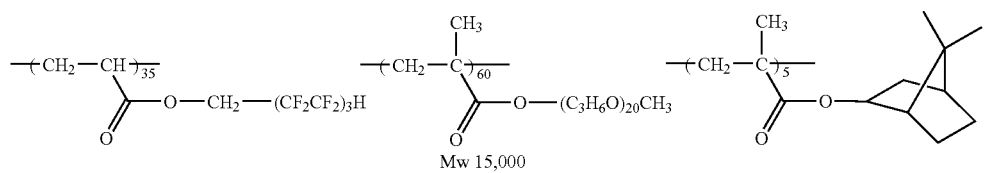
P-106
Mw 15,000
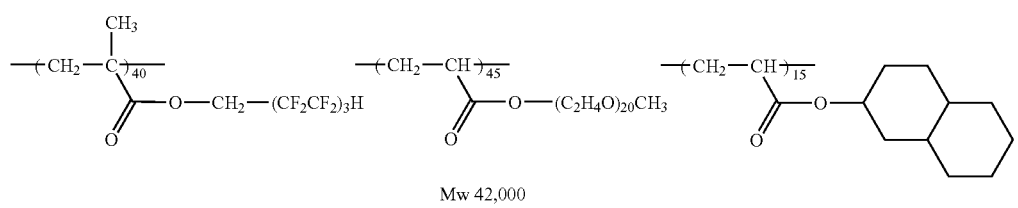
P-107
Mw 42,000
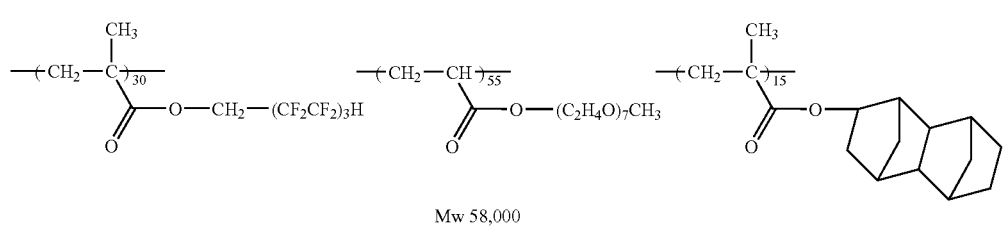
P-108
Mw 58,000
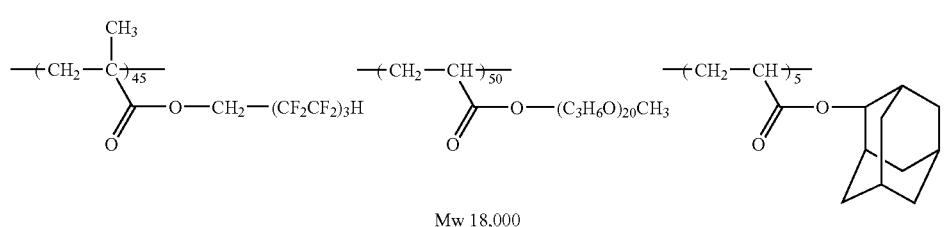
P-109
Mw 18,000
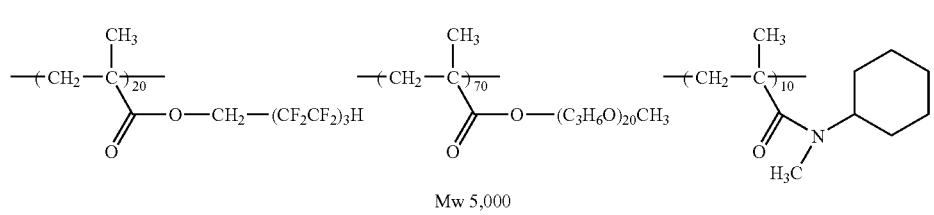
P-110
Mw 5,000
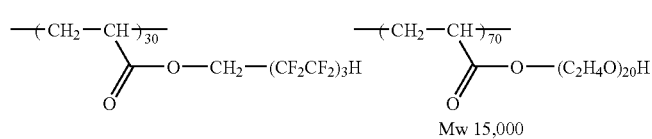
P-111
Mw 15,000
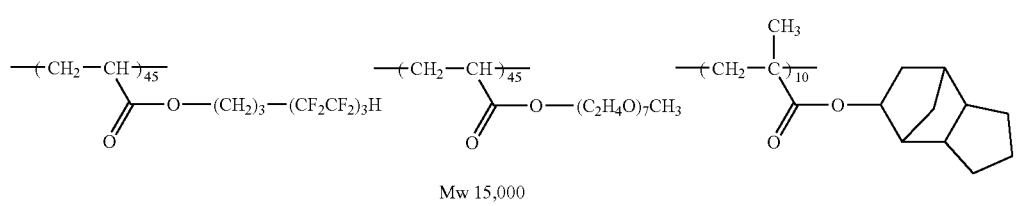
P-112
Mw 15,000

-continued
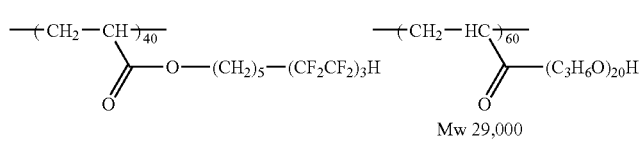
P-113
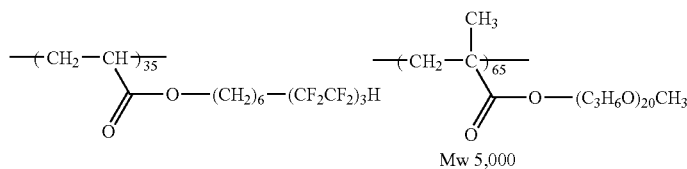
P-114
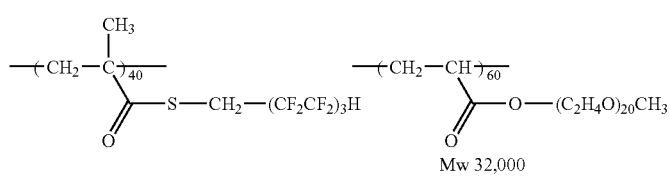
P-115
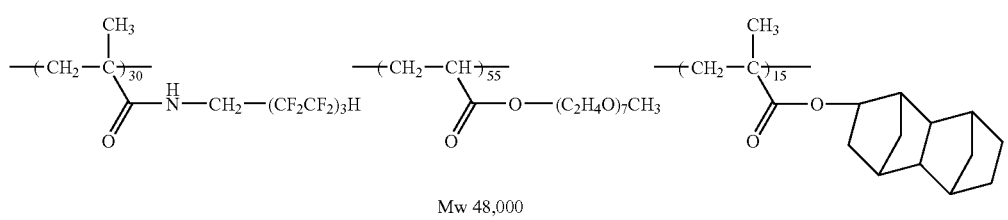
P-116
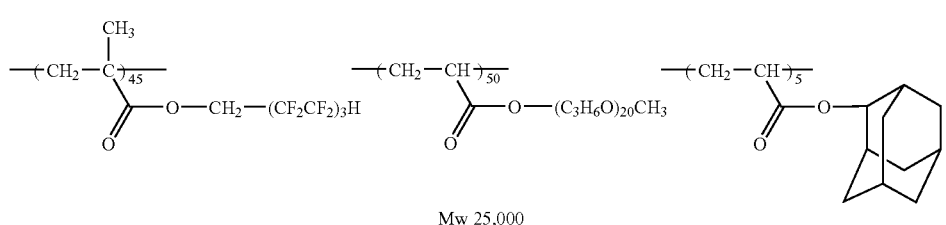
P-117
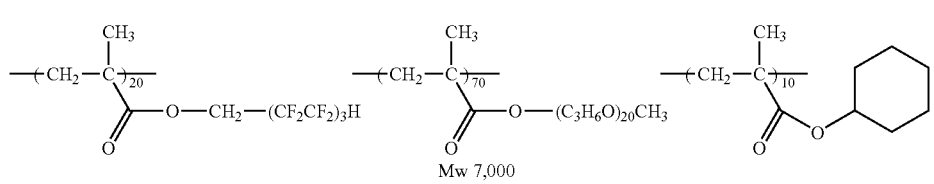
P-118
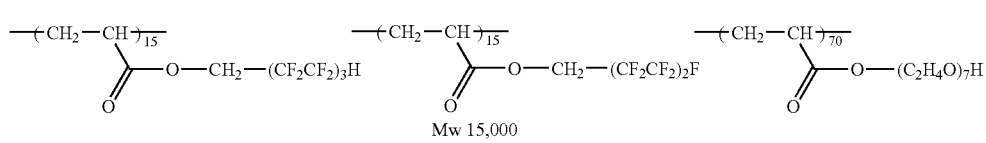
P-119
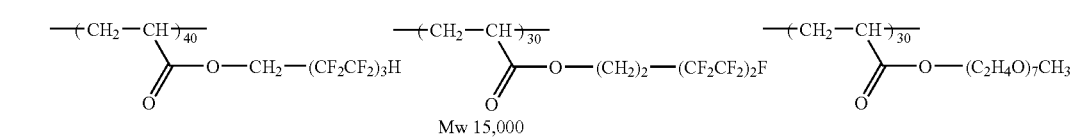
P-120
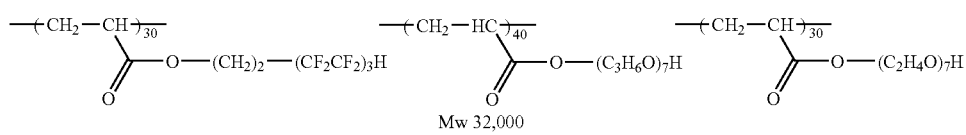
P-121

-continued
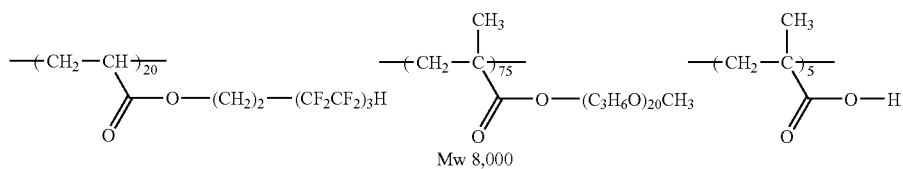
P-122
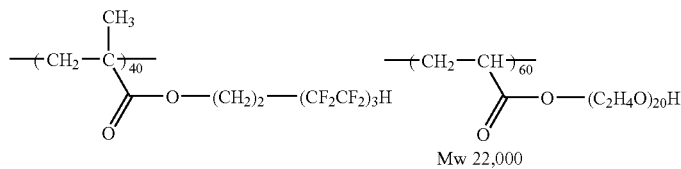
P-123
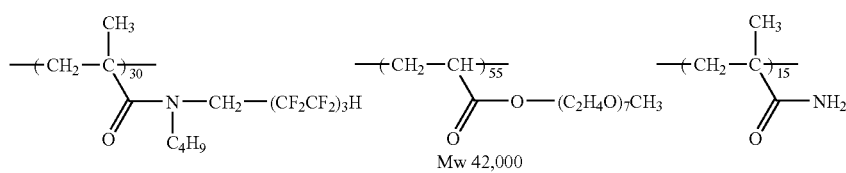
P-124
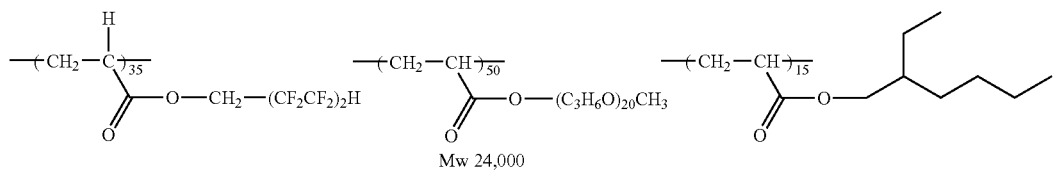
P-125
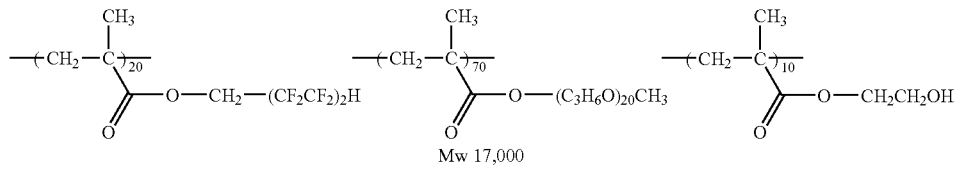
P-126
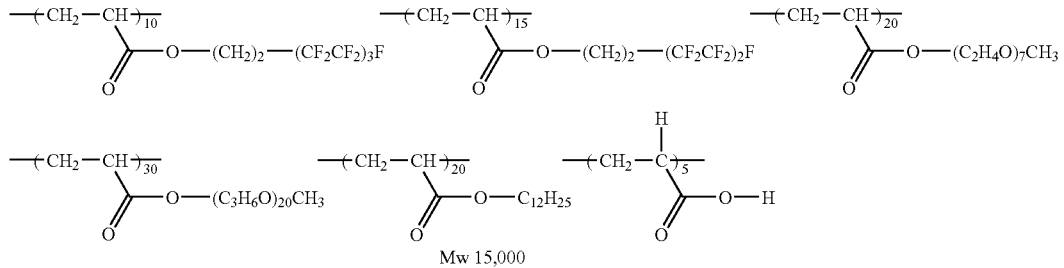
P-127
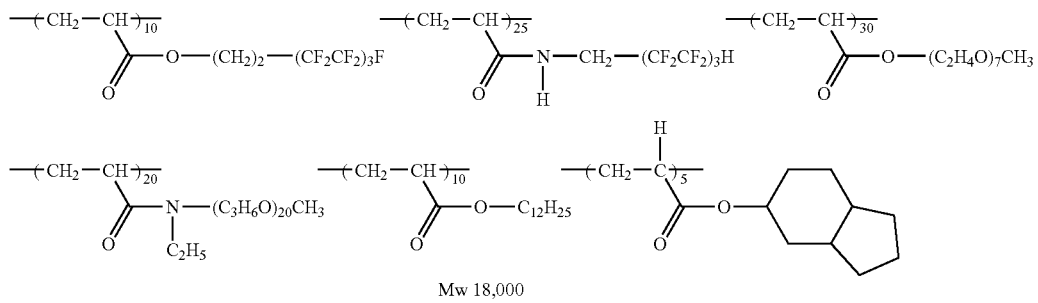
P-128
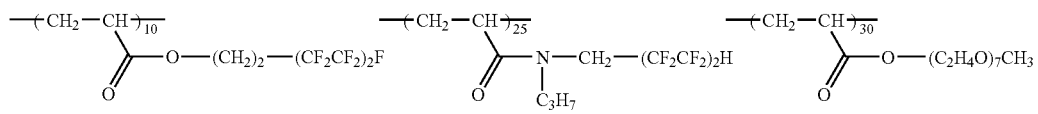
P-129

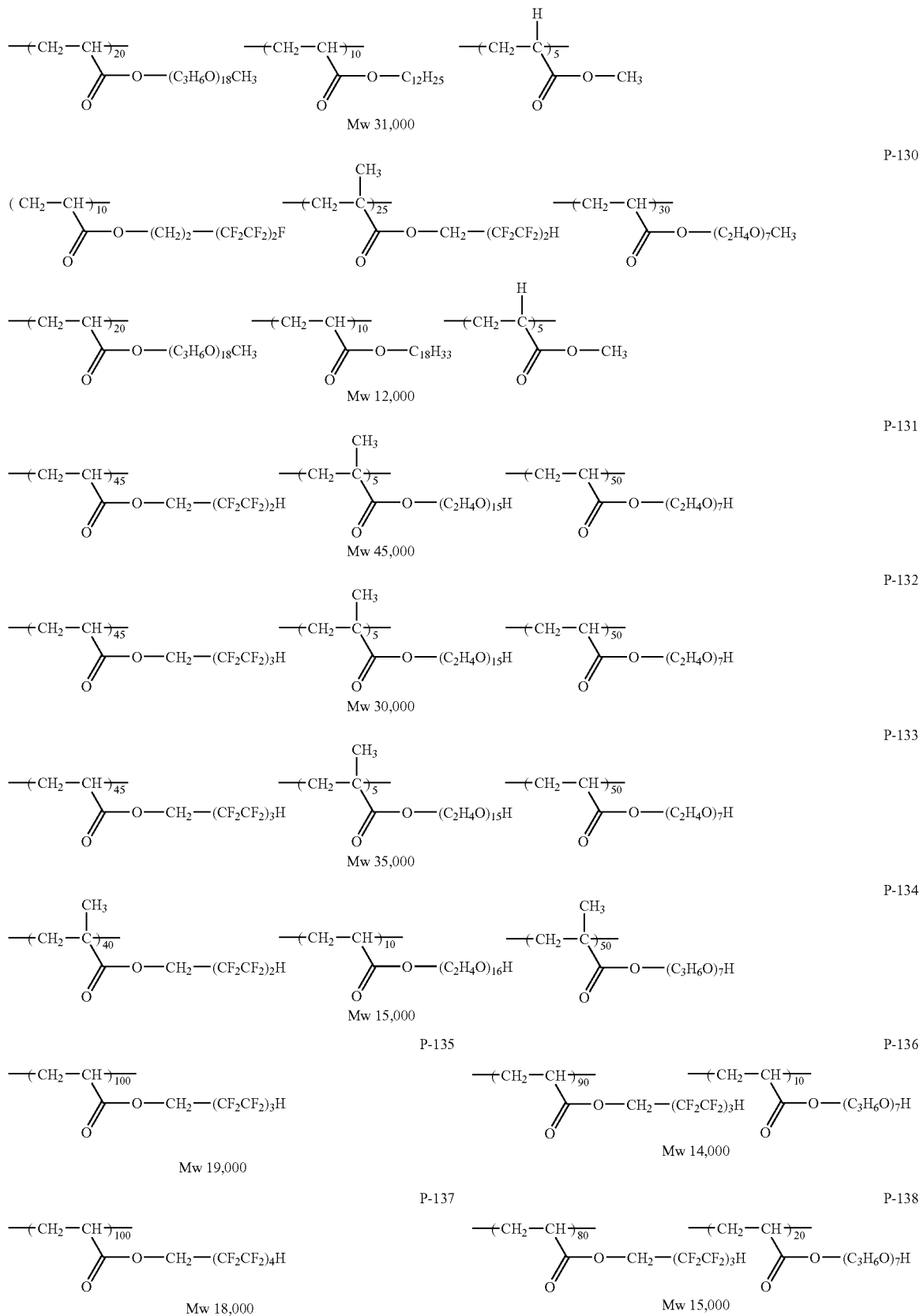

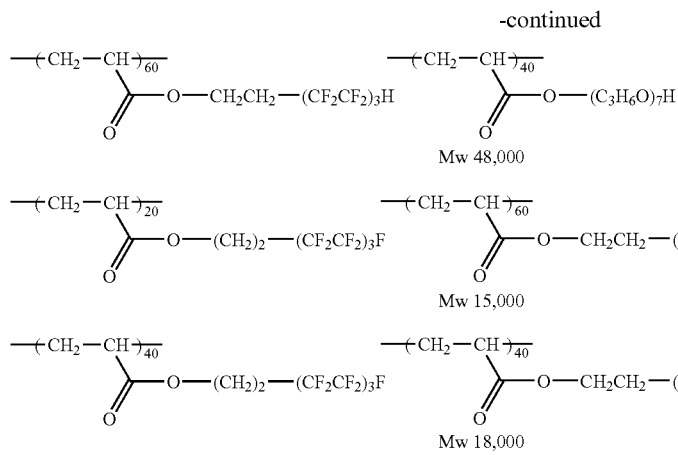
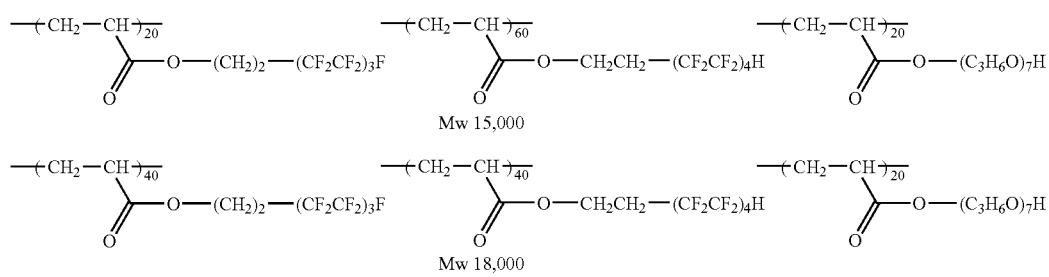
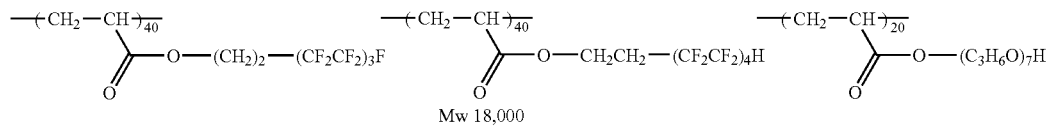

Single or plural polymers may be used with the discotic liquid crystal compound. The polymer is desirably selected from polymers which can bring about variation in the tilt angles of discotic molecules. Examples of the polymer include cellulose esters. Preferred examples of cellulose ester include those described in the column [0178] in JPA No. 2000-155216. Avoiding inhibiting the alignment of the liquid-crystal compound, the amount of the polymer is desirably from 0.1 to 10 wt %, and more desirably from 0.1 to 8 wt %, with respect to the weight of the liquid-crystal compound.

The temperature at which the discotic liquid-crystal compound transfers from a discotic nematic liquid-crystal state to a solid state is desirably from 70 to 300° C., and more desirably from 70 to 170° C.

Preparation of an Optically Anisotropic Layer

The optically anisotropic layer may be prepared by applying the composition comprising a liquid-crystal compound and, if necessary, other additives, to a surface of an alignment layer. The composition is desirably prepared as a coating liquid for easiness in coating. Solvents are used for preparing the coating liquid, and the solvent is desirably selected from organic solvents. Examples of the organic solvent include amides such as N,N-dimethylformamide, sulfoxides such as dimethyl sulfoxide, heterocyclic compounds such as pyridine, hydrocarbons such as benzene and hexane, alkyl halides such as chloroform and dichloromethane, esters such as methyl acetate and butyl acetate, ketones such as acetone and methyl ethyl ketone and ethers such as tetrahydrofuran and 1,2-dimethoxyethane. Alkyl halides and ketones are preferred. One or more kinds of solvents may be used for preparing the coating solutions.

The coating liquid can be applied by known techniques (e.g., wire-bar coating, extrusion coating, direct gravure coating, reverse gravure coating and die coating).

According to the present invention, the optically anisotropic layer desirably has a thickness of 0.1 to 20 micrometers, preferably of 0.5 to 15 micrometers, and more preferably of 1 to 10 micrometers.

Fixing the Alignment State of Liquid-Crystal Molecules

After being aligned in an alignment state, the liquid crystal molecules are fixed in the alignment state. Fixing is desirably carried out by polymerization. Examples of polymerization reactions which can be used in the present invention include thermal polymerization reactions employing thermal polymerization initiators and photo-polymerization reactions employing photo-polymerization initiators. Photo-polymerization reactions are preferred. Examples of photo-polymerization initiators are alpha-carbonyl compounds (described in U.S. Pat. Nos. 2,367,661 and 2,367,670), acyloin ether (described in U.S. Pat. No. 2,448,828), alpha-hydrocarbon-substituted aromatic acyloin compounds (described in U.S. Pat. No. 2,722,512), polynuclearquinone compounds (described in U.S. Pat. Nos. 3,046,127 and 2,951,758), combinations of triarylimidazole dimers and p-aminophenyl ketones (described in U.S. Pat. No. 3,549,367), acridine and phenadine compounds (described in JPA No. sho 60-105667 and U.S. Pat. No. 4,239,850), and oxadiazole compounds (described in U.S. Pat. No. 4,212,970).

The amount of photo-polymerization initiator employed is desirably from 0.01 to 20 weight percent, preferably from 0.5 to 5 weight percent, of the solid portion of the coating liquid.

Irradiation for polymerization of discotic liquid-crystal molecules is desirably conducted with ultraviolet radiation. The irradiation energy is desirably from 20 mJ/cm$^2$ to 50 J/cm$^2$, more desirably from 20 to 5000 mJ/cm$^2$, and much more desirably from 100 to 800 mJ/cm$^2$. Irradiation may be conducted under heated conditions to promote the photo-polymerization reaction.

A protective layer may be formed on the optically anisotropic layer.

Polarizing Plate

An integrated polarizing plate comprising a linear polarizing film and the optically anisotropic layer may be used in the present invention. The integrated polarizing plate may be a linear polarizing plate, a circularly polarizing plate or an elliptically polarizing plate. The polarizing plate may be formed into a substantially same shape as that of the pair of substrates of the liquid-crystal cell. For example, the liquid-crystal cell has a rectangular shape, the polarizing plate to be used with the liquid-crystal cell also has the same rectangular shape.

The polarizing plate used in the first embodiment of the present invention, having a same surface-shape as the surface-shape of the pair of first and second substrates, is desirably produced such that the disposition satisfies at least one of Condition (3) and Condition (4);

Condition (3):

an absorption axis of the linear polarizing film is rotated by 0.1 to 10° clockwise or counterclockwise respect to the first or second alignment axis formed on one of the pair of the substrates, and Condition (4):

the alignment axis of the optically anisotropic layer is rotated by 0.1 to 10° clockwise or counterclockwise with respect to the alignment axis formed on one of the pair of the substrates.

The liner polarizing film and the optically anisotropic layer is desirably laminated such that the absorption axis of the linear polarizing film is parallel to the alignment axis of the optically anisotropic layer, but not to be limited to.

An elliptically polarizing plate comprising a linear polarizing film and at least one optically anisotropic layer may be used in the second or third embodiment. The elliptically polarizing plate in which the quenching axis of the optically anisotropic layer is not parallel to the absorption axis of the linear polarizing film is preferred.

The polarizing plate may be produced by stacking the optically anisotropic layer on the liner polarizing film (occasionally referred to as "polarizing film"). The optically anisotropic layer may function as a protective film of the polarizing film.

The linear polarizing film may be selected from coating-type polarizing films as typified by Optiva Inc., iodine-based polarizing films and dichroic-dye based polarizing films. Iodine or dichroic dye molecules are oriented in binder so as to have a polarizing capability. Iodine or dichroic dye molecules may be oriented along with binder molecules, or iodine molecules may aggregate themselves in the same manner of liquid crystal and be aligned in a direction. Generally, commercially available polarizing films are produced by soaking a stretched polymer film in a solution of iodine or dichroic dye and impregnating the polymer film with molecules of iodine or dichroic dye. Generally, molecules of iodine or dichroic dye may enter into a polymer film from the surface of the film and may be dispersed in the area about 4 μm in thickness from the surface of the film (about 8 μm in thickness from both of two surfaces of the film). And in order to obtain sufficient polarizing ability, it is required to use a polarizing film having a thickness not less than 10 μm. The penetrance degree can be adjusted within a preferred range by iodide or dichroic dye concentration of the solution, temperature of the solution or soaking time. As described above, the thickness of the polymer film is desirably not less than 10 μm. From the viewpoint of lowering light leakage from a liquid-crystal display, the polymer film having a less thickness is preferred. The thickness of is not greater than those of commercially available polarizing films (about 30 μm), more desirably not greater than 25 μm and much more desirably not greater than 20 μm. When a polarizing film having a thickness not greater than 20 μm is used in a 17-inch liquid-crystal display, no light leakage may be observed.

The polarizing film may comprise crosslinked binder. Self-crosslinkable polymers may be used as binder. The polarizing film may be produced by carrying out reaction between functional groups of polymer with light, heat or variation of pH. Crosslinking agents may be used. Crosslinking reactions may be carried out by heating a coating liquid comprising polymer or a mixture of polymer and a crosslinking agent after being applied to a substrate. The heating step may be carried out at any time by the end of the process for producing the polarizing film as long as a final product having good durability can be obtained.

Binder for the polarizing plate may be selected from self-crosslinkable polymers or polymers capable of being crosslinked by crosslinking agents. Examples of such polymers include polymers exemplified for the polymers of alignment layers. Polyvinyl alcohols or modified polyvinyl alcohols are preferred. Examples of the modified polyvinyl alcohol, which can be used in the present invention, are described in JPA No. hei 8-338913, JPA No. hei 9-152509 and JPA No. hei 9-316127. Two or more types of polyvinyl alcohol or modified polyvinyl alcohol may be used.

The amount of the crosslinking agent is desirably from 0.1 to 20 wt % with respect to the weight of binder. When the amount falls within the range, good alignment ability and good moisture-heat resistance can be obtained.

The polarizing films may contain some amount of unreacted crosslinking agents after end of crosslinking reaction. The amount of residual crosslinking agent in the polarizing film is desirably not greater than 1.0 wt % and more desirably not greater than 0.5 wt %. When the amount falls within the range, the polarization degree may not lower even if the polarizing film is used for a long period or is left under a high-humidity and high-temperature atmosphere for a long period.

Examples of the crosslinking agent are described in U.S. reissued Pat. No. 23,297. Boron compounds such as boric acid or pyroborate can be used as a crosslinking agent.

Examples of dichroic dye include azo dyes, stilbene dyes, pyrazolone dyes, triphenylmethane dyes, quinoline dyes, oxazine dyes, thiazine dyes and anthraquinone dyes. The dichroic dye is desirably selected from water-soluble dyes. The dichroic dye desirably has a hydrophilic group such as sulfo, amino or hydroxy.

Examples of the dichroic dye include those described on page 58 in Kokai Giho No. 2001-1745 published in Mar. 5, 2001, by of Japan Institute of Invention and Innovation.

For improving grayscale of LCD, it is preferred that the polarizing plate has a high transmittance, and it is also preferred that the polarizing plate has a high polarization degree. The transmittance at 550 nm of the polarizing plate is desirably from 30 to 50%, more desirably from 35 to 50%, and much more desirably from 40 to 50%. The polarization degree at 550 nm is desirably from 90 to 100%, more desirably from 95 to 100% and much more desirably from 99 to 100%.

Production of a Polarizing Plate

From the viewpoint of yields, polarizing films are desirably produced by stretching polymer films in a direction 10 to 80 degree tilted with respect to a long direction (MD direction) of the polarizing films, or in other words according to stretching method. Polarizing films are also desirably produced by staining polymer films with iodine or dichroic dye, or in other words according to rubbing method. Generally, the tilt angle is 45 degree, but, the tilt angle is not limited to 45 degree in transmissive, reflective or semi-transmissive liquid-crystal displays which have been provided recently. And thus, the stretching direction may be set depending on designs of LCD.

According to the stretching method, the stretching ratio is desirably from 2.5 to 3.0 and more desirably from 3.0 to 10.0. The stretching process may be carried out under dried atmosphere, pr in other words according to a dry stretching. Or the stretching process may be carried out while being dipped in water, or in other words according to a wet stretching. For the dry stretching, the stretching ratio is desirably from 2.5 to 5.0, and for the wet stretching, the stretching ratio is desirably from 3.0 to 10.0. The stretching process may be divided into plural steps including an obliquely stretching step. Dividing into plural steps, it is possible to stretch uniformly even if the stretching ratio is high. Before an obliquely stretching step, a stretching in a width-direction or a stretching in a length-direction may be carried out slightly (with a degree preventing shrinkage in a width direction). A tenter stretching employing a biaxial-stretching may be carried out at a left side and a right side respectively. The biaxial-stretching may be carried out according to a usual film formation process. For a biaxial stretching, a left side and a right side of a film is stretched at a different ratio respectively, and, thus, the film may be required to have different thicknesses at the left and right sides respectively before being stretched. According to a flow-casting method, it is possible to give a difference in a flowing amount of a binder solution at a left side and a right side by forming a taper on a die.

As described above, a binder film stretched obliquely in a direction 10 to 80 degree tilted with respect to the MD direction of a polarizing film.

In the rubbing method, various rubbing treatments employed in alignment treatments of LCDs may be applied. Namely, the rubbing treatment may be carried out by rubbing the surface of a polymer film with a paper, a gauze, a felt, a rubber, a nylon fiber, polyester fiber or the like in a direction. Usually, the rubbing treatment may be carried out by rubbing a polymer film with a fabric in which fibers having a uniform length and line thickness are implanted averagely at several times. The rubbing treatment is desirably carried out with a rubbing roll having circularity, cylindricality and a deviation (a roundness deviation) of not greater than 30 µm. The lap angle of the rubbing roll with respect to the film is desirable set from 0.1 to 90°. As described in JPA No. hei 8-160430, lapping around 360° or more may brig about stabilities in rubbing treatments.

When a long film is subjected to a rubbing treatment, it is preferred that the long film is conveyed at a ratio of 1 to 100 m/min under a certain tension by a transportation apparatus. It is preferred that the rubbing roll is supported rotatably with respected to the conveying direction of the film for allowing a rubbing angle to be set to various angles. The rubbing angle is desirably set within a range from 0 to 60°, more desirably from 40 to 50° and much more desirably 45°.

A polymer film is desirably formed on the opposite surface of the film, on which no optically anisotropic layer is disposed, or in other words a disposition of an optically anisotropic layer, a linear polarizing film and a polymer film is preferred.

The polymer film having an anti-reflective, which gives an anti-fouling or anti-scoring property, thereon may be used. The anti-reflective film may be selected any known anti-reflective films.

EXAMPLES

The present invention will further be detailed referring to specific Examples. It is to be noted that any materials, reagents, ratios of use thereof and operations shown in the Examples below can properly be modified without departing from the spirit of the present invention. Thus the present invention is by no means limited to the Examples described below.

Example No. 1-1

A liquid-crystal display having a same configuration shown in FIG. 1 was produced. Namely, an upside polarizing film, an upside optical compensatory sheet, a liquid-crystal cell comprising an upper-substrate, a liquid-crystal layer and a down-substrate, a downside optical compensatory sheet and a downside polarizing plate were stacked in this order from an observed side (an upside). And a back light employing a cold cathode fluorescent (not shown in FIG. 1) was disposed under the downside polarizing plate.

The members employed in the liquid-crystal display and the process for producing them will be described in details below.

<Preparation of a TN-Mode Liquid-Crystal Cell>

Two substrates were positioned keeping a cell-gap (d) of 4 µm between them, and liquid-crystal material, having a positive dielectric-constant anisotropy, was poured into the gap between the substrates to form a liquid-crystal layer (13 in FIG. 1) having Δnd of 410 nm where Δn means a refractive-index anisotropy of the liquid-crystal material. The rubbing direction formed on the upper-substrate of the liquid-crystal cell was 45° and the rubbing direction formed on the down-substrate of the liquid-crystal cell was −45°, and, thus, the twist angle was 90°. As described above, a TN-mode liquid-crystal cell was produced.

<Preparation of a Cellulose Acetate Film>

The following components were charged to a mixing tank and stirred with heating to prepare a cellulose acetate solution (dope).

Composition of Cellulose Acetate Solution Composition

| | |
|---|---|
| Cellulose acetate with a degree of acetation from 60.7 to 61.1 percent | 100 weight parts |
| Triphenyl phosphate (plasticizer) | 7.8 weight parts |
| Biphenyldiphenyl phosphate (plasticizer) | 3.9 weight parts |
| Methylene chloride (first solvent) | 336 weight parts |
| Methanol (second solvent) | 29 weight parts |
| 1-Butanol (third solvent) | 11 weight parts |

In another mixing tank, 16 weight parts of the following retardation enhancer, 92 weight parts of methylene chloride and 8 weight parts of methanol were placed, heated under stirring to prepare a retardation enhancer solution. Mixing 474 weight parts of the cellulose acetate solution and 25 weight parts of the retardation enhancer solution under stirring sufficiently, a dope was prepared. The amount of the retardation enhancer was 6.0 weight parts with respect to 100 parts of cellulose acetate.

Retardation Enhancer:

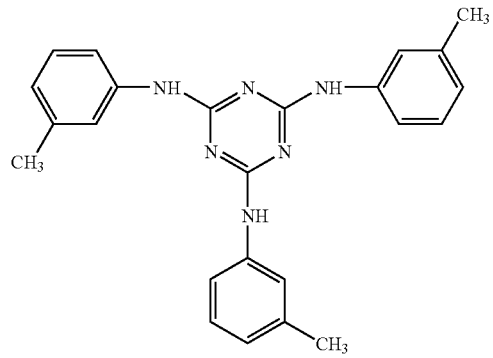

The obtained dope was made to flow to form a film using a band flow-casting machine. After the film temperature was cooled down to 40° C. on the band, the film was dried with hot air of 70° C. for one minute, and then peeled off from the band. Next, the film was dried with dried air of 140° C. for 10 minutes, and thus, a cellulose acetate film having a thickness of 80 micrometers and containing residual solvent in an amount of 0.3 wt %, was obtained.

The Re and the Rth values at 546 nm of the obtained cellulose acetate were measured according to the above described method, and it was found that the Re was 8 nm and the Rth was 78 nm.

The obtained cellulose acetate was dipped in a 2.0 N potassium hydroxide solution (25° C.) for two minutes, neutralized by sulfuric acid, washed with water and then dried. Thus, an cellulose acetate film to be used as a protective film of a polarizing film was produced.

<Preparation of an Alignment Layer for an Optically Anisotropic Layer>

A coating liquid having a formulation shown below was applied to the cellulose acetate film using a #16 wire bar coater in an amount of 28 ml/m², dried with hot air of 60° C. for 60 seconds and 90° C. for 150 seconds to form a polymer layer. The polymer layer was subjected to rubbing treatment in a parallel direction to a slow axis of the film (which was parallel to the flow-casting direction), and thus, an alignment layer was obtained. Namely, the rubbing axis was parallel to the slow axis of the cellulose acetate film.

Formulation of Coating Liquid for an Alignment Layer

| Modified polyvinyl alcohol shown below | 20 wt parts |
|---|---|
| Water | 360 wt parts |
| Methanol | 120 wt parts |
| Glutaraldehyde (crosslinking agent) | 1.0 wt parts |

Modified polyvinyl alcohol

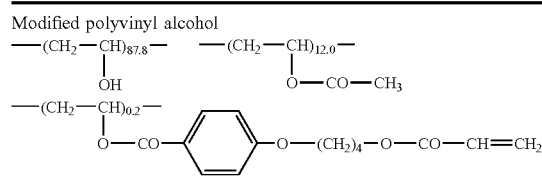

<Preparation of an Optically Anisotropic Layer>

A coating solution was prepared by dissolving 91.0 g of a liquid-crystal compound shown below, 9.0 g of Ethylene oxide-modified trimethyrol propane triacrylate (V#360 made by Osaka Organic Chemicals (Ltd.), 2.0 g of cellulose acetate butyrate ("CAB551-0.2" manufactured by Eastman Chemical Co., LTD.), 0.5 g of cellulose acetate butyrate ("CAB531-1" manufactured by Eastman Chemical Co., LTD.), 3.0 g of a polymerization initiator (IRGACURE 907 manufactured by Ciba-Geigy), 1.0 g of a sensitizer (KAYACURE-DETX manufactured by NIPPON KAYAKU CO., LTD.) and 1.3 g of a fluoro-aliphatic-group containing copolymer ("MEGAFACE F780" manufactured by DAINIPPON INK & CHEMICALS, INCORPORATED) in 207 g of methyl ethyl ketone, and the coating solution was applied to the surface of the alignment layer with a #3.6 wire-bar in an amount of 6.2 ml/m². The coating layer was heated in a constant-temperature zone of 130° C. for 2 minutes to align the discotic molecules. Subsequently, the layer was irradiated at 60° C. with UV light using a 120 w/cm high-pressurized mercury lamp for one minute to polymerize the discotic molecules, and then, an optically anisotropic layer was formed. After that, cooled down the room temperature, and then Optical compensatory film was obtained.

Discotic liquid-crystal compound

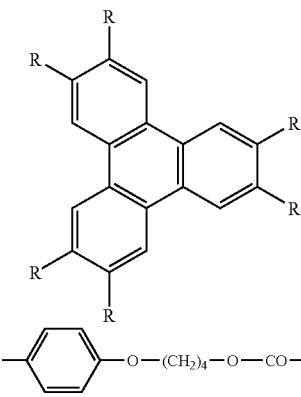

R: —O—CO—⌬—O—(CH₂)₄—O—CO—CH=CH₂

It was found that discotic molecules in the optically anisotropic layer were hybrid-aligned at a mean tilt angle of 37° in the manner that the angles (tilt angles) between the disk-like plates of the moluecules and the film surface increased along with a distance from the film surface. The optically anisotropic layer was uniform and no shriren defects was found in the optically anisotropic layer.

The tilt angles of liquid-crystalline molecules in the optically anisotropic layer at an alignment layer interface and at an air interface were calculated using an ellipsometer (M−150 manufactured by JASCO International CO., LTD.), according to the above described method.

Disposed between cross-nicole aligned a pair of polarizing plates and observed in a normal direction to the film surface and in a direction rotated by 60° with respect to the normal direction, any unevenness was not found in the optically anisotropic layer.

<Preparation of a Polarizing Film>

Iodine was adsorbed onto a stretched polyvinyl alcohol film to prepare a polarizing film. One side of the polarizing film was bonded with a polyvinyl alcohol-based adhesive to the transparent substrate surface of the optically anisotropic layer. A commercially available cellulose acylate film ("FUJITAC TD80UF" manufactured by FUJI PHOTO FILM CO., LTD.), having a thickness of 80 μm, was saponified and was bonded to the opposite surface of the polarizing film with polyvinyl alcohol-based adhesive. The absorption axis of the polarizing film was positioned parallel to the slow axis of the substrate of the optical compensatory sheet (parallel to the flow-casting direction). Thus, a polarizing plate was produced.

Two of the obtained polarizing plates were respectively bonded to both sides, the observed side and the backlight side, of the TN liquid-crystal cell produced as set forth above so that the optically anisotropic surface faced the substrates of the liquid-crystal cell with an adhesion. The absorption axis of the polarizing plate and the alignment direction (rubbing directions) of the optical compensatory sheet were made rotated by 3° counterclockwise with respect to the anti-parallel direction of the rubbing direction formed on the faced surface of the liquid-crystal cell at the observed side, and the absorption axis of the polarizing plate and the alignment direction (rubbing directions) of the optical compensatory sheet were made rotated by 3° clockwise with respect to the anti-parallel direction of the rubbing direction formed on the faced surface of the liquid-crystal cell at the backlight side. Thus, a liquid-crystal display was produced.

Example No. 1-2

A liquid crystal display was produced in the same manner as Example No. 1-1, except that the alignment directions (rubbing direction) of the optical compensatory sheets were anti-parallel to the rubbing directions formed on the faced surfaces of the liquid-crystal cell, the absorption axis of the polarizing plate was made rotated by 3° counterclockwise with respect to the anti-parallel direction of the rubbing direction formed on the faced surface of the liquid-crystal cell at the observed side, and the absorption axis of the polarizing plate was made rotated by 3° clockwise with respect to the anti-parallel direction of the rubbing direction formed on the faced surface of the liquid-crystal cell at the backlight side.

Example No. 1-3

A liquid crystal display was produced in the same manner as Example No. 1-1, except that the absorption axes of the polarizing plates were parallel to the rubbing directions formed on the faced surfaces of the liquid-crystal cell, the alignment direction (rubbing direction) of the optical compensatory sheet was made rotated by 3° counterclockwise with respect to the anti-parallel direction of the rubbing direction formed on the faced surface of the liquid-crystal cell at the observed side, and the alignment direction (rubbing direction) of the optical compensatory sheet was made rotated by 3° clockwise with respect to the anti-parallel direction of the rubbing direction formed on the faced surface of the liquid-crystal cell at the backlight side.

Example No. 1-4

A liquid crystal display was produced in the same manner as Example No. 1-1, except that the absorption axis of the polarizing plate and the alignment direction (rubbing directions) of the optical compensatory sheet were made rotated by 3° clockwise with respect to the anti-parallel direction of the rubbing direction formed on the faced surface of the liquid-crystal cell at the observed side, and the absorption axis of the polarizing plate and the alignment direction (rubbing directions) of the optical compensatory sheet were made rotated by 3° counterclockwise with respect to the anti-parallel direction of the rubbing direction formed on the faced surface of the liquid-crystal cell at the backlight side.

Example No. 1-5

A liquid crystal display was produced in the same manner as Example No. 1-1, except that the alignment directions (rubbing direction) of the optical compensatory sheets were anti-parallel to the rubbing directions formed on the faced surfaces of the liquid-crystal cell, the absorption axis of the polarizing plate was made rotated by 3° clockwise with respect to the anti-parallel direction of the rubbing direction formed on the faced surface of the liquid-crystal cell at the observed side, and the absorption axis of the polarizing plate was made rotated by 3° counterclockwise with respect to the anti-parallel direction of the rubbing direction formed on the faced surface of the liquid-crystal cell at the backlight side.

Example No. 1-6

A liquid crystal display was produced in the same manner as Example No. 1-1, except that the absorption axes of the polarizing plates were parallel to the rubbing directions formed on the faced surfaces of the liquid-crystal cell, the alignment direction (rubbing direction) of the optical compensatory sheet was made rotated by 3° clockwise with respect to the anti-parallel direction of the rubbing direction formed on the faced surface of the liquid-crystal cell at the observed side, and the alignment direction (rubbing direction) of the optical compensatory sheet was made rotated by 3° counterclockwise with respect to the anti-parallel direction of the rubbing direction formed on the faced surface of the liquid-crystal cell at the backlight side.

Comparative Example No. 1-1

A liquid crystal display was produced in the same manner as Example No. 1-1, except that the absorption axes of the polarizing plates and the alignment directions (rubbing directions) of the optical compensatory sheets were anti-parallel to the rubbing directions formed on the faced surfaces of the liquid-crystal cell at both of the observed side and the backlight side.

Comparative Example No. 1-2

A liquid-crystal display was produced in the same manner as Example No. 1-1, except that except that the alignment directions (rubbing direction) of the optical compensatory sheets were anti-parallel to the rubbing directions formed on the faced surfaces of the liquid-crystal cell, the absorption axis of the polarizing plate was made rotated by 15° counterclockwise with respect to the anti-parallel direction of the rubbing direction formed on the faced surface of the liquid-crystal cell at the observed side, and the absorption axis of the polarizing plate was made rotated by 15° clockwise with respect to the anti-parallel direction of the rubbing direction formed on the faced surface of the liquid-crystal cell at the backlight side.

<Evaluation as a TN-Mode Liquid-Crystal Display>

The produced liquid-crystal displays were applied 60 Hz square-wave voltage respectively. The displays were driven according to a normally white mode and 1.5 V was applied in a white state and 5 V was applied in a black state. Grayscale ratios, or in other words transmittance ratios (a white state to a black state), were measured with "EZ-Contrast160D", manufactured by ELDIM CO., LTD., for various viewing angles. The ranges of viewing angle which gave the grayscale ratio of 20 or more were shown in Table 1-1.

TABLE 1-1

| Liquid Crystal Display | Ranges giving the grayscale ratio of 20 or more | | | |
|---|---|---|---|---|
| | Up | Down | left | right |
| Example No. 1-1 | 60° | 70° | 55° | 55° |
| Example No. 1-2 | 50° | 68° | 50° | 50° |
| Example No. 1-3 | 60° | 60° | 58° | 58° |
| Example No. 1-4 | 42° | 45° | 80° | 80° |
| Example No. 1-5 | 45° | 40° | 75° | 75° |
| Example No. 1-6 | 40° | 50° | 68° | 68° |
| Comparative Example No. 1-1 | 50° | 58° | 60° | 60° |
| Comparative Example No. 1-2 | 20° | 10° | 10° | 10° |

The results, shown in Table 1-1, reveal that Example Nos. 1-1 to 1-3, which falls within a scope of the first embodiment of the present invention, were remarkably improved in grayscale-viewing-angle property in a vertical direction, and Example Nos. 1-4 to 1-6, which falls within a scope of the first embodiment of the present invention, were remarkably improved in grayscale-viewing-angle property in a horizontal direction.

Example No. 1-7

Optical compensatory sheets and polarizing plates were produced in the same manner as Example No. 1-1, except that the amounts of the retardation enhancers were changed and cellulose acetate films respectively having a Rth of 76 nm, 83 nm and 110 nm were produced. It was confirmed that these cellulose acetate films had an even surface without any unevenness.

Example No. 1-8

An optical compensatory sheet and a polarizing plate were produced in the same manner as Example No. 1-1, except that a retardation enhancer shown below was used in the place of the above retardation enhancer, the amount of the retardation enhancer in the inner layer were changed to 1.2 weight parts, and a cellulose acetate film having a Rth of 90 nm was produced. It was confirmed that the cellulose acetate film had an even surface without any unevenness.

Retardation enhancer

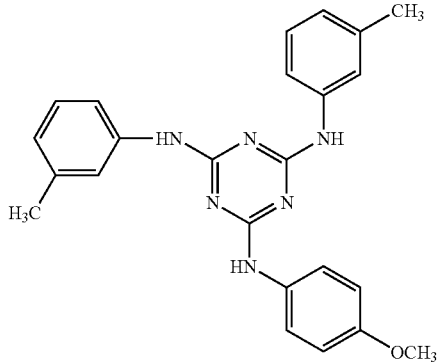

Example No. 1-9

Optical compensatory sheets and polarizing plates were produced in the same manner as Example No. 1-1, except that the amounts of the retardation enhancers were changed and cellulose acetate films respectively having a Rth of 76 nm, 83 nm, 100 nm and 110 nm were produced. It was confirmed that these cellulose acetate films had an even surface without any unevenness.

Example No. 2-1

A liquid-crystal display having a same configuration shown in FIG. 2 was produced. Namely, an upside polarizing film, an upside optical compensatory sheet, a liquid-crystal cell comprising an upper-substrate, a liquid-crystal layer and a down-substrate, a downside optical compensatory sheet and a downside polarizing plate were stacked in this order from an observed side (an upside). And a back light employing a cold cathode fluorescent (not shown in FIG. 2) was disposed under the downside polarizing plate.

The members employed in the liquid-crystal display and the process for producing them will be described in details below.

<Preparation of a TN-Mode Liquid-Crystal Cell>

Two substrates were positioned keeping a cell-gap (d) of 4 μm between them, and liquid-crystal material, having a positive dielectric-constant anisotropy, was poured into the gap between the substrates to form a liquid-crystal layer (33 in FIG. 2) having Δnd of 400 nm where Δn means a refractive-index anisotropy of the liquid-crystal material. The rubbing direction formed on the upper-substrate of the liquid-crystal cell was 45° and the rubbing direction formed on the down-substrate of the liquid-crystal cell was −45°, and, thus, the twist angle was 90°. As described above, a TN-mode liquid-crystal cell was produced.

<Preparation of a Cellulose Acetate Film>

The following components were charged to a mixing tank and stirred with heating to prepare a cellulose acetate solution (dope).

| Composition of cellulose acetate solution composition | |
|---|---|
| Cellulose acetate with a degree of acetation of 60.9 percent | 100 weight parts |
| Triphenyl phosphate (plasticizer) | 7.8 weight parts |
| Biphenyldiphenyl phosphate (plasticizer) | 3.9 weight parts |
| Methylene chloride (first solvent) | 336 weight parts |
| Methanol (second solvent) | 29 weight parts |
| 1-Butanol (third solvent) | 11 weight parts |

In another mixing tank, 16 weight parts of the following retardation enhancer, 92 weight parts of methylene chloride and 8 weight parts of methanol were placed, heated under stirring to prepare a retardation enhancer solution. Mixing 474 weight parts of the cellulose acetate solution and 25 weight parts of the retardation enhancer solution under stirring sufficiently, a dope was prepared. The amount of the retardation enhancer was 6.0 weight parts with respect to 100 parts of cellulose acetate.

Retardation enhancer:

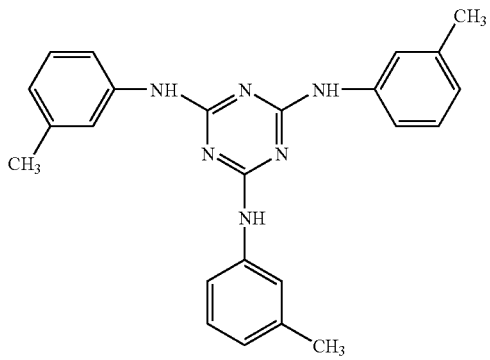

The obtained dope was made to flow to form a film using a band flow-casting machine. After the film temperature was cooled down to 40° C. on the band, the film was dried with hot air of 70° C. for one minute, and then peeled off from the band. Next, the film was dried with dried air of 140° C. for 10 minutes, and thus, a cellulose acetate film having a thickness of 80 micrometers and containing residual solvent in an amount of 0.3 wt %, was obtained.

The Re and the Rth values at 546 nm of the obtained cellulose acetate were measured according to the above described method, and it was found that the Re was 8 nm and the Rth was 78 nm.

The obtained cellulose acetate was dipped in a 2.0 N potassium hydroxide solution (25° C.) for two minutes, neutralized by sulfuric acid, washed with water and then dried. Thus, an cellulose acetate film to be used as a protective film of a polarizing film was produced.

<Preparation of an Alignment Layer for an Optically Anisotropic Layer>

A coating liquid having a formulation shown below was applied to the cellulose acetate film using a #16 wire bar coater in an amount of 28 ml/m², dried with hot air of 60° C. for 60 seconds and 90° C. for 150 seconds to form a polymer layer. The polymer layer was subjected to rubbing treatment in a direction tilted by −2.3° to an in-plane slow axis of the film (which was parallel to the flow-casting direction), and thus, an alignment layer was obtained.

Formulation of Coating Liquid for an Alignment Layer

| Modified polyvinyl alcohol shown below | 20 wt parts |
|---|---|
| Water | 360 wt parts |
| Methanol | 120 wt parts |
| Glutaraldehyde (crosslinking agent) | 1.0 wt parts |

Modified polyvinyl alcohol

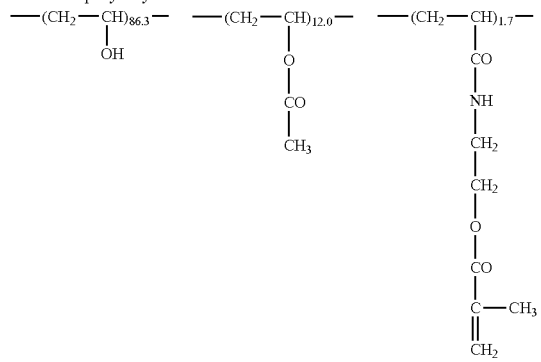

<Preparation of an Optically Anisotropic Layer>

A coating solution was prepared by dissolving 91.0 g of a liquid-crystal compound shown below, 9.0 g of Ethylene oxide-modified trimethyrol propane triacrylate (V#360 made by Osaka Organic Chemicals (Ltd.), 2.0 g of cellulose acetate butyrate ("CAB551-0.2" manufactured by Eastman Chemical Co., LTD.), 0.5 g of cellulose acetate butyrate ("CAB531-1" manufactured by Eastman Chemical Co., LTD.), 3.0 g of a polymerization initiator (IRGACURE 907 manufactured by Ciba-Geigy), 1.0 g of a sensitizer (KAYACURE-DETX manufactured by NIPPON KAYAKU CO., LTD.) and 1.3 g of a fluoro-aliphatic-group containing copolymer ("MEGAFACE F780" manufactured by DAINIPPON INK & CHEMICALS, INCORPORATED) in 207 g of methyl ethyl ketone, and the coating solution was applied to the surface of the alignment layer with a #3.6 wire-bar in an amount of 6.2 ml/m². The coating layer was heated in a constant-temperature zone of 130° C. for 2 minutes to align the discotic molecules. Subsequently, the layer was irradiated at 60° C. with UV light using a 120 w/cm high-pressurized mercury lamp for one minute to polymerize the discotic molecules, and then, an optically anisotropic layer was formed. After that, cooled down the room temperature, and then Optical compensatory film was obtained.

Discotic liquid-crystal compound

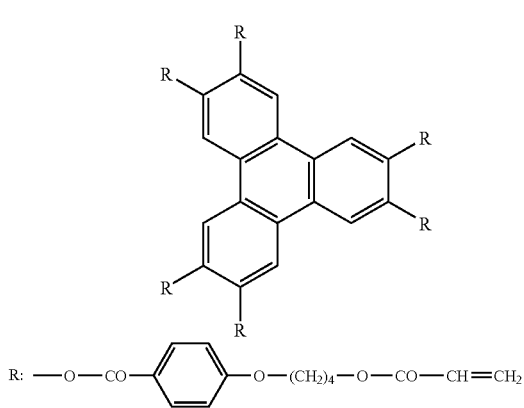

It was found that discotic molecules in the optically anisotropic layer were hybrid-aligned at a mean tilt angle of 37° in the manner that the angles (tilt angles) between the disk-like plates of the moluecules and the film surface increased along with a distance from the film surface. The optically anisotropic layer was unifrom and no shriren defect was found in the optically anisotropic layer.

The tilt angles of liquid-crystalline molecules in the optically anisotropic layer at an alignment layer interface and at an air interface were calculated using an ellipsometer (M-150 manufactured by JASCO International CO., LTD.), according to the above described method.

<Preparation of a Polarizing Film>

Iodine was adsorbed onto a stretched polyvinyl alcohol film to prepare a polarizing film. One side of the polarizing film was bonded with a polyvinyl alcohol-based adhesive to the transparent substrate surface of the optically anisotropic layer. A commercially available cellulose acylate film ("FUJITAC TD80UF" manufactured by FUJI PHOTO FILM CO., LTD.), having a thickness of 80 μm, was saponified and was bonded to the opposite surface of the polarizing film with polyvinyl alcohol-based adhesive.

The obtained polarizing plate was bonded to the backlight side of the TN liquid-crystal cell produced as set forth above so that the optically anisotropic surface faced the substrate of the liquid-crystal cell with an adhesion. The alignment direction (rubbing directions) of the optical compensatory sheet was made parallel to the rubbing direction formed on the faced surface of the liquid-crystal cell at the backlight side, and the absorption axis of the polarizing plate was made parallel to the rubbing direction formed on the faced surface of the liquid-crystal cell at the backlight side. The optical quenching axis of the optically anisotropic layer was rotated by −2.3° with respect to the rubbing direction formed on the faced surface of the liquid-crystal cell at the backlight side. Namely, the angle at the backlight side between the absorption axis of the polarizing film and the optical quenching axis of the optically anisotropic layer was 2.3°.

The obtained polarizing plate was bonded to the observed side of the TN liquid-crystal cell so that the optically anisotropic surface faced the substrate of the liquid-crystal cell with an adhesion. The alignment direction (rubbing directions) of the optical compensatory sheet was made parallel to the rubbing direction formed on the faced surface of the liquid-crystal cell at the observed side, and the absorption axis of the polarizing plate was made parallel to the rubbing direction formed on the faced surface of the liquid-crystal cell at the observed side. The optical quenching axis of the optically anisotropic layer was rotated by +2.3° with respect to the rubbing direction formed on the faced surface of the liquid-crystal cell at the observed side. Namely, the angle at the observed side between the absorption axis of the polarizing film and the optical quenching axis of the optically anisotropic layer was 2.3°.

Example Nos. 2-2 to 2-4

Three samples were produced in the same manner as Example No. 2-1, except that a chiral agent shown below was added to coating liquids in a proper amount and the coating liquids were respectively applied and polymerized to form optically anisotropic layers. The angles between the optical quenching angle of the optically anisotropic layer and the rubbing direction formed on the faced surface of the liquid-crystal cell respectively found in three samples were different each other.

Chiral agent

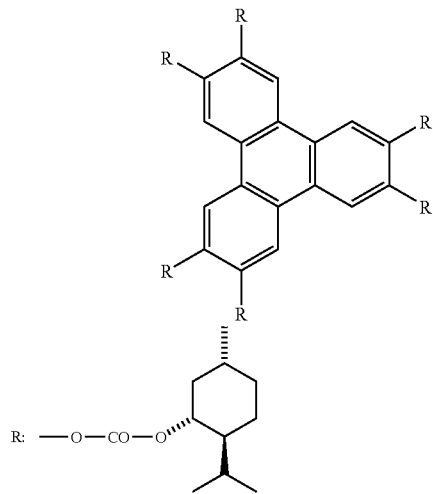

R: —O—CO—O—

In the first one of the three samples, the angles, at both of the backlight side and the observed side of the TN-cell, between the optical quenching axis of the optically anisotropic layer and the alignment axis formed on the faced surface of the substrate disposed nearer to the optically anisotropic layer were −3.1°, in the second one of the three samples, the angles at both of the backlight side and the observed side were −3.5° and in the third one of the three samples, the angles at both of the backlight side and the observed side were −3.9°. In all of three samples, the angles at both of the backlight side and the observed side between the rubbing axis of the optically anisotropic layer and the alignment axis formed on the faced surface of the substrate disposed nearer to the optically anisotropic layer were +2°, and in all of three samples, the angles at both of the backlight side and the observed side between the absorption axis of the polarizing plate and the alignment axis formed on the faced surface of the substrate disposed nearer to the polarizing plate were 0°.

Comparative Example No. 2-1

A sample was produced in the same manner as Example No. 2-1. But, in the sample, the angles, at both of the backlight side and the observed side of a TN-cell, between the optical quenching axis of the optically anisotropic layer and the alignment axis formed on the faced surface of the substrate disposed nearer to the optically anisotropic layer were 0°, the angles at both of the backlight side and the observed side between the rubbing axis of the optically anisotropic layer and the alignment axis formed on the faced surface of the substrate disposed nearer to the optically anisotropic layer were 0°, and the angles at both of the backlight side and the observed side between the absorption axis of the polarizing plate and the alignment axis formed on the faced surface of the substrate disposed nearer to the polarizing plate were 0°.

<Evaluation of TN-Cells>

The produced liquid-crystal displays were applied 60 Hz square-wave voltage respectively. The displays were driven according to a normally white mode and 1.0 V was applied in a white state and 5 V was applied in a black state. Grayscale ratios, or in other words transmittance ratios (a white state to a black state), were measured with "EZ-Contrast160D", manufactured by ELDIM CO., LTD., for various viewing angles. The grayscale inversion angles in a downward direction were calculated based on the obtained data.

The frontal grayscales and the downward grayscale inversions respectively found in the liquid-crystal displays of Example Nos. 2-1 to 2-4 and Comparative Example No. 2-1 were shown in Table 2-1.

| LCD | A | B | C | Contrast Inversion Angle* | Frontal Contrast |
|---|---|---|---|---|---|
| Example No. 2-1 | −2.3° | 0° | 0° | 34° | 416 |
| Example No. 2-2 | −3.1° | +2° | 0° | 35° | 256 |
| Example No. 2-3 | −3.5° | +2° | 0° | 35.5° | 315 |
| Example No. 2-4 | −3.9° | +2° | 0° | 33° | 789 |
| Comparative Example No. 2-1 | 0° | 0° | 0° | 33° | 388 |

*A: an angle between an optical quenching axis of an optically anisotropic layer and an alignment axis formed on the inner surface of a substrate disposed nearer to the optically anisotropic layer
*B: an angle between a rubbing axis of an optically anisotropic layer and an alignment axis formed on the inner surface of the substrate disposed nearer to the optically anisotropic layer.
*C: an angle between an absorption axis of a polarizing plate and an alignment axis formed on the inner surface of the substrate disposed nearer to the polarizing plate
*contrast inversion angle: an angle giving inversion between L1 and L2 in a downward direction In Example No. 2-1 and Comparative Example No. 2-1, the rubbing axis of the optically anisotropic layer and the alignment axis of the substrate was identical, and it was found that, for such an embodiment, the disposition, in which the optical quenching axis of the optically anisotropic layer was not parallel to the alignment axis of the substrate, increased the grayscale inversion angle in a downward direction without contributing to lowering the frontal grayscale. In Example Nos. 2-2 to 2-4, the angles between the rubbing axes of the optically anisotropic layers and the alignment axes of the substrates were +2°, and it was found that, for such an embodiment, the disposition, in which the optical quenching axis of the optically anisotropic layer was not parallel to the alignment axis of the substrate, increased the frontal grayscale. It was also found that, in such a disposition, there was a peak of the grayscale inversion angle in a downward direction.

And it was also found that the disposition, in which the rubbing axis of the optically anisotropic layer was not parallel to the alignment axis of the substrate, brought about a larger effect on the downward grayscale inversion than that which was brought about by the disposition in which the rubbing axis of the optically anisotropic layer was parallel to the alignment axis of the substrate.

Example No. 3-1

A liquid-crystal display having a same configuration shown in FIG. 3 was produced. Namely, an upside polarizing film, an upside optical compensatory sheet, a liquid-crystal cell comprising an upper-substrate, a liquid-crystal layer and a down-substrate, a downside optical compensatory sheet and a downside polarizing plate were stacked in this order from an observed side (an upside). And a back light employing a cold cathode fluorescent (not shown in FIG. 3) was disposed under the downside polarizing plate.

The members employed in the liquid-crystal display and the process for producing them will be described in details below.

<Preparation of a Liquid-Crystal Cell>

Two substrates were positioned keeping a cell-gap (d) of 4 μm between them, and liquid-crystal material, having a positive dielectric-constant anisotropy, was poured into the gap between the substrates to form a liquid-crystal layer (62 in FIG. 2) having $\Delta$nd of 400 nm where $\Delta$n means a refractive-index anisotropy of the liquid-crystal material. The rubbing direction formed on the upper-substrate of the liquid-crystal cell was 45° and the rubbing direction formed on the down-substrate of the liquid-crystal cell was −45°, and, thus, the twist angle was 90°. As described above, a TN-mode liquid-crystal cell was produced.

<Preparation of a Cellulose Acetate Film>

The following components were charged to a mixing tank and stirred with heating to prepare a cellulose acetate solution (dope).

| Composition of cellulose acetate solution composition | |
|---|---|
| Cellulose acetate with a degree of acetation of 60.9 percent | 100 weight parts |
| Triphenyl phosphate (plasticizer) | 7.8 weight parts |
| Biphenyldiphenyl phosphate (plasticizer) | 3.9 weight parts |
| Methylene chloride (first solvent) | 336 weight parts |
| Methanol (second solvent) | 29 weight parts |
| 1-Butanol (third solvent) | 11 weight parts |

In another mixing tank, 16 weight parts of the following retardation enhancer, 92 weight parts of methylene chloride and 8 weight parts of methanol were placed, heated under stirring to prepare a retardation enhancer solution. Mixing 474 weight parts of the cellulose acetate solution and 25 weight parts of the retardation enhancer solution under stirring sufficiently, a dope was prepared. The amount of the retardation enhancer was 6.0 weight parts with respect to 100 parts of cellulose acetate.

Retardation Enhancer:

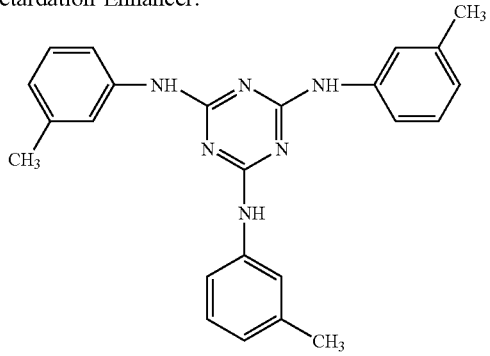

The obtained dope was made to flow to form a film using a band flow-casting machine. After the film temperature was cooled down to 40° C. on the band, the film was dried with hot air of 70° C. for one minute, and then peeled off from the band. Next, the film was dried with dried air of 140° C. for 10 minutes, and thus, a cellulose acetate film having a thickness of 80 micrometers and containing residual solvent in an amount of 0.3 wt %, was obtained.

The Re and the Rth values at 546 nm of the obtained cellulose acetate were measured according to the above described method, and it was found that the Re was 8 nm and the Rth was 78 nm.

The obtained cellulose acetate was dipped in a 2.0 N potassium hydroxide solution (25° C.) for two minutes, neutralized by sulfuric acid, washed with water and then dried. Thus, a cellulose acetate film to be used as a protective film of a polarizing film was produced.

<Preparation of an Alignment Layer for an Optically Anisotropic Layer>

A coating liquid having a formulation shown below was applied to the cellulose acetate film using a #16 wire bar coater in an amount of 28 ml/m², dried with hot air of 60° C. for 60 seconds and 90° C. for 150 seconds to form a polymer layer. The polymer layer was subjected to rubbing treatment in a direction parallel to an in-plane slow axis of the film (which was parallel to the flow-casting direction), and thus, an alignment layer was obtained. Namely, the rubbing direction was parallel to the slow axis of the cellulose acetate film.

Formulation of Coating Liquid for an Alignment Layer

| | |
|---|---|
| Modified polyvinyl alcohol shown below | 20 wt parts |
| Water | 360 wt parts |
| Methanol | 120 wt parts |
| Glutaraldehyde (crosslinking agent) | 1.0 wt parts |

—(CH$_2$—CH)$_{86.3}$—    —(CH$_2$—CH)$_{12.0}$—    —(CH$_2$—CH)$_{1.7}$—
         |                              |                              |
        OH                              O                             CO
                                        |                              |
                                        CO                            NH
                                        |                              |
                                        CH$_3$                        CH$_2$
                                                                       |
                                                                      CH$_2$
                                                                       |
                                                                       O
                                                                       |
                                                                      CO
                                                                       |
                                                                      C—CH$_3$
                                                                      ||
                                                                      CH$_2$

<Preparation of an Optically Anisotropic Layer>

A coating solution was prepared by dissolving 91.0 g of a liquid-crystal compound shown below, 9.0 g of Ethylene oxide-modified trimethyrol propane triacrylate (V#360 made by Osaka Organic Chemicals (Ltd.), 2.0 g of cellulose acetate butyrate ("CAB551-0.2" manufactured by Eastman Chemical Co., LTD.), 0.5 g of cellulose acetate butyrate ("CAB531-1" manufactured by Eastman Chemical Co., LTD.), 3.0 g of a polymerization initiator (IRGACURE 907 manufactured by Ciba-Geigy), 1.0 g of a sensitizer (KAYA-CURE-DETX manufactured by NIPPON KAYAKU CO., LTD.) and 1.3 g of a fluoro-aliphatic-group containing copolymer ("MEGAFACE F780" manufactured by DAIN-IPPON INK & CHEMICALS, INCORPORATED) in 207 g of methyl ethyl ketone, and the coating solution was applied to the surface of the alignment layer with a #3.6 wire-bar in an amount of 6.2 ml/m². The coating layer was heated in a constant-temperature zone of 130° C. for 2 minutes to align the discotic molecules. Subsequently, the layer was irradiated at 60° C. with UV light using a 120 w/cm high-pressurized mercury lamp for one minute to polymerize the discotic molecules, and then, an optically anisotropic layer was formed. After that, cooled down the room temperature, and then Optical compensatory film was obtained.

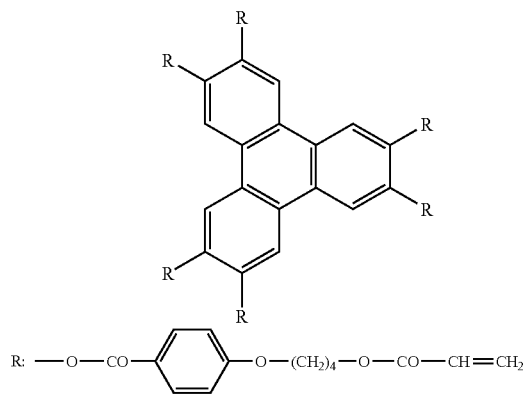

It was found that the in-plane retardation, Re, of the obtained optically anisotropic layer was from 20 to 80 nm.

<Preparation of a Polarizing Film>

Iodine was adsorbed onto a stretched polyvinyl alcohol film to prepare a polarizing film. One side of the polarizing film was bonded with a polyvinyl alcohol-based adhesive to the transparent substrate surface of the optically anisotropic layer. A commercially available cellulose triacetate film ("FUJITAC TD80UF" manufactured by FUJI PHOTO FILM CO., LTD.), having a thickness of 80 μm, was saponified and was bonded to the opposite surface of the polarizing film with polyvinyl alcohol-based adhesive. Thus, a polarizing plate was produced.

The obtained polarizing plate was bonded to the backlight side of the TN liquid-crystal cell produced as set forth above so that the optically anisotropic surface faced the substrate of the liquid-crystal cell with an adhesion. The alignment direction (rubbing directions) of the optical compensatory sheet was made parallel to the rubbing direction formed on the faced surface of the liquid-crystal cell at the backlight side, and the absorption axis of the polarizing plate was made parallel to the rubbing direction formed on the faced surface of the liquid-crystal cell at the backlight side. The optical quenching axis of the optically anisotropic layer was rotated by −2.3° with respect to the rubbing direction formed on the faced surface of the liquid-crystal cell at the backlight side. Namely, the angle at the backlight side between the absorption axis of the polarizing film and the optical quenching axis of the optically anisotropic layer was 2.3°.

The obtained polarizing plate was bonded to the observed side of the TN liquid-crystal cell so that the optically anisotropic surface faced the substrate of the liquid-crystal cell with an adhesion. The alignment direction (rubbing directions) of the optical compensatory sheet was made parallel to the rubbing direction formed on the faced surface of the liquid-crystal cell at the observed side, and the absorption axis of the polarizing plate was made parallel to the rubbing direction formed on the faced surface of the liquid-crystal cell at the observed side. The optical quenching axis of the optically anisotropic layer was rotated by +2.3° with respect to the rubbing direction formed on the faced surface of the liquid-crystal cell at the observed side. Namely, the angle at the observed side between the absorption axis of the polarizing film and the optical quenching axis of the optically anisotropic layer was 2.3°.

And the minimum difference between an in-plane retardation generated by intersecting the optical quenching axis of the optically anisotropic layer with the absorption axis of the polarizing film and a residue in-plane retardation in the liquid-crystal layer was obtained while the liquid-crystal display was in a black state.

Example Nos. 3-2 and 3-3

Two samples were produced in the same manner as Example No. 3-1, except that the thicknesses of the liquid-crystal layers were changed and the Δnd's were set 0.36 μm and 0.4 μm respectively.

<Evaluation of TN-Cells>

The produced liquid-crystal displays were applied 60 Hz square-wave voltage respectively. The displays were driven according to a normally white mode and 1.0 V was applied in a white state and 5 V was applied in a black state. Grayscale ratios, or in other words transmittance ratios (a white state to a black state), were measured with "EZ-Contrast160D", manufactured by ELDIM CO., LTD., for various viewing angles. The grayscale inversion angles in a downward direction were calculated based on the obtained data.

The frontal grayscales and the downward grayscale inversions respectively found in the liquid-crystal displays of Example Nos. 3-1 to 3-3 were shown in Table 3-1.

TABLE 3-1

| | Liquid crystal cell Δnd | {T(31) − T(0)}/ {T(255) − T(0)} | Grayscale inversion Angle* | Frontal grayscale |
|---|---|---|---|---|
| Example No. 3-1 | 0.4 μm | 1.85% | 34° | 416 |
| Example No. 3-2 | 0.36 μm | 0.63% | 33° | 356 |
| Example No. 3-3 | 0.3 μm | 0.32% | 28° | 300 |

*grayscale inversion angle: an angle giving inversion between L1 and L2 in a downward direction From the data shown in Table 3-1, it was found that the liquid crystal displays, comprising a liquid crystal layer having Δnd of around 0.4, gave a high frontal grayscale, and neither grayscale inversion nor loss in grayscale differentiation was observable.

INDUSTRIAL AVAILABILITY

According to the first embodiment of the present invention, it is made possible to provide a liquid-crystal display, especially a TN-mode liquid-crystal display, remarkably improved in displaying quality at a viewing angle in a vertical (up and down) direction and/or in a horizontal (right and left) direction without introducing any complexity into the conventional configuration.

According to the second embodiment of the present invention, it is made possible to provide a liquid-crystal display, especially a TN-mode liquid-crystal display, improved in a grayscale inversion angle in a down direction without lowering a frontal grayscale, by disposing an optically anisotropic layer and a polarizing plate such that an optical quenching axis of the optically anisotropic layer is not parallel to the alignment axis of a liquid-crystal cell and is not parallel to an absorption axis of the polarizing plate.

And, according to the third embodiment of the present invention, it is made possible to provide a liquid-crystal display, especially a TN-mode liquid-crystal display, displaying soft middle tone images without grayscale inversion in a frontal direction and in oblique direction, by adjusting the difference between the retardation (the product of the thickness d, and the refractive index anisotropy, Δn, of the liquid-crystal layer) of a liquid-crystal cell and the retardation of an optical compensatory layer as described above.

Having described our invention as related to the present embodiments, it is our intention that the invention not be limited by any of the details of the description, unless otherwise specified, but rather be construed broadly within its spirit and scope as set out in the accompanying claims.

What is claimed is:

1. A liquid crystal display comprising:
    a pair of a first substrate and a second substrate disposed facing each other, and at least one of which has an electrode,
    a liquid-crystal layer being sandwiched in between the pair of the first substrate and the second substrate and comprising liquid-crystal molecules aligned along with a first alignment axis and a second alignment axis respectively formed on facing surfaces of the first and second substrates,
    a pair of a first polarizing plate and a second polarizing plate disposed sandwiching the liquid-crystal layer, the first polarizing plate being disposed nearer to the first substrate than the second polarizing plate and the second polarizing plate being disposed nearer to the second substrate than the first polarizing plate, and
    at least a first optically anisotropic layer disposed between the liquid-crystal layer and the first polarizing plate, and comprising at least one liquid crystal compound which is aligned along with a third alignment axis and is fixed in the alignment state;
    wherein disposition of the pair of the first substrate and the second substrate, the pair of the first polarizing plate and the second polarizing plate and the first optically anisotropic layer satisfies at least one of Condition (1) and Condition (2), and viewing angle in a vertical direction and/or viewing angle in a horizontal direction are/is better than those found in disposition that satisfies neither of Condition (1) nor Condition (2);
    Condition (1)
    the first alignment axis is not parallel to a transmission axis of the first polarizing plate, and the second alignment axis is not parallel to a transmission axis of the second polarizing plate; and
    Condition (2)
    the first alignment axis is not parallel to the third alignment axis.

2. The liquid crystal display of claim 1, wherein an angle between the first alignment axis and the second alignment axis is from 80 to 100°, and the liquid-crystal layer is a TN mode liquid-crystal layer whose twist angle falls within a range from 80 to 100°.

3. The liquid-crystal display of claim 1, wherein an absorption axis of the first polarizing plate is parallel to the third alignment axis.

4. The liquid-crystal display of claim 1, wherein the first polarizing plate is disposed at an observed side and the second polarizing plate is disposed at a backlight side, an absorption axis of the first polarizing plate is rotated by 0.1 to 10° counterclockwise with respect to the first alignment axis and
an absorption axis of the second polarizing plate is rotated by 0.1 to 10° clockwise with respect to the second alignment axis, thereby improving viewing angle in a vertical direction.

5. The liquid-crystal display of claim 1 further comprising a second optically anisotropic layer disposed between the liquid-crystal layer and the second polarizing plate, and comprising at least one liquid crystal compound which is aligned along with a fourth alignment axis and is fixed in the alignment state,
    wherein the first polarizing plate is disposed at an observed side and the second polarizing plate is disposed at a backlight side, the third alignment axis is rotated by 0.1 to 10° counterclockwise with respect to the first alignment axis and the fourth alignment axis is rotated by 0.1 to 10° clockwise with respect to the second alignment axis, thereby improving viewing angle in a vertical direction.

6. The liquid crystal display of claim 1, wherein the first polarizing plate is disposed at an observed side and the second polarizing plate is disposed at a backlight side, an absorption axis of the first polarizing plate is rotated by 0.1 to 10° clockwise with respect to the first alignment axis and an absorption axis of the second polarizing plate is rotated by 0.1 to 10° counterclockwise with respect to the second alignment axis, thereby improving viewing angle in a horizontal direction.

7. The liquid-crystal display of claim 1 further comprising a second optically anisotropic layer disposed between the liquid-crystal layer and the second polarizing plate, and comprising at least one liquid crystal compound which is aligned along with a fourth alignment axis and is fixed in the alignment state,
    wherein the first polarizing plate is disposed at an observed side and the second polarizing plate is disposed at a back light side, the third alignment axis is rotated by 0.1 to 10° clockwise with respect to the first alignment axis and the fourth alignment axis is rotated by 0.1 to 10° counterclockwise with respect to the second alignment axis, thereby improving viewing angle in a horizontal direction.

* * * * *